US008433630B2

(12) United States Patent
Juarez et al.

(10) Patent No.: US 8,433,630 B2
(45) Date of Patent: *Apr. 30, 2013

(54) PRIVATE ENTITY PROFILE NETWORK

(75) Inventors: Richard A. Juarez, Pleasanton, CA (US); Zachary Brown, Vancouver (CA)

(73) Assignee: Alphacap Ventures, LLC., Pleasanton, CA (US)

( * ) Notice: Subject to any disclaimer, the term of this patent is extended or adjusted under 35 U.S.C. 154(b) by 204 days.

This patent is subject to a terminal disclaimer.

(21) Appl. No.: 12/927,929

(22) Filed: Nov. 29, 2010

(65) Prior Publication Data

US 2011/0119203 A1 May 19, 2011

Related U.S. Application Data

(63) Continuation of application No. 11/007,782, filed on Dec. 8, 2004, now Pat. No. 7,848,976, which is a continuation-in-part of application No. 10/870,732, filed on Jun. 17, 2004, now Pat. No. 7,908,208, application No. 12/927,929, which is a continuation-in-part of application No. 10/870,732, filed on Jun. 17, 2004, now Pat. No. 7,908, 208.

(60) Provisional application No. 60/528,749, filed on Dec. 10, 2003.

(51) Int. Cl.
*G06Q 40/00* (2012.01)
(52) U.S. Cl.
USPC .......................................... 705/35; 705/36 R
(58) Field of Classification Search ............... 705/35–37
See application file for complete search history.

(56) References Cited

U.S. PATENT DOCUMENTS

| 5,978,799 | A | 11/1999 | Hirsch |
| 6,151,584 | A | 11/2000 | Papierniak et al. |
| 6,662,192 | B1 | 12/2003 | Rebane |
| 6,691,135 | B2 | 2/2004 | Pickett et al. |
| 6,871,220 | B1 | 3/2005 | Rajan et al. |
| 7,334,013 | B1 | 2/2008 | Calinov et al. |
| 2001/0047282 | A1 | 11/2001 | Raveis, Jr. |
| 2002/0152151 | A1 | 10/2002 | Baughman et al. |
| 2003/0088520 | A1 | 5/2003 | Bohrer et al. |
| 2003/0131235 | A1 | 7/2003 | Wheeler et al. |
| 2003/0145018 | A1 | 7/2003 | Hitchcock et al. |
| 2003/0182260 | A1 | 9/2003 | Pickett et al. |
| 2003/0191703 | A1 | 10/2003 | Chen et al. |
| 2003/0216964 | A1 | 11/2003 | MacLean et al. |
| 2003/0220948 | A1 | 11/2003 | Green et al. |

(Continued)

OTHER PUBLICATIONS

Preston Gralla; "That synching feeling"; Framingham: Sep. 15, 2001. vol. 14, Iss. 23; p. 137.*

(Continued)

*Primary Examiner* — Hani M Kazimi
(74) *Attorney, Agent, or Firm* — David Lewis; James Eppa Hite, III

(57) ABSTRACT

In private equity and debt funding operations, resource providers define electronic data collection templates to be filled in by prospective resource consumers to form semi-homogeneous profiles. Providers and/or consumers can assign themselves and/or third parties various individualized levels of permissions to access and to perform activities on the profiles. Providers can organize profiles into portfolios to further manage the data. All accesses and activities, such as changes to the data, are tracked and recorded in logs useful for audit purposes.

5 Claims, 67 Drawing Sheets

U.S. PATENT DOCUMENTS

| | | | |
|---|---|---|---|
| 2004/0006532 | A1 | 1/2004 | Lawrence et al. |
| 2004/0098285 | A1 | 5/2004 | Breslin et al. |
| 2004/0098729 | A1 | 5/2004 | Husain et al. |
| 2005/0015320 | A1 | 1/2005 | Hayenhjelm et al. |
| 2005/0066037 | A1 | 3/2005 | Song et al. |
| 2005/0144135 | A1 | 6/2005 | Juarez et al. |
| 2005/0171886 | A1 | 8/2005 | Squyres |
| 2007/0288339 | A1 | 12/2007 | Squyres |

OTHER PUBLICATIONS

Ron Harrell; "More thoughts on how producers can use technology" American Agent & Broker. St. Louis: Nov. 2000. vol. 72, Iss. 11; p. 18, 2 pgs.*

Bank Technology News; "Second industrial revolution?"; New York: Feb. 2000. vol. 13, Iss. 2; p. 1,4 pgs.*

Matthew Ball; Corporate Finance; p. 123; Feb. 1995 "Attracting the private buyer to your equity" ABI/INFORM Global.

Steve Sole; NZ Business; vol. 13, p. 3; Apr. 1999 "Venture Capital and the Art of Raising it" ABI/INFORM Trade & Industry.

Business Wire; Nov. 8, 2000 "Venturelist Inc. Launches Affiliate Marketing Program with Commission Junction Business Editors.".

Investorforce Securities, Inc.; Jul. 11, 2002 "Hedge Fund Experts Call for Improved Disclosure by Managers".

PR Newswire, Jul. 21, 2003 "AlphaCap Launches Merchant Banking Platform for Wescon/IEEE".

Dan Gallagher; East Bay Business Times; Aug. 8, 2003 "Software plugs VCs into their investments," American Business Journals, Inc.

Ann Grimes; Wall Street Journal; Oct. 7, 2003 "Venture Firms Feel Overexposed," Dow Jones & Company, Inc.

Ann Grimes; Wall Street Journal; p. C5; Jan. 4, 2004 "Private Equity Seeks Clarity—Validation for AlphaCap," Dow Jones & Company, Inc.

Private Equity Industry Guidelines Group; pp. 0-22; Feb. 1, 2004 "Reporting and Performance Measurement Survey Results".

Ann Grimes; Wall Street Journal; p. A1; May 11, 2004 "Venture Capitalists Scramble to Keep Their Numbers Secret," Dow Jones & Company, Inc.

Affidavit of Richard A. Juarez, filed on Jun. 8, 2010.

Affidavit of Donald Reinke, filed on Jun. 8, 2010.

* cited by examiner

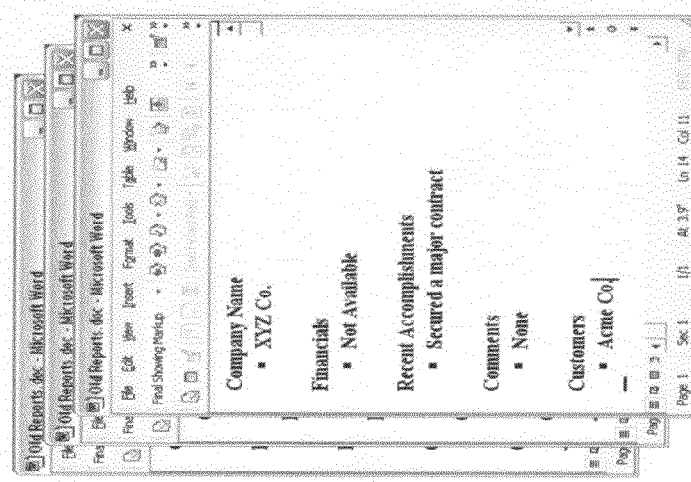
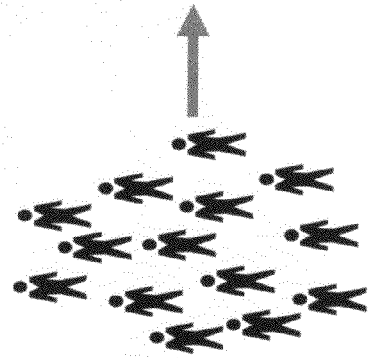
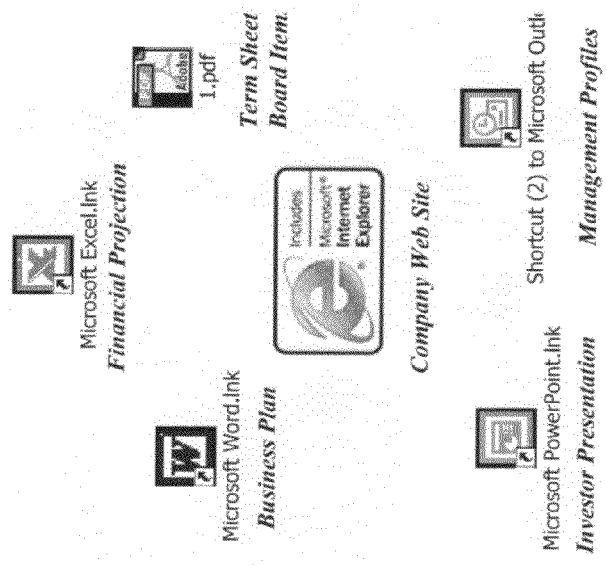
FIG. 1 Prior Art

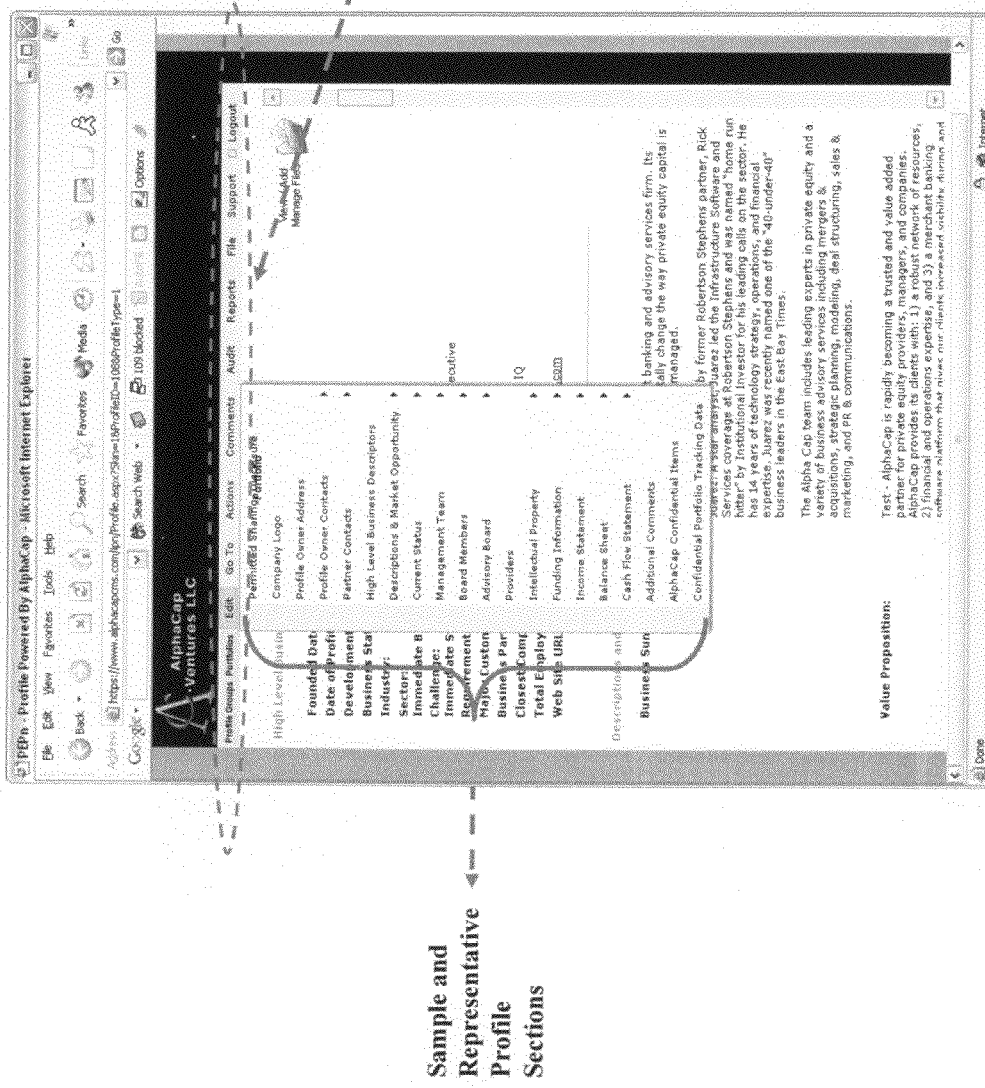
FIG. 2 Profile Sections Screen Shot

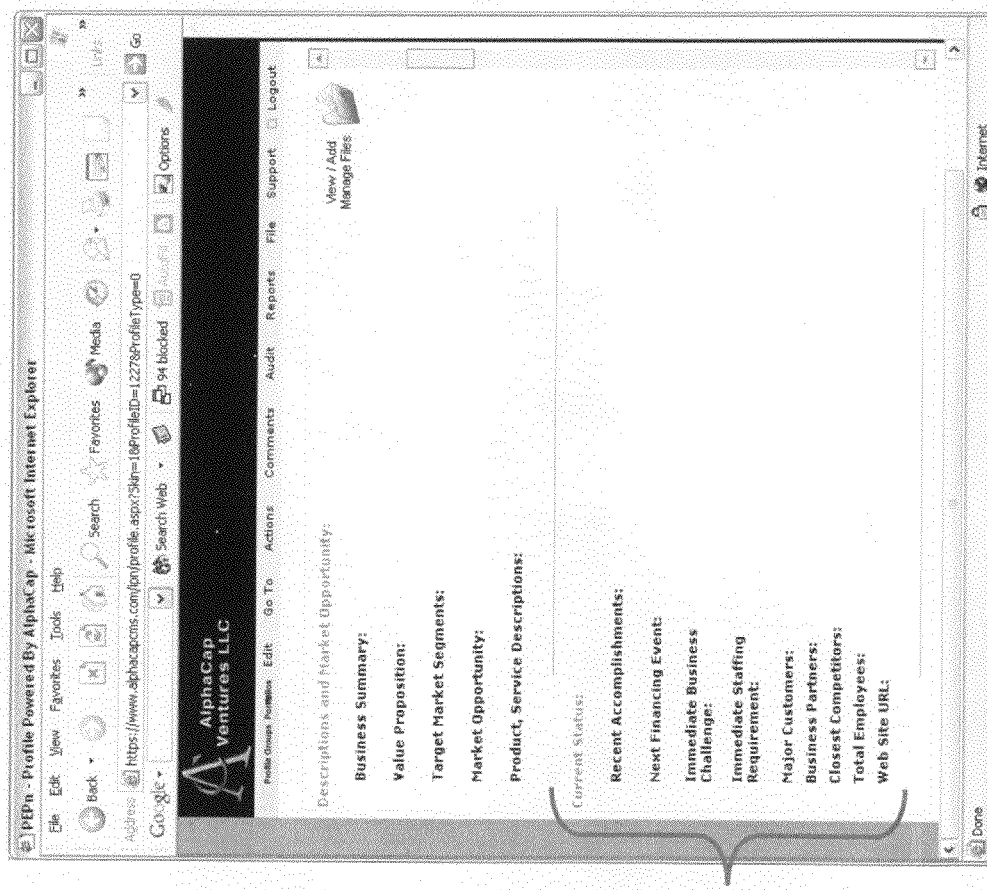
FIG. 3 Fields Contained Within Profile Sections Screen Shot

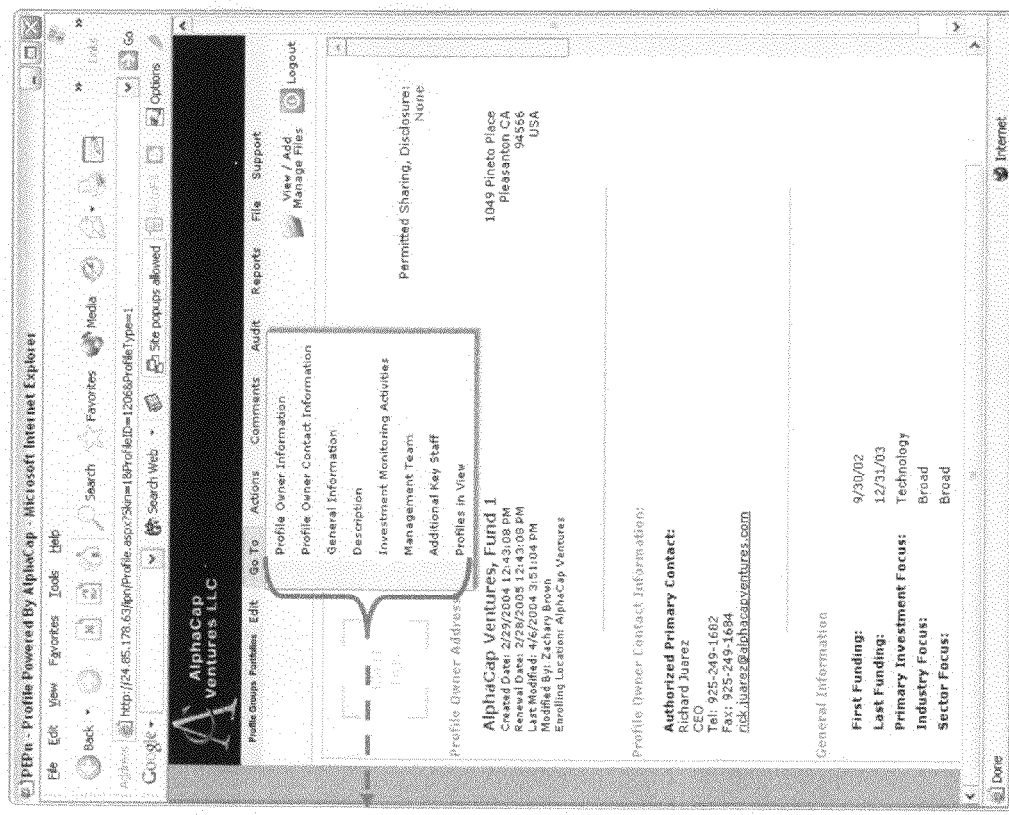
FIG. 4 Portfolio Record Sections Screen Shot
Sample and Representative Portfolio Record Sections

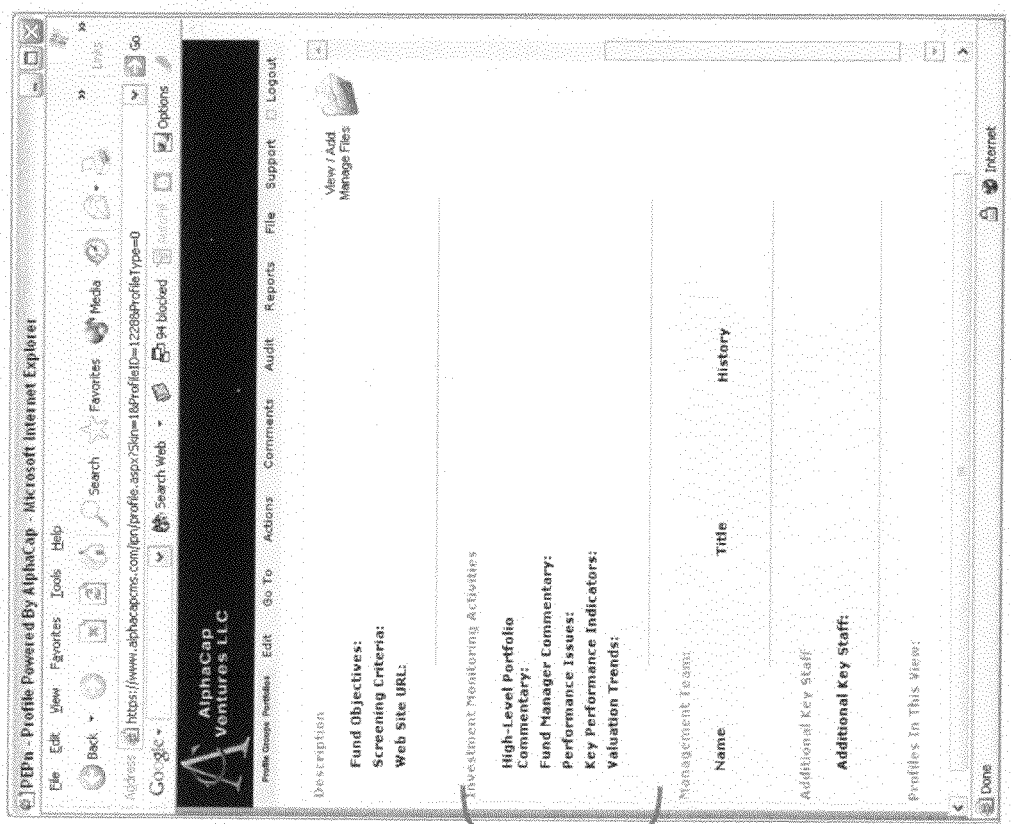
FIG. 5 Fields Within a Portfolio Record Section Screen Shot

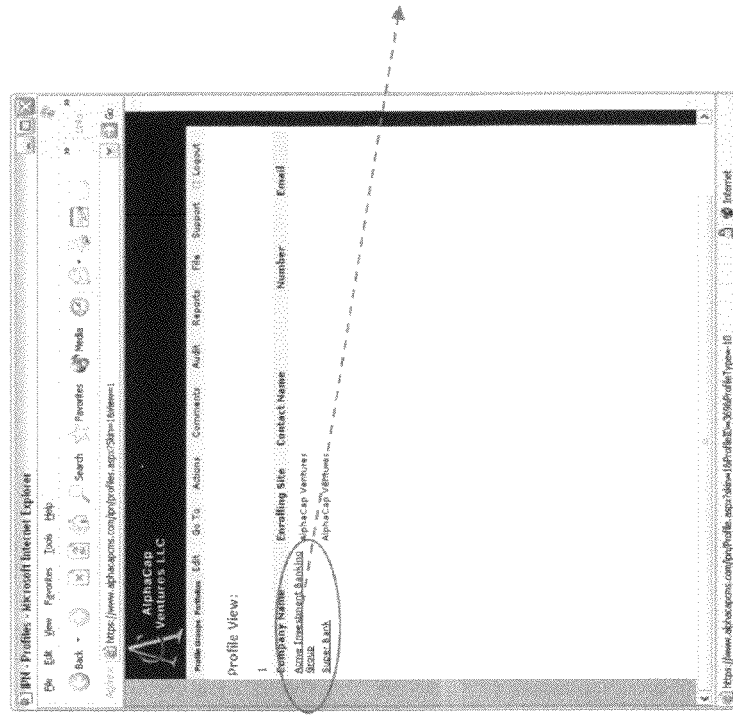
FIG. 6b — Summary List of Portfolio Records for a Given Portfolio Group Name
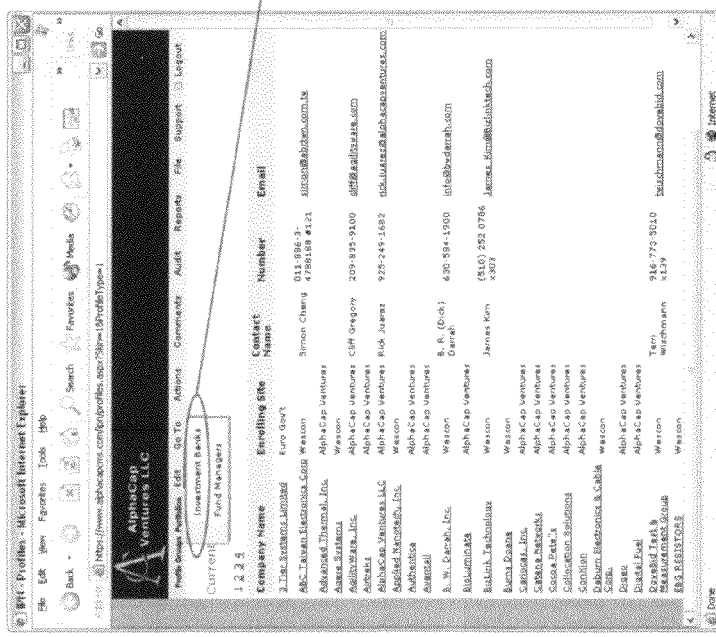
FIG. 6a — Portfolio Group Names

FIG. 7a

Portfolio Record: Sections, Fields, and Associated Profiles

FIG. 7b

Consumer Profile Associated with a given Provider's Portfolio Record

FIG. 8 - Logical Architecture
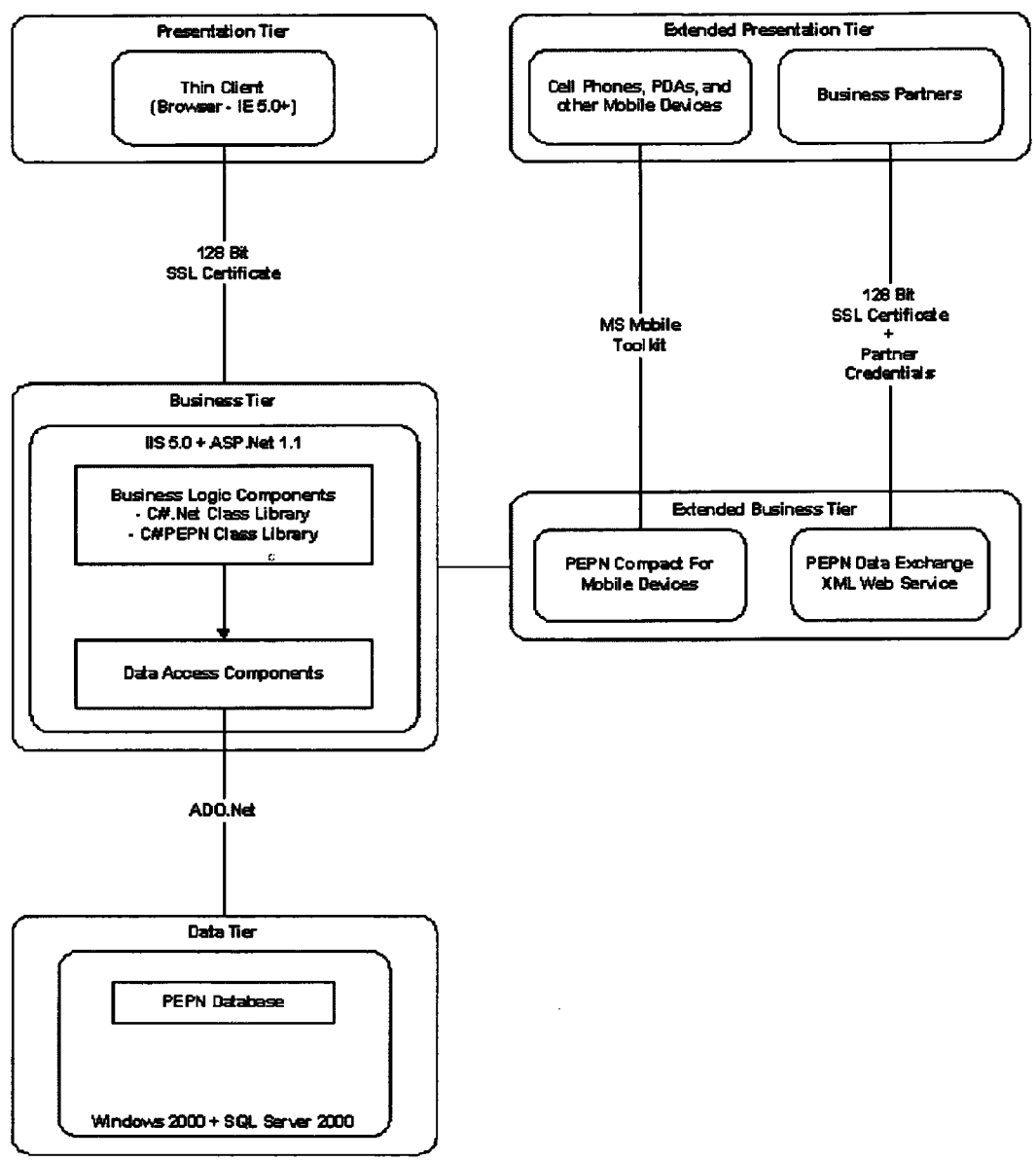

FIG. 9 - Physical Architecture
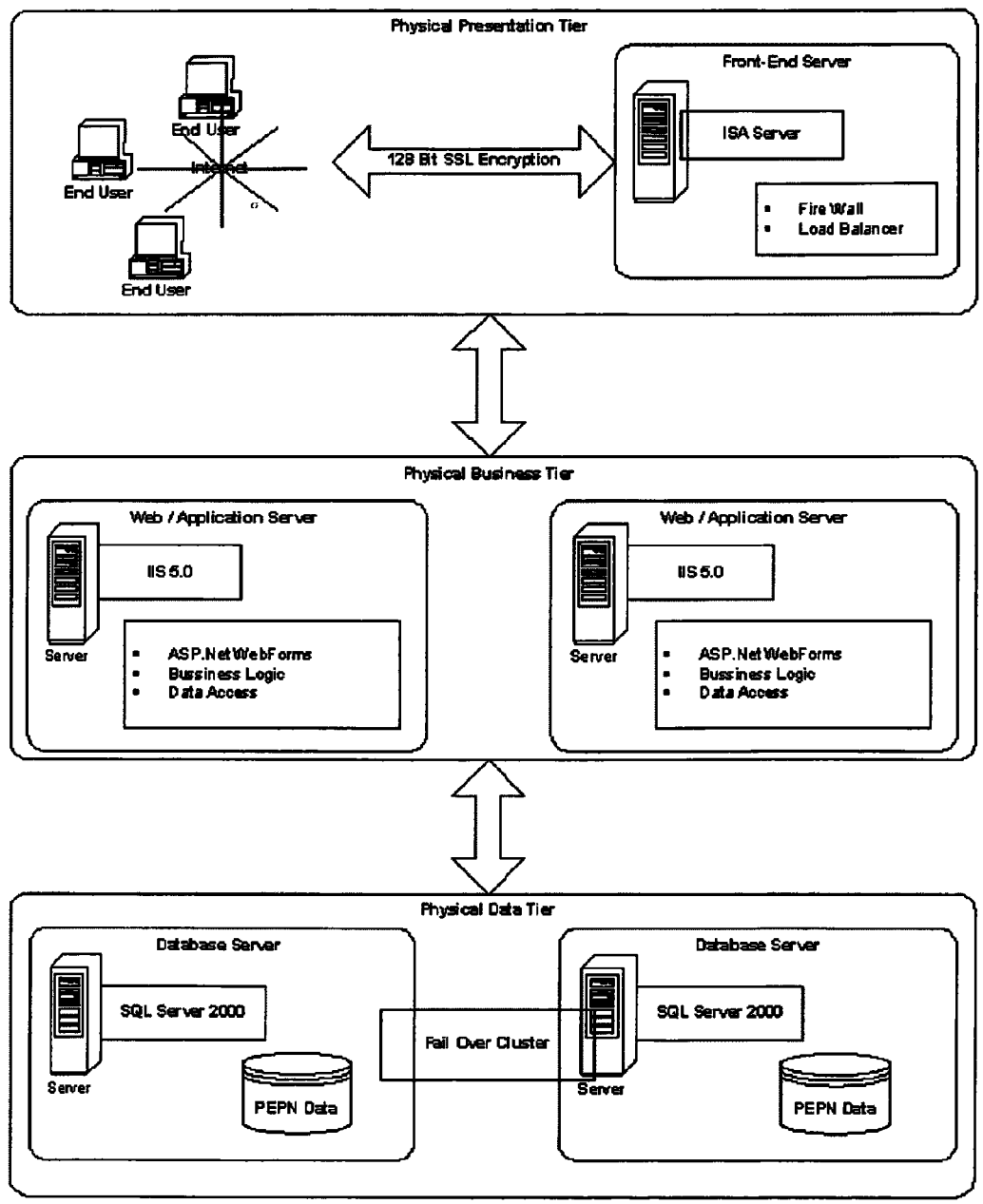

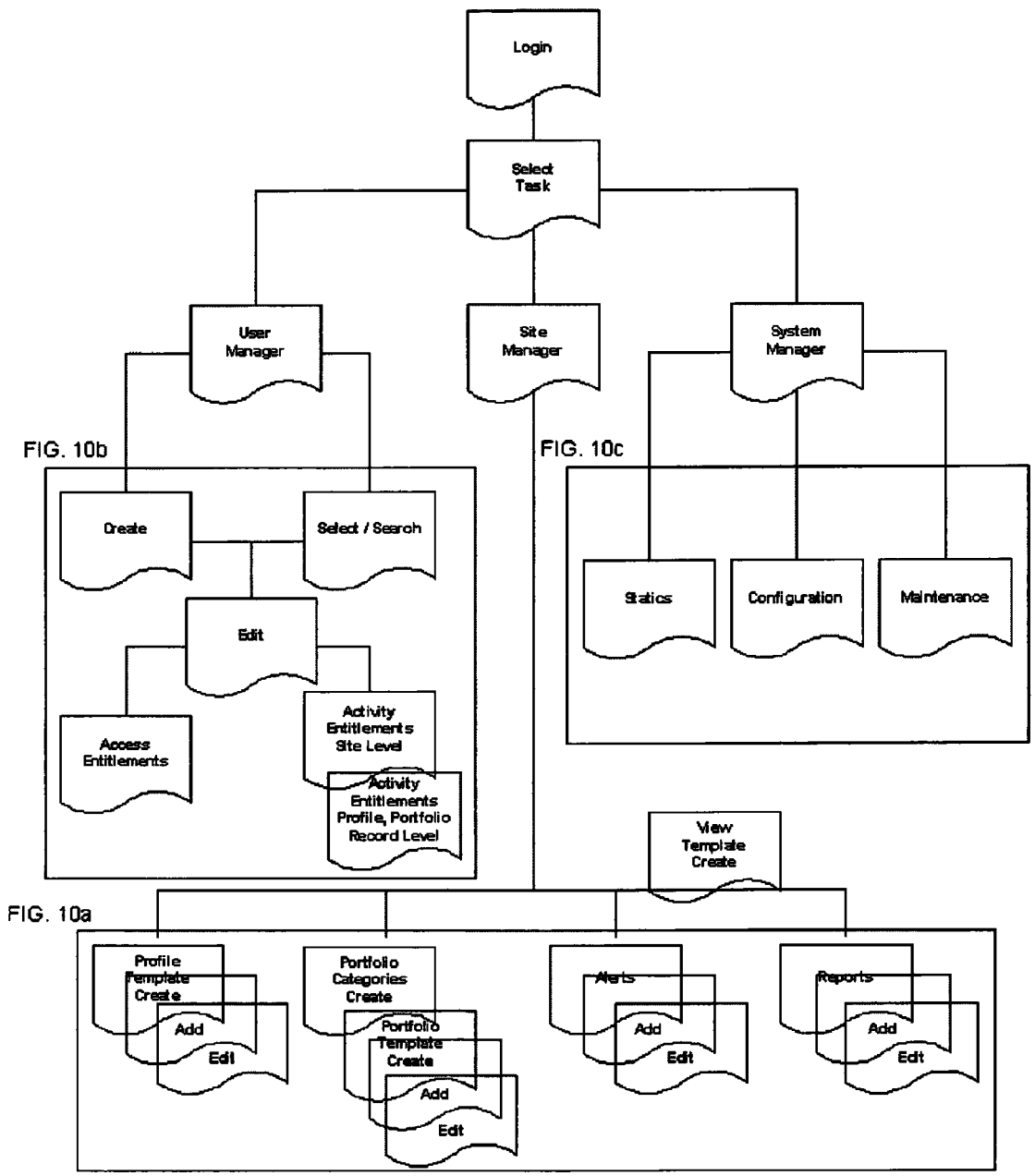
FIG. 10 - Management Tools Site Map

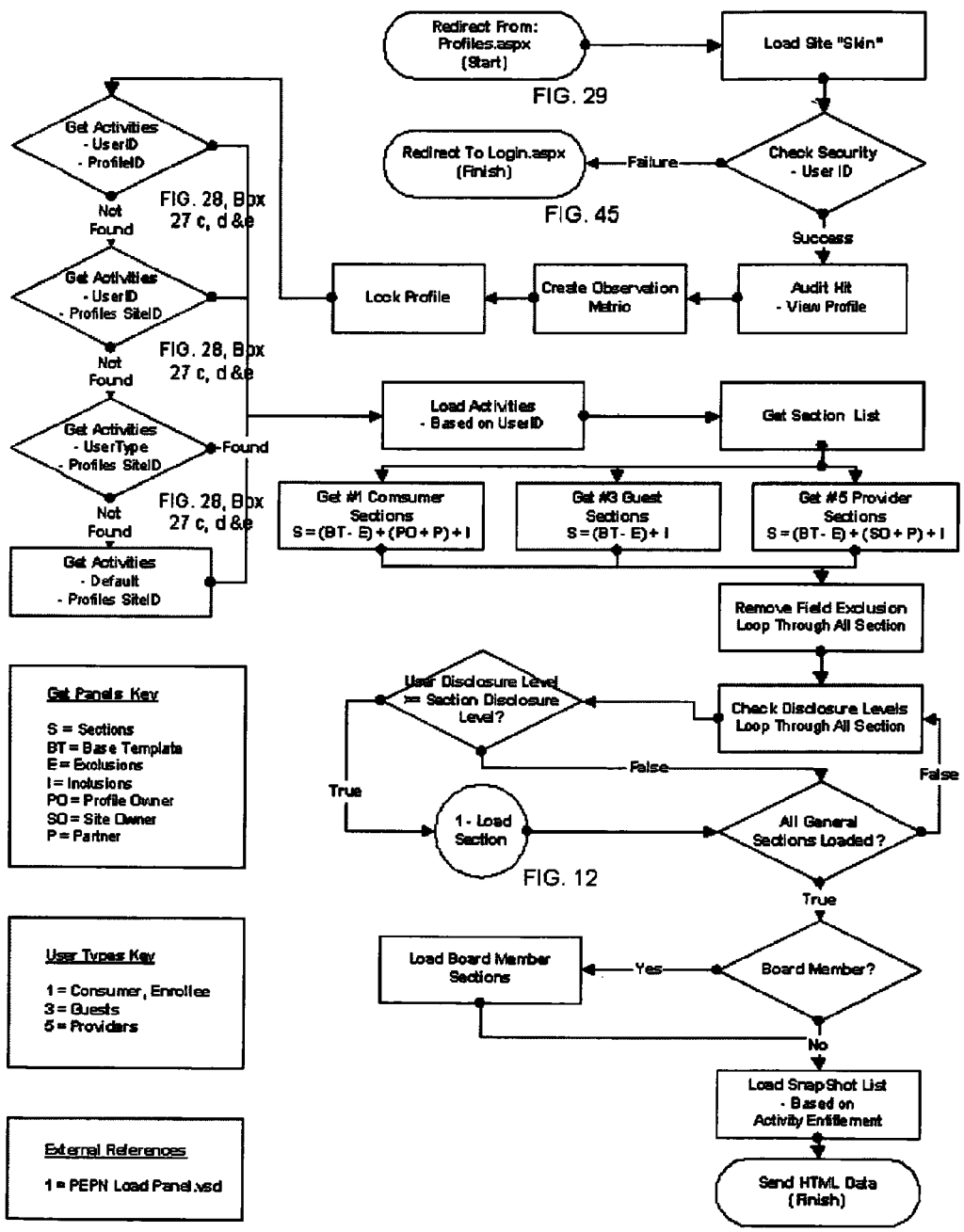
FIG. 11 - Profile Detail Flow Chart

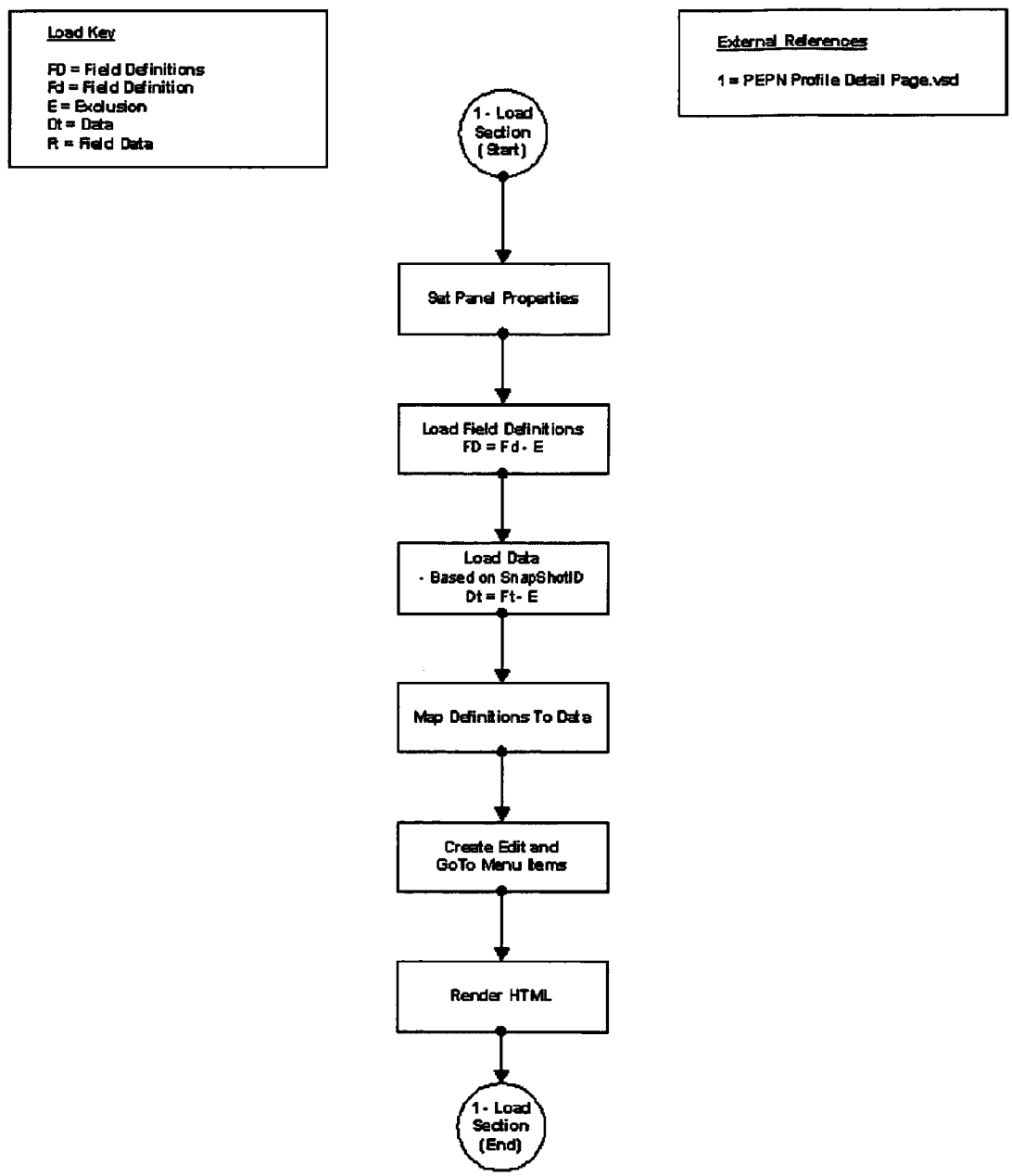
FIG. 12 - Load Section Flow Chart

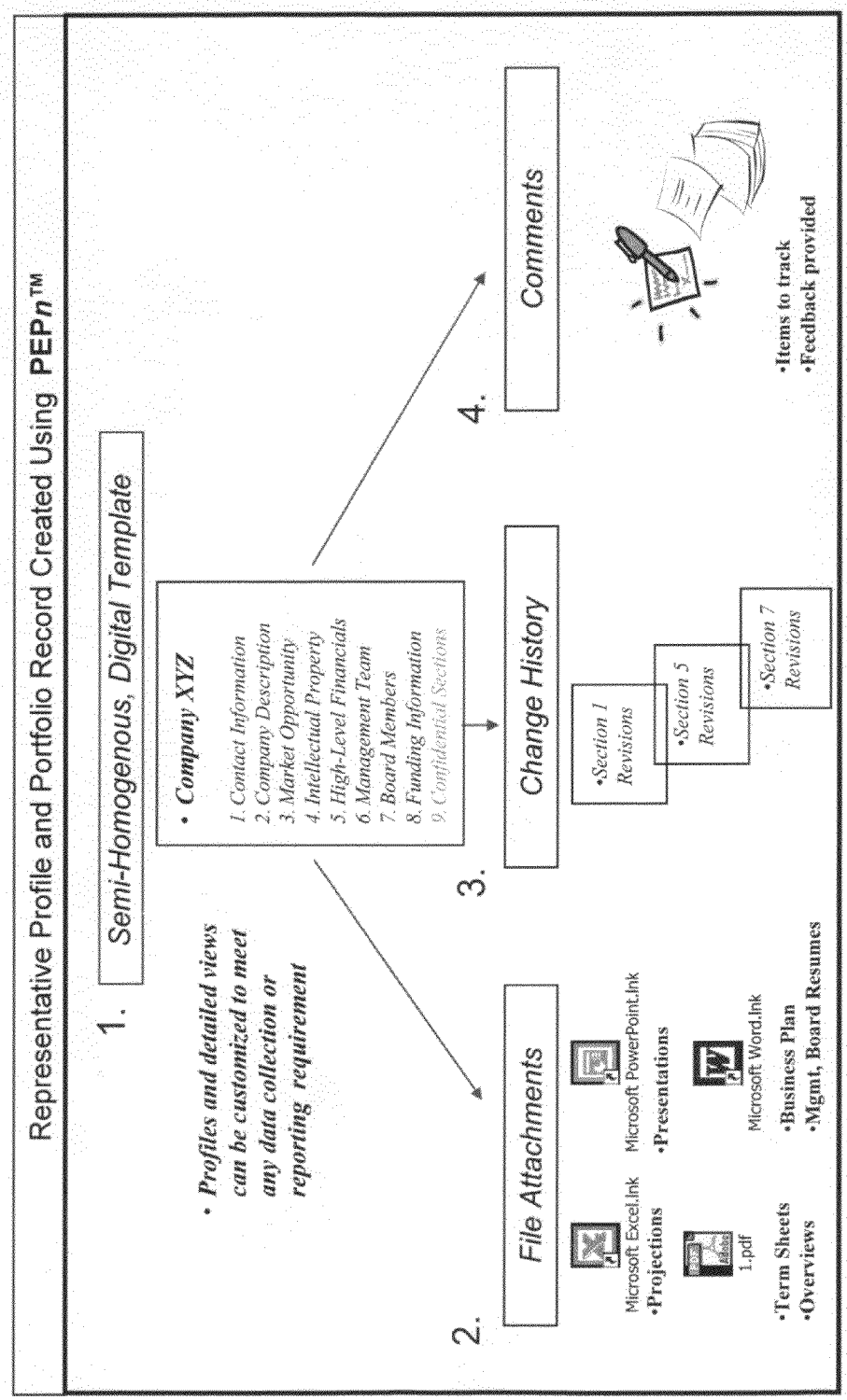
FIG. 13 Major Components of a Profile/Portfolio Record

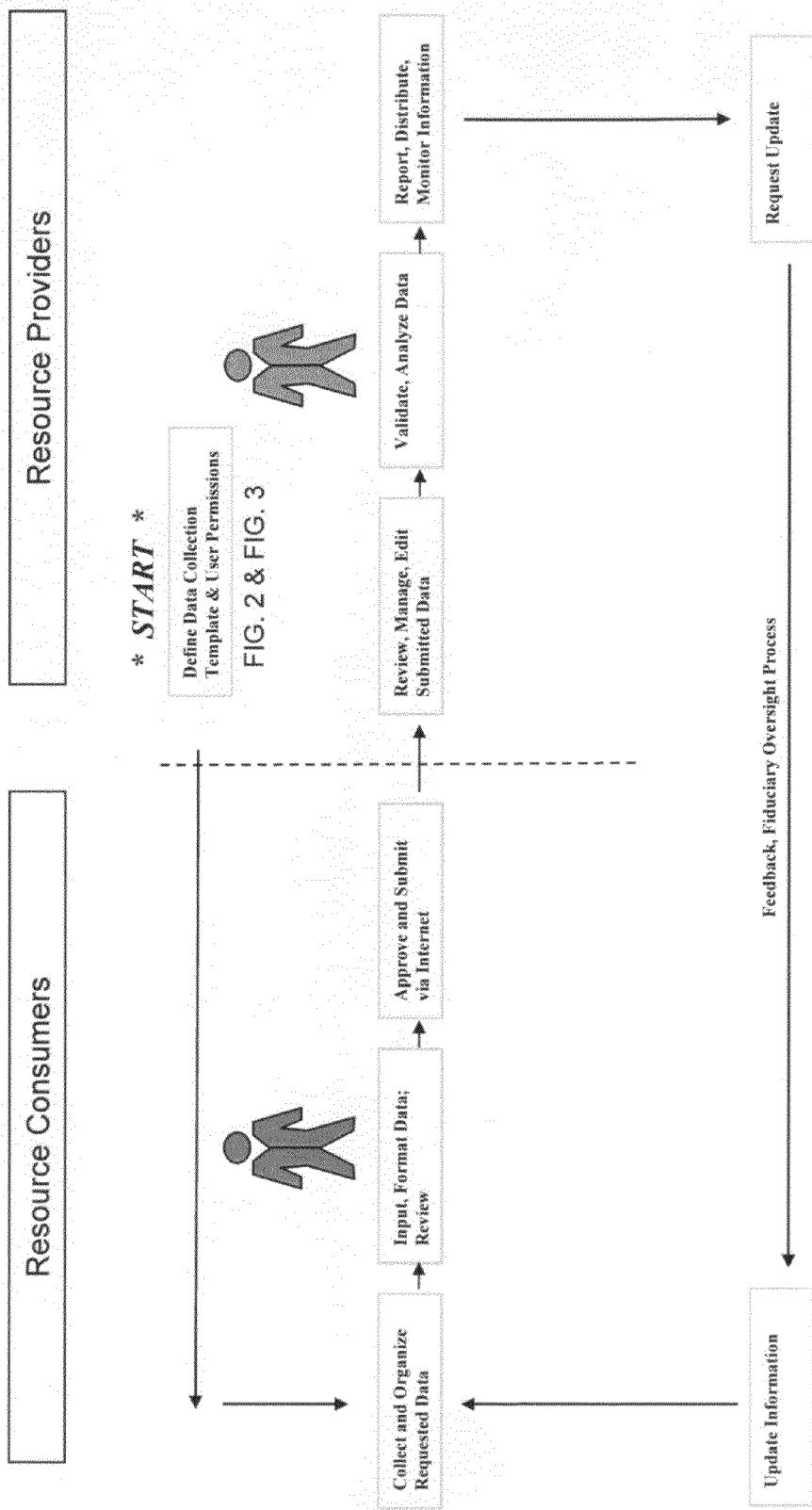
FIG. 14 Streamlined Investment Information Management Enabled by the Invention

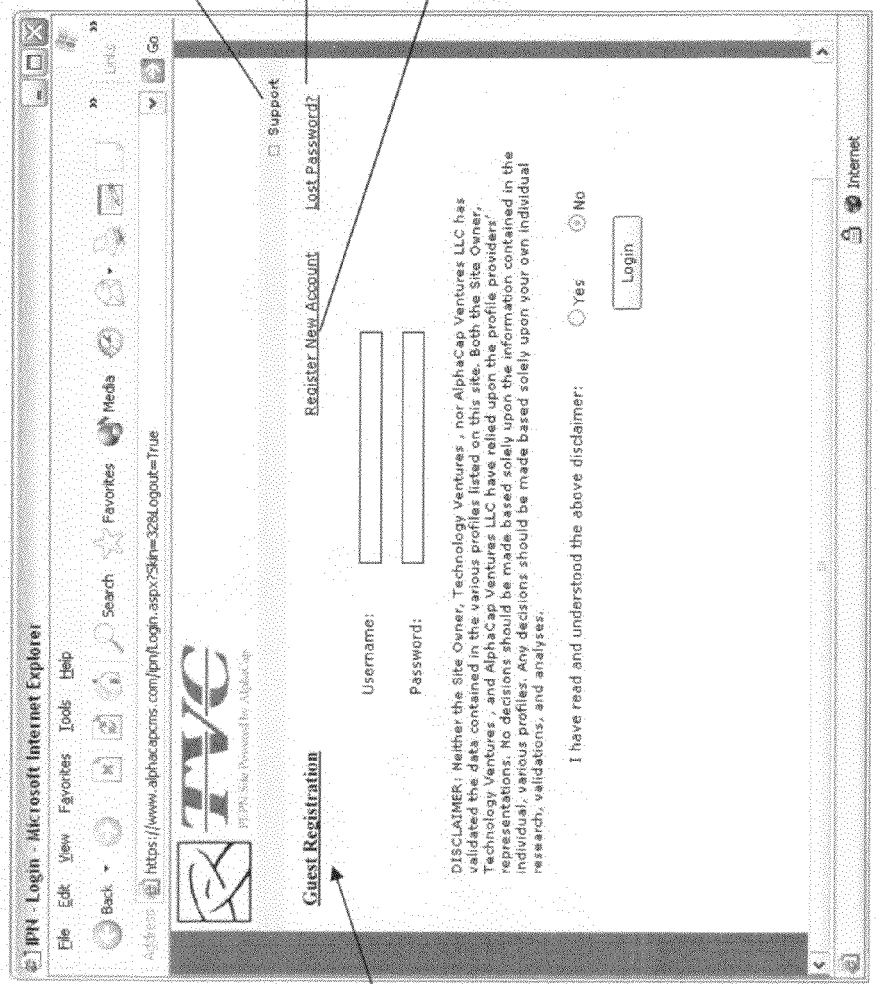
FIG. 15 - Login and New Username/Account Registration Screen Shot

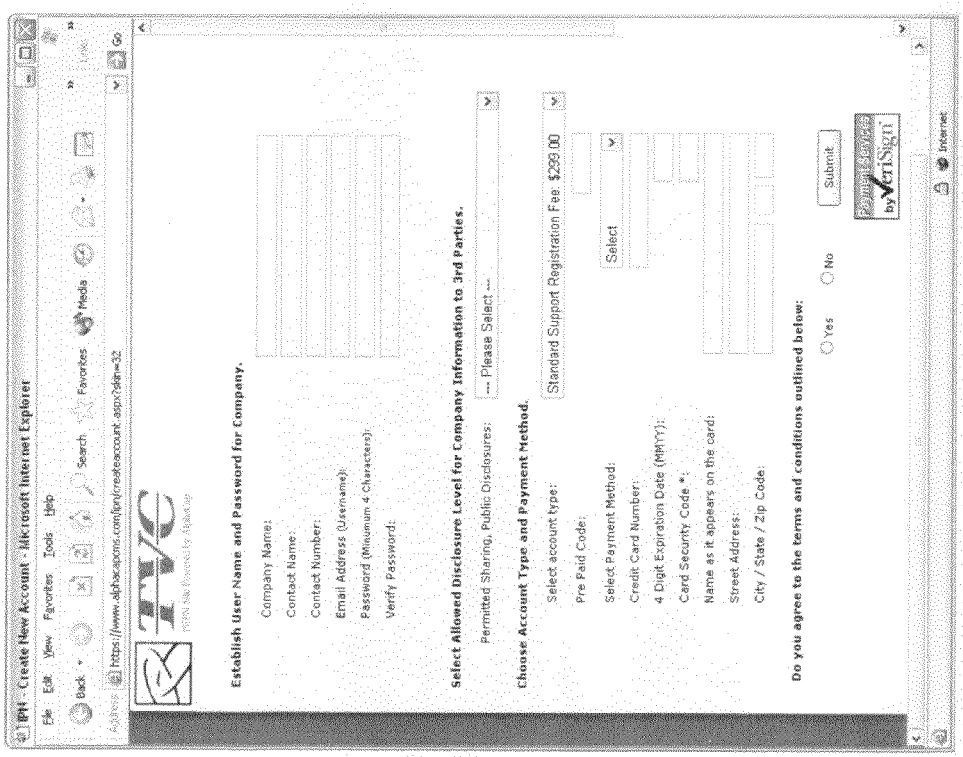
FIG. 16 Consumer Username & Profile Self-Registration Screen Shot

FIG. 17 - Consumer Username and Profile Self-Registration Flow Chart
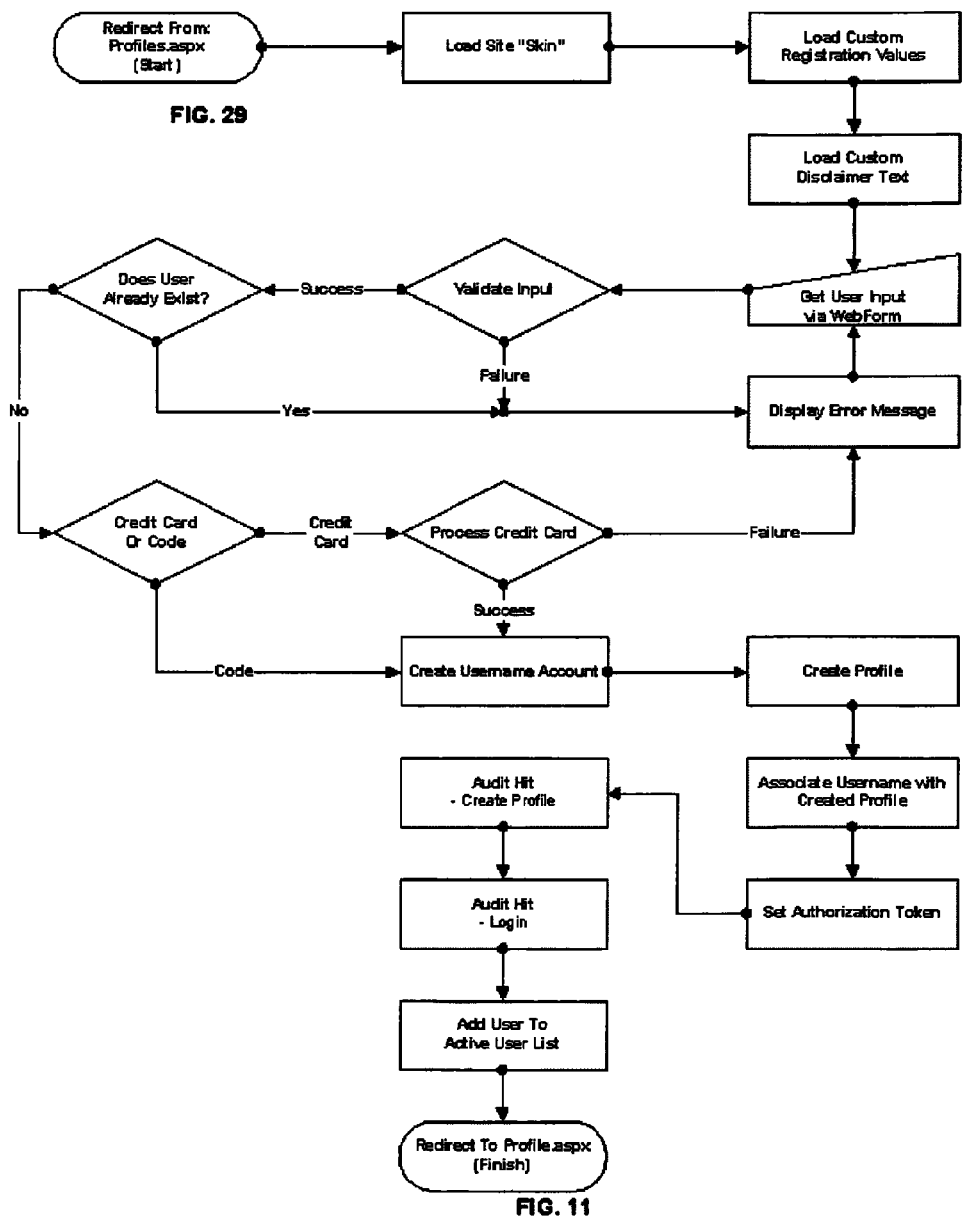

FIG. 18 - Create Profile Flow Chart
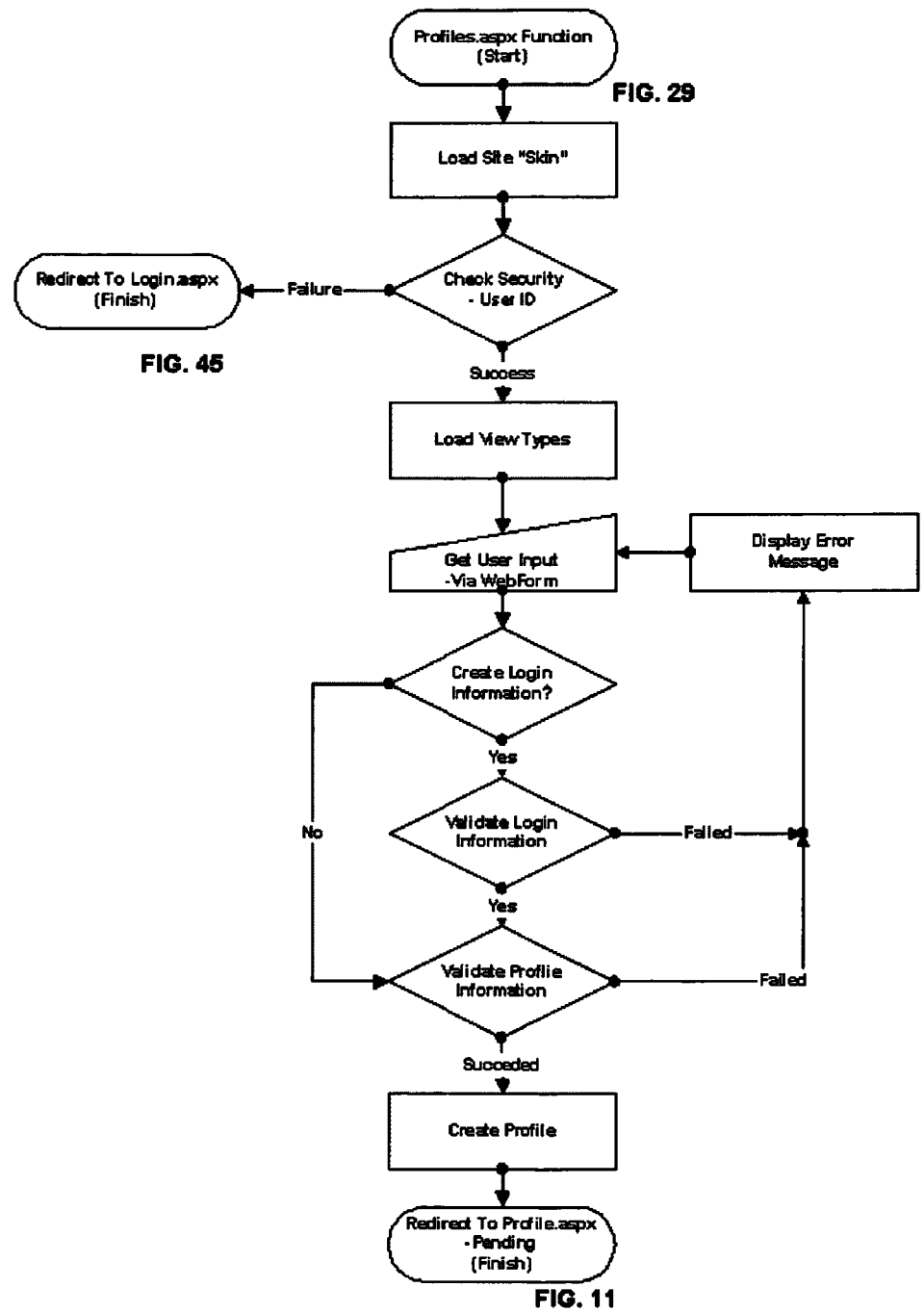

FIG. 19 – Edit Flow Chart
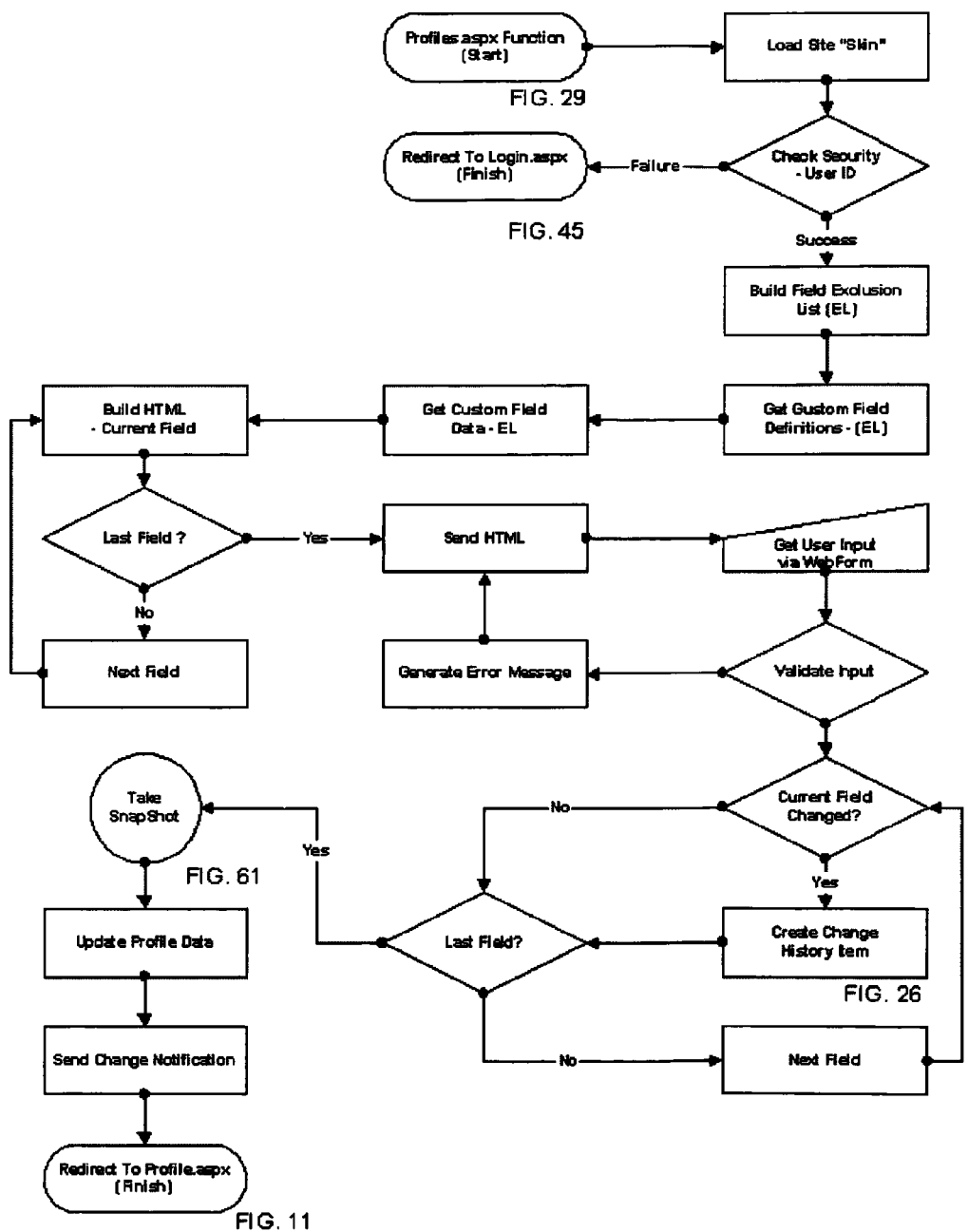

FIG. 20 - File Manager Flow Chart
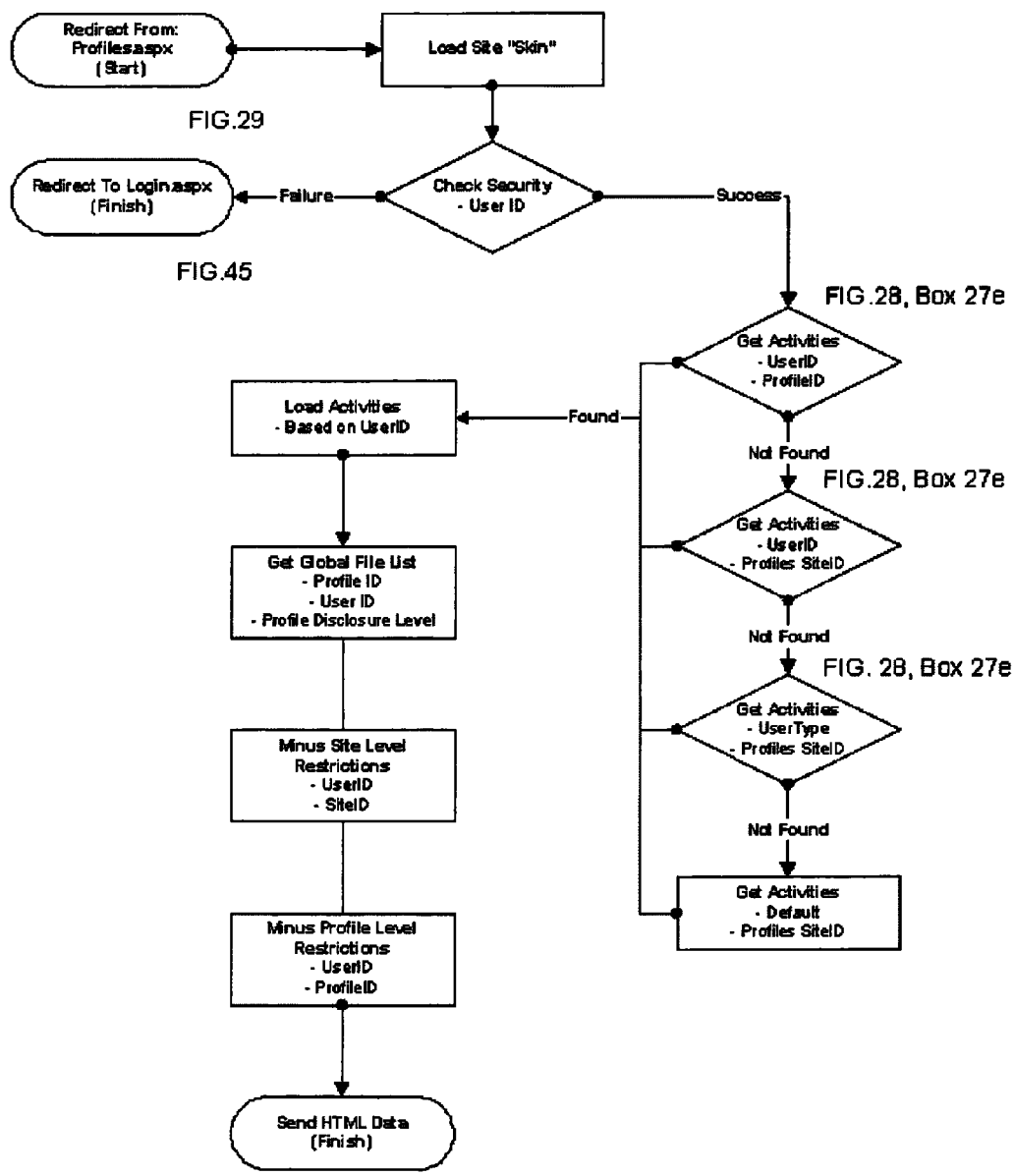

FIG. 21 - Add File Flow Chart
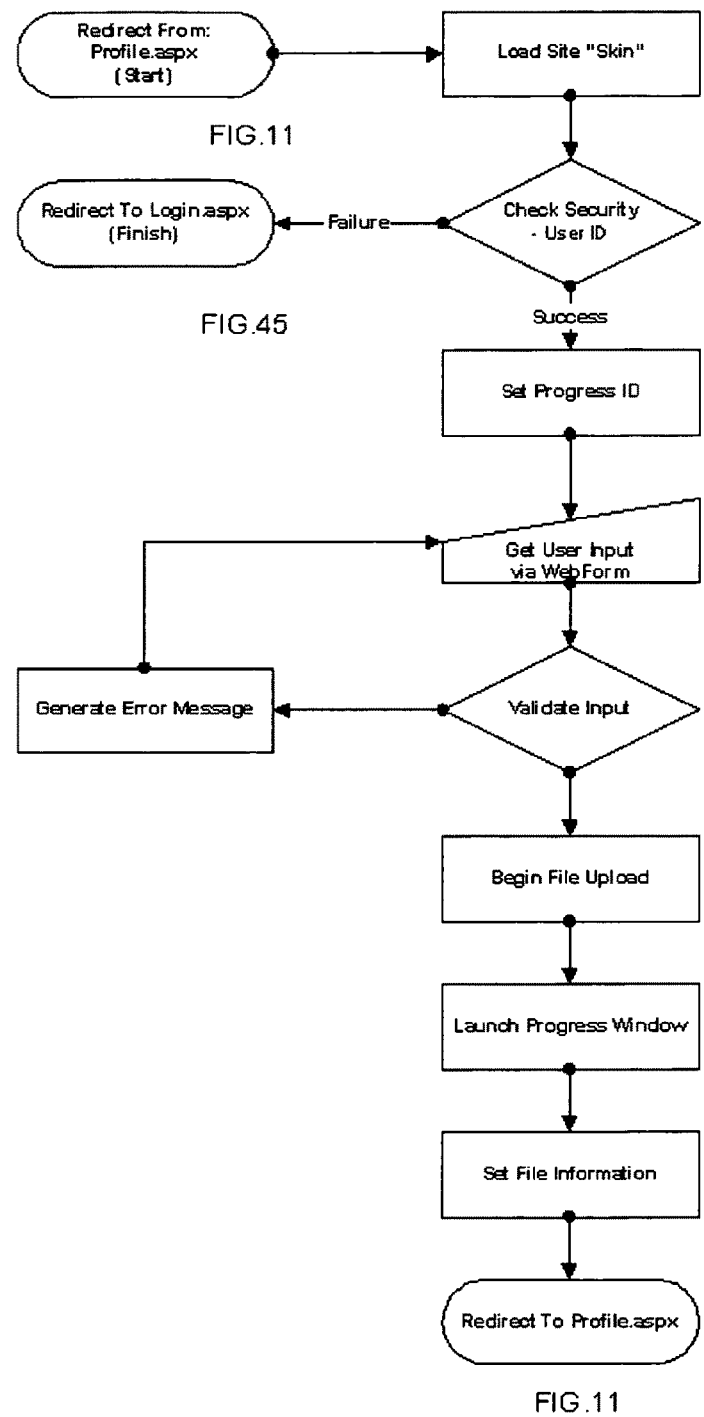

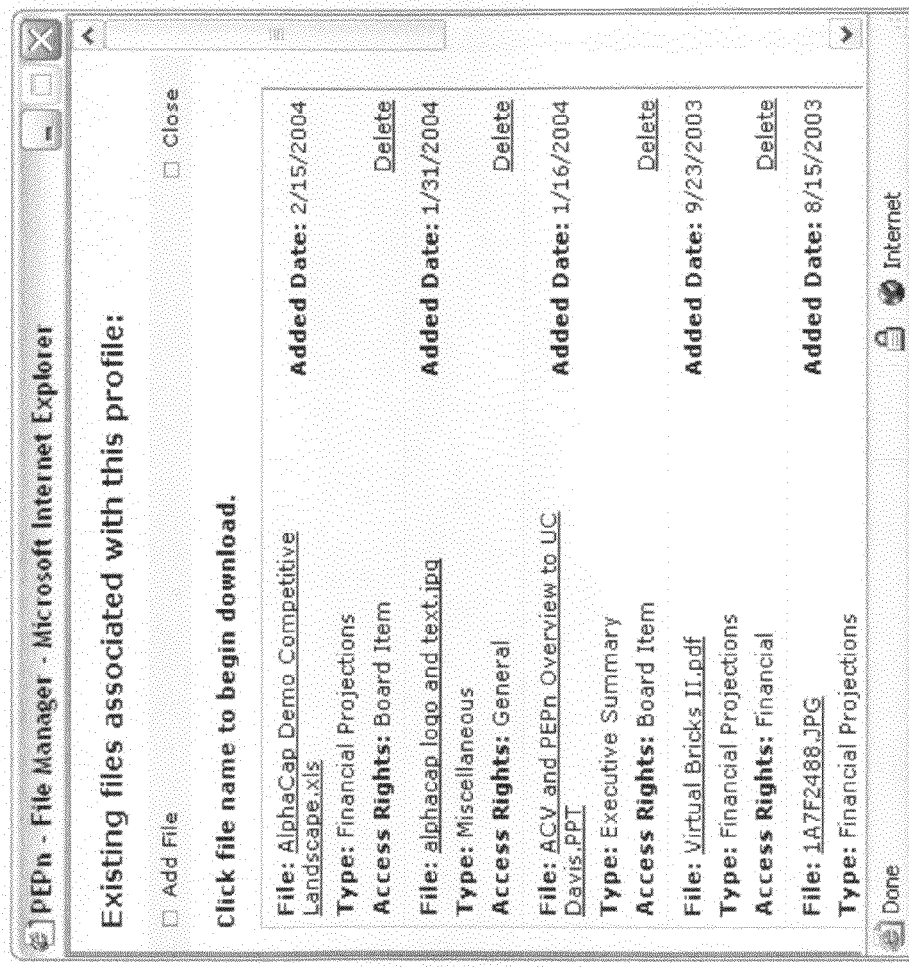
FIG. 22 File Manager Screen Shot

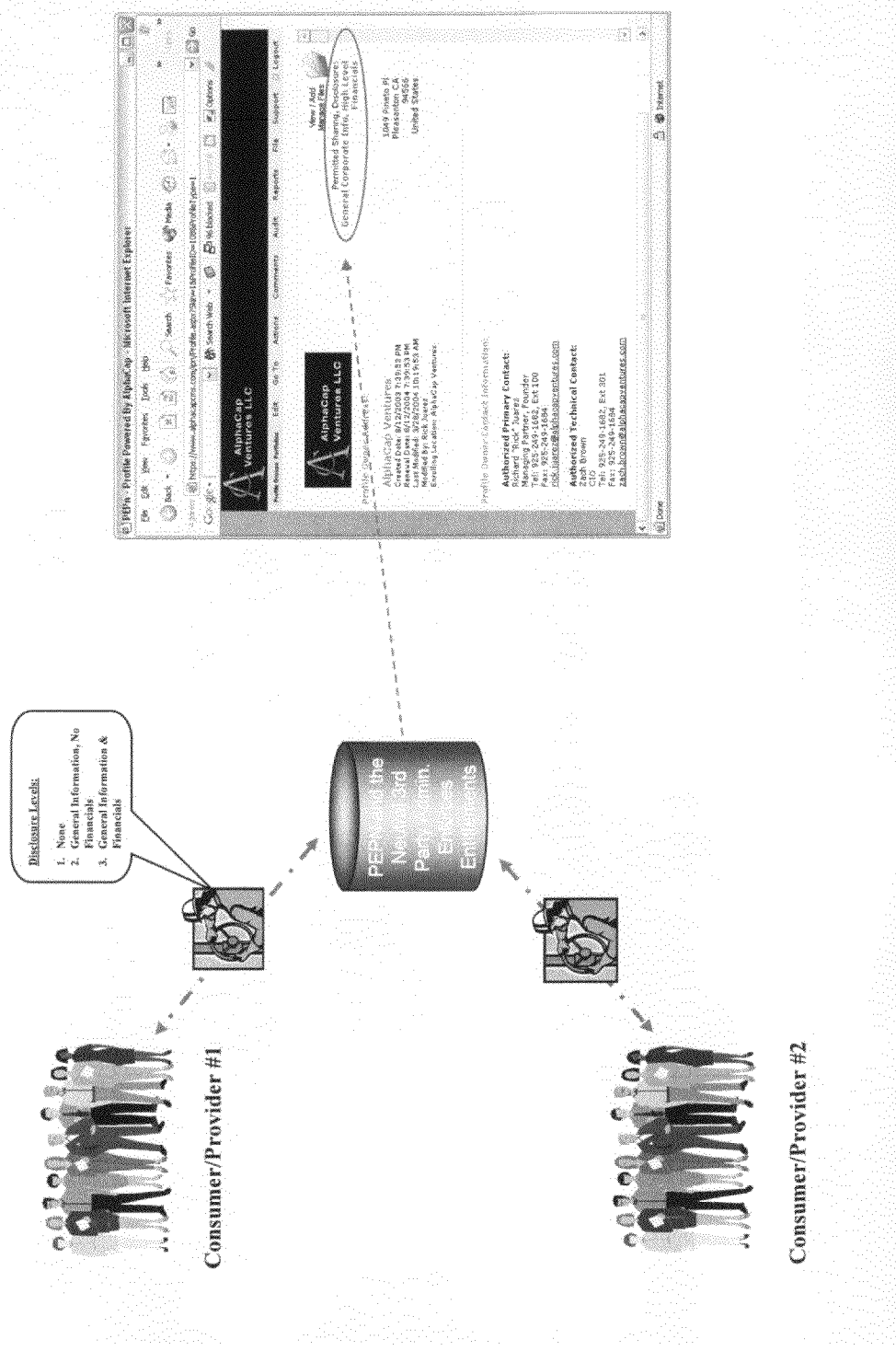
FIG. 23 Flowchart Showing Disclosure Level Procedure

FIG. 24 - Portfolio Summary Flow Chart
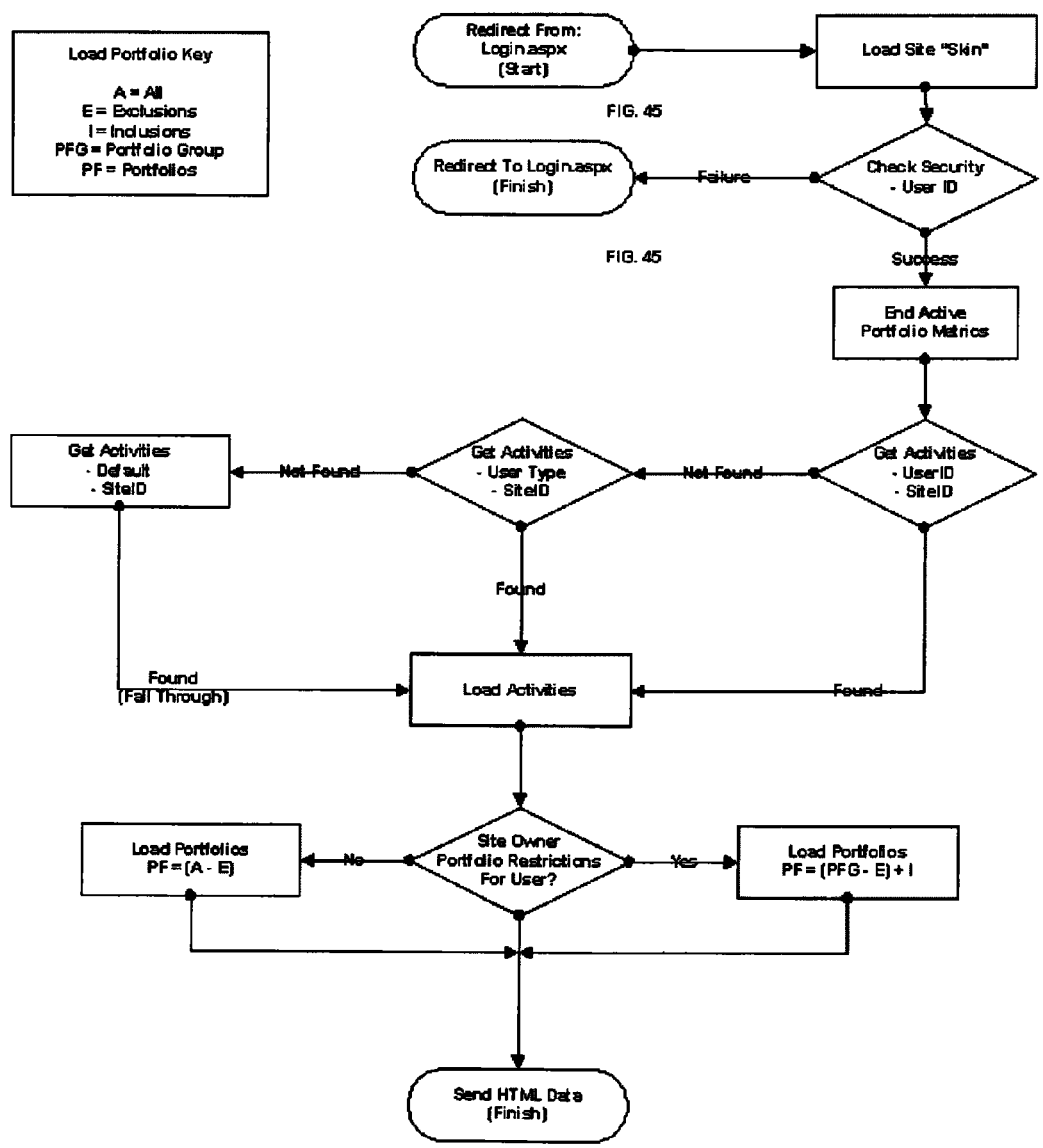

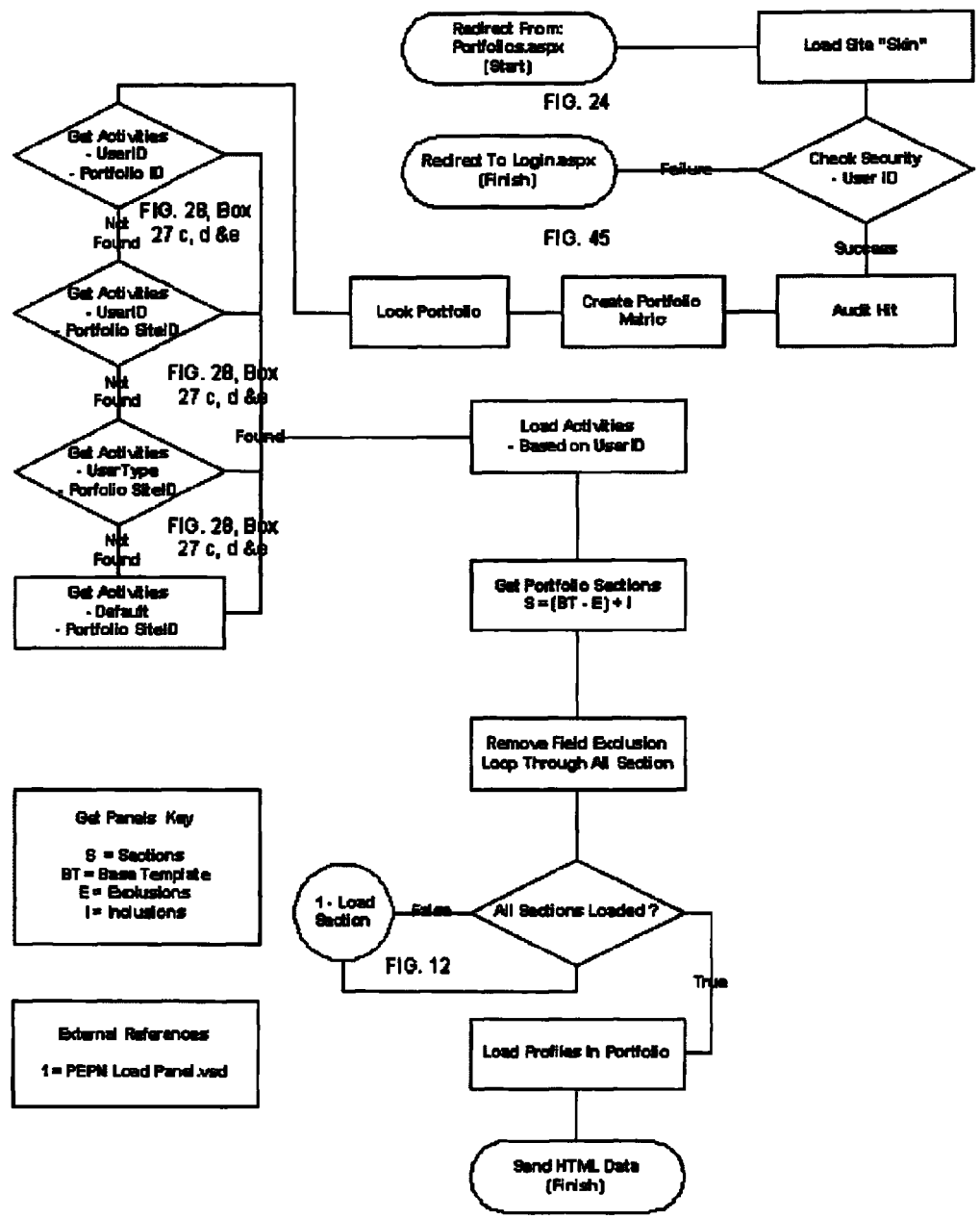
FIG. 25 - Portfolio Detail Flow Chart

FIG. 26 Profile Change History Screen Shots
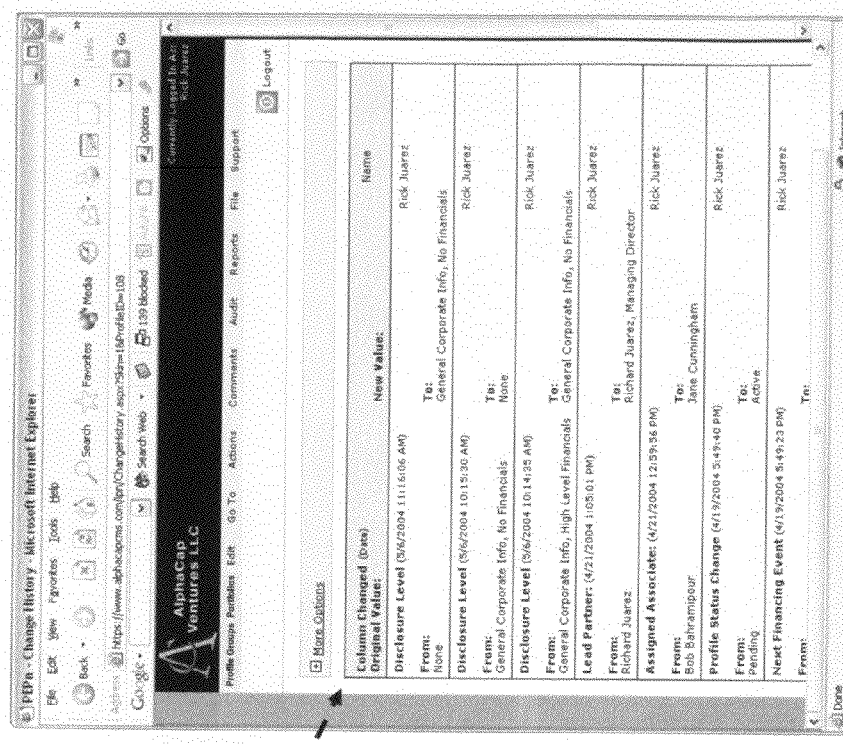
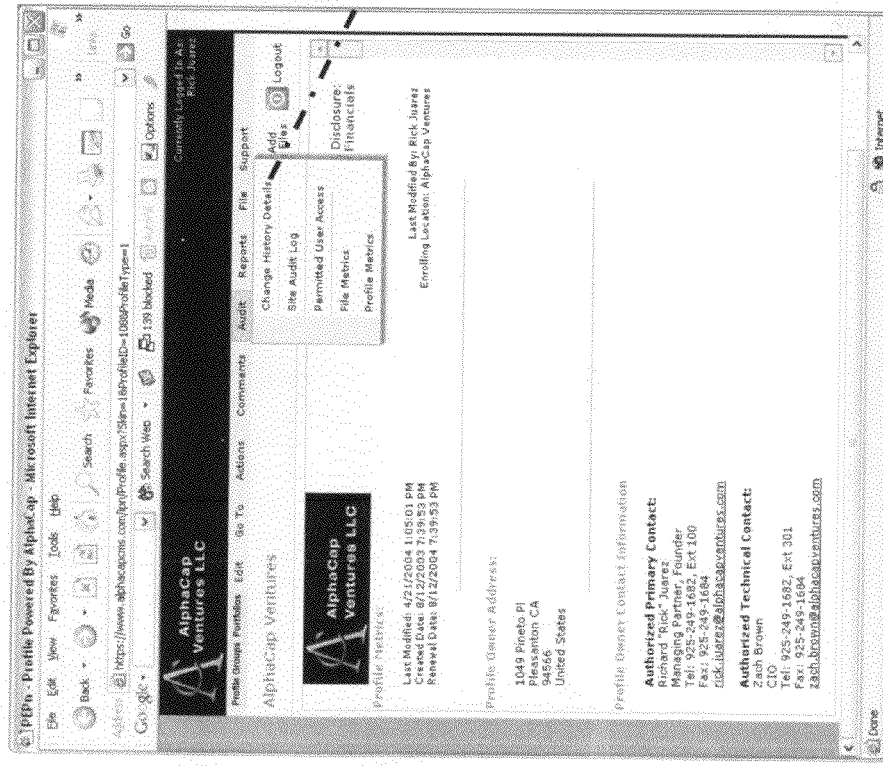

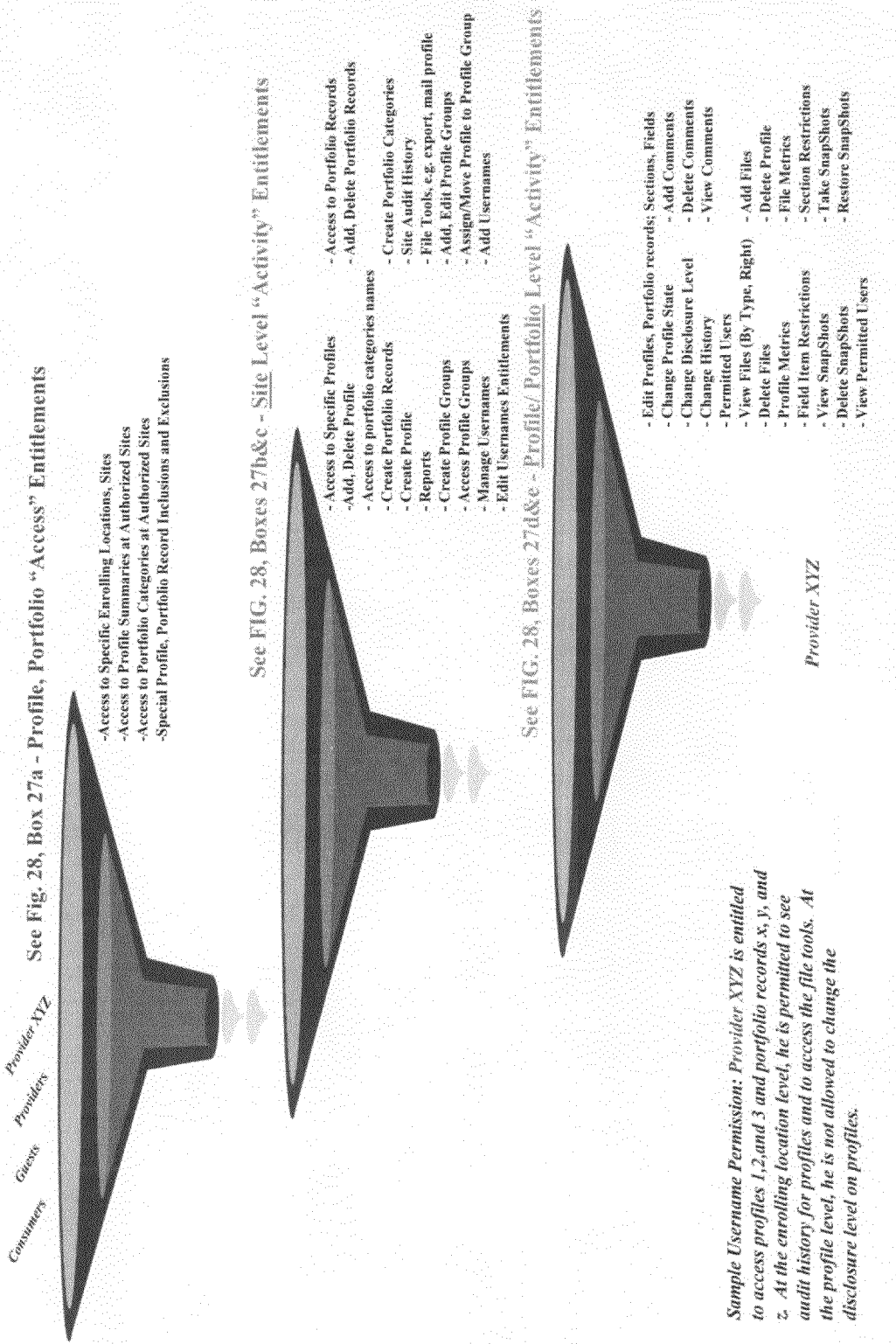

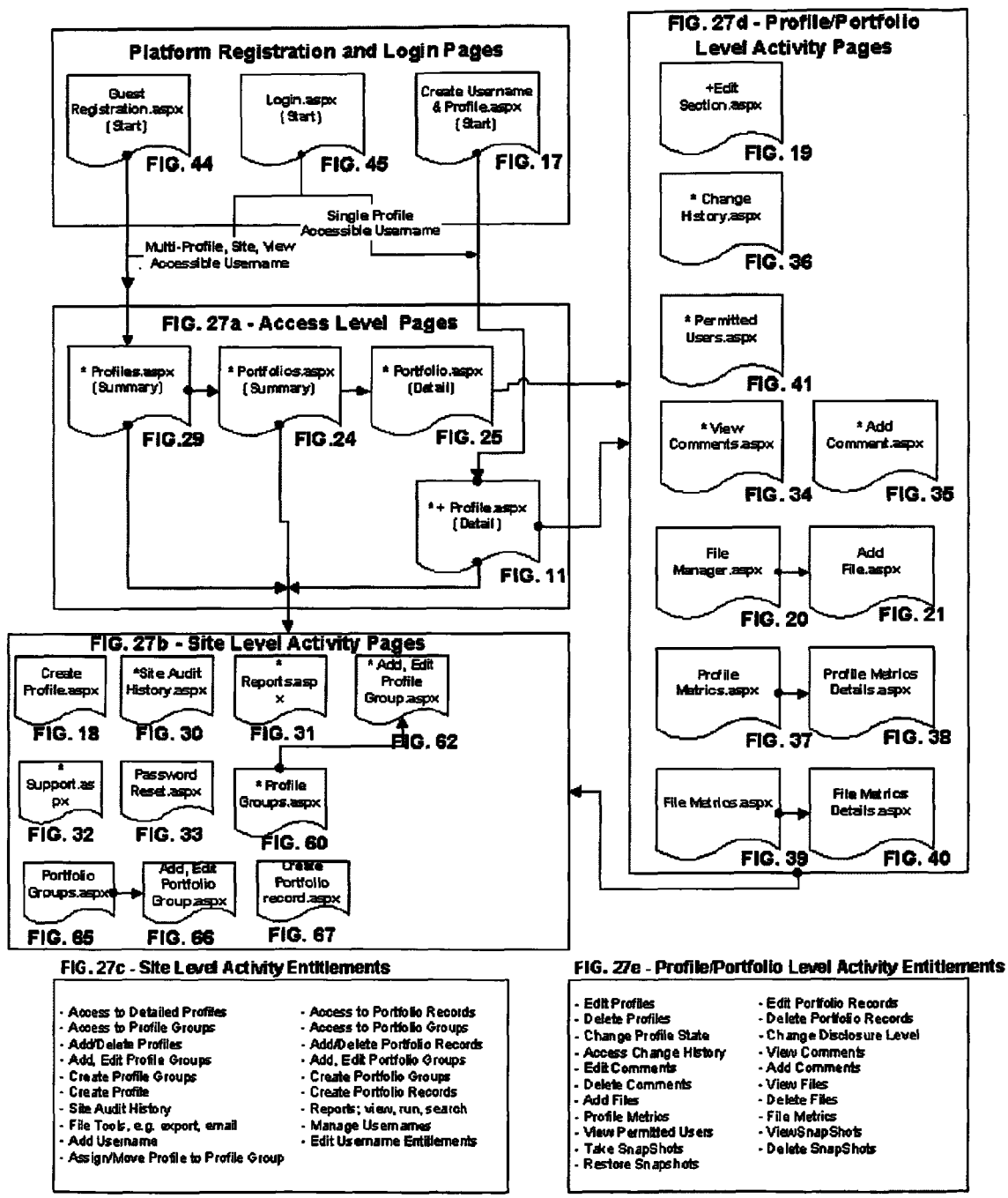
FIG. 28 - Application Site Map Flow Chart

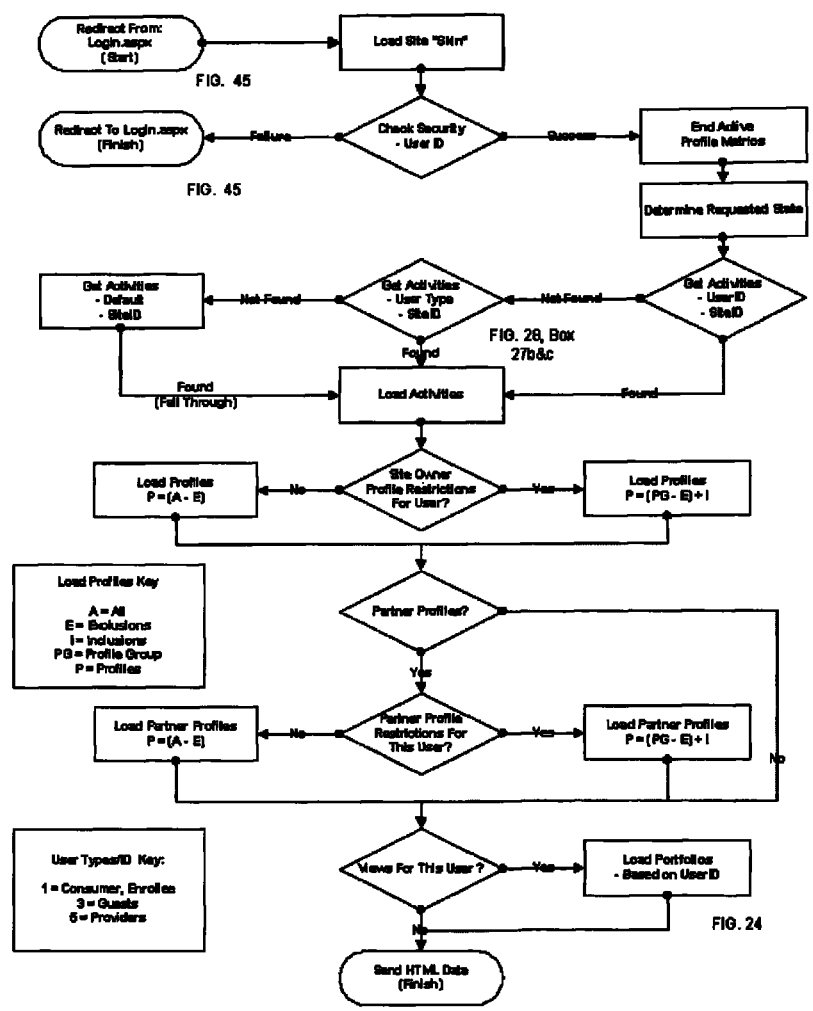
FIG. 29 - Profiles Summary Flow Chart

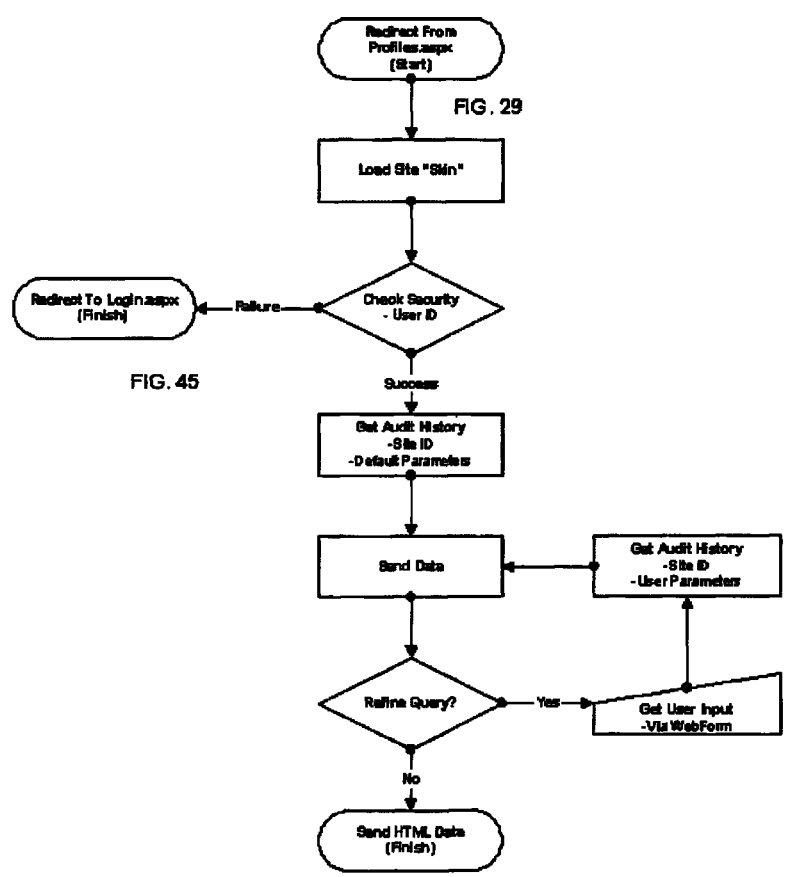
FIG. 30 - Site Audit History Log Flow Chart

FIG. 31 - Report Flow Chart
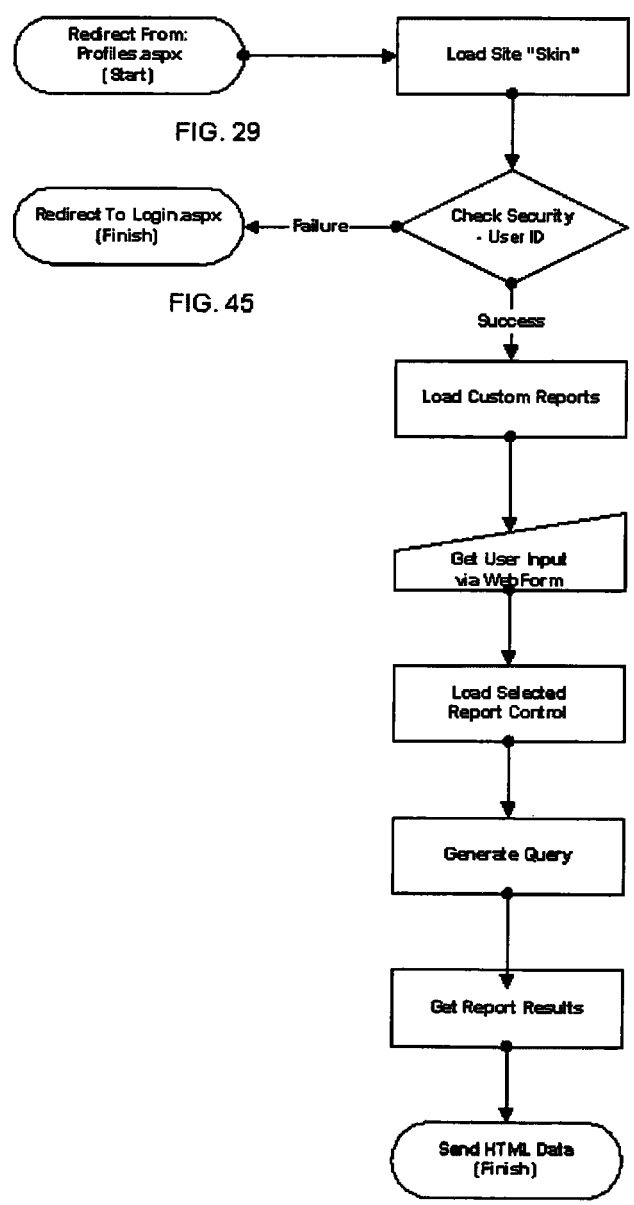

FIG. 32 – Support Flow Chart
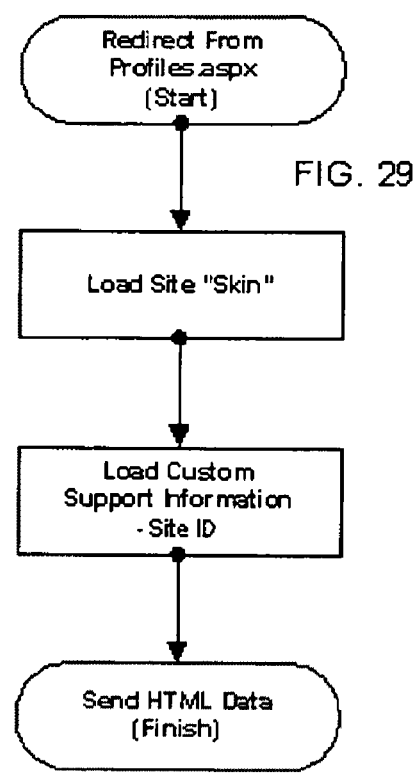

FIG. 33 - Password Reset Flow Chart
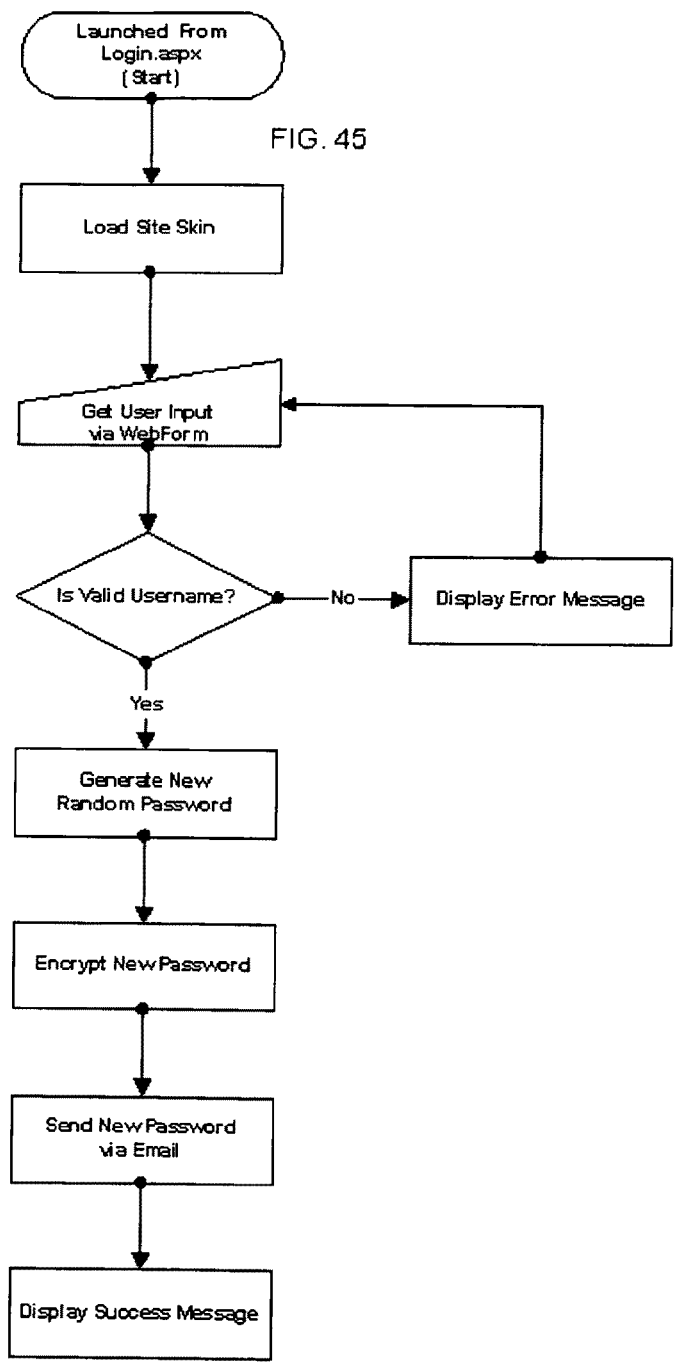

FIG. 34 - View Comments Flow Chart
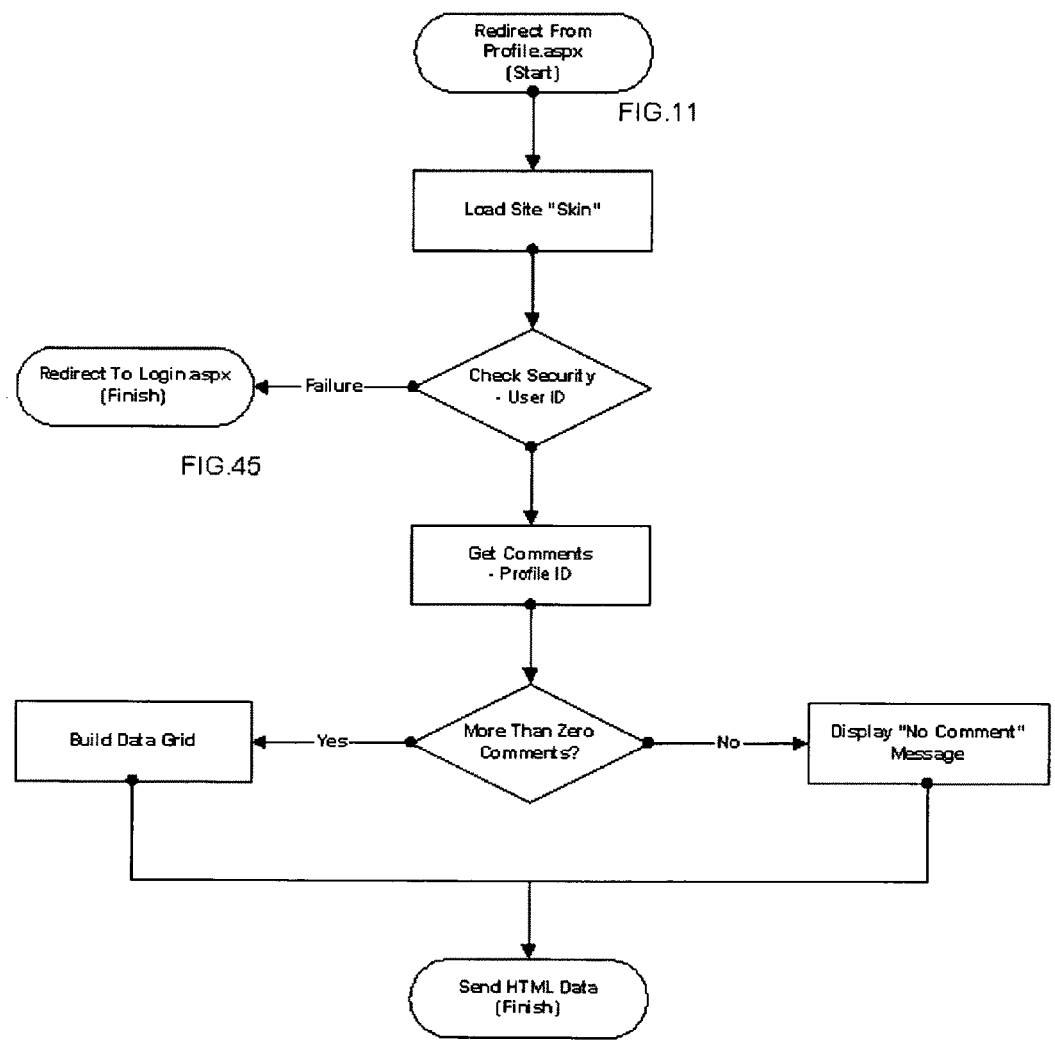

FIG. 35 - Add Comment Flow Chart

FIG. 36 – Change History Log Flow Chart
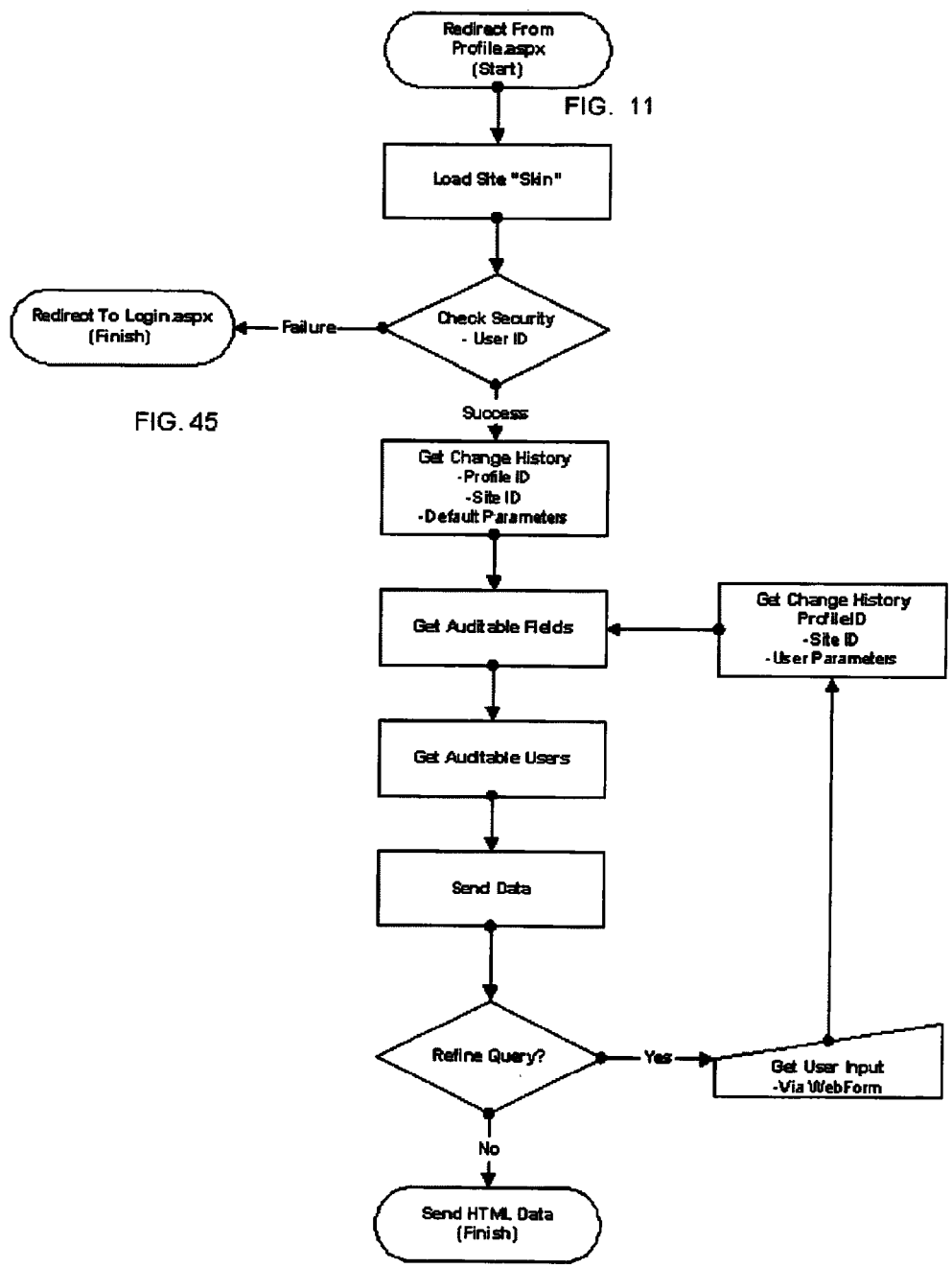

FIG. 37 - Profile Metrics Summary Flow Chart
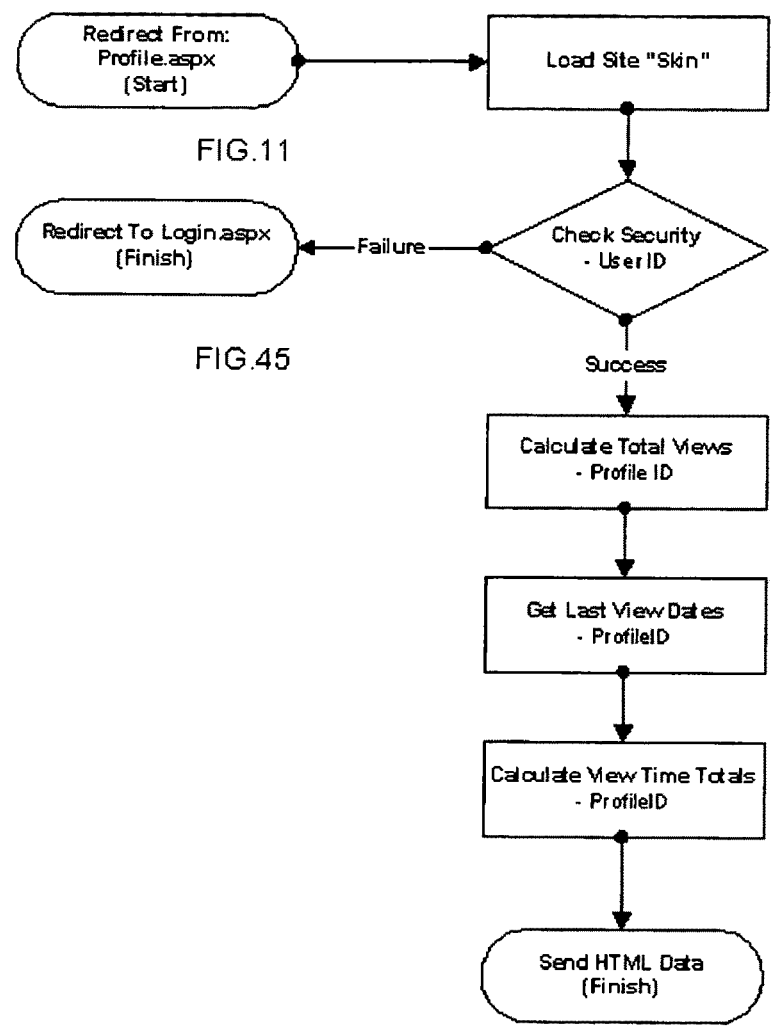

FIG. 38 - Profile Metrics Detail Flow Chart
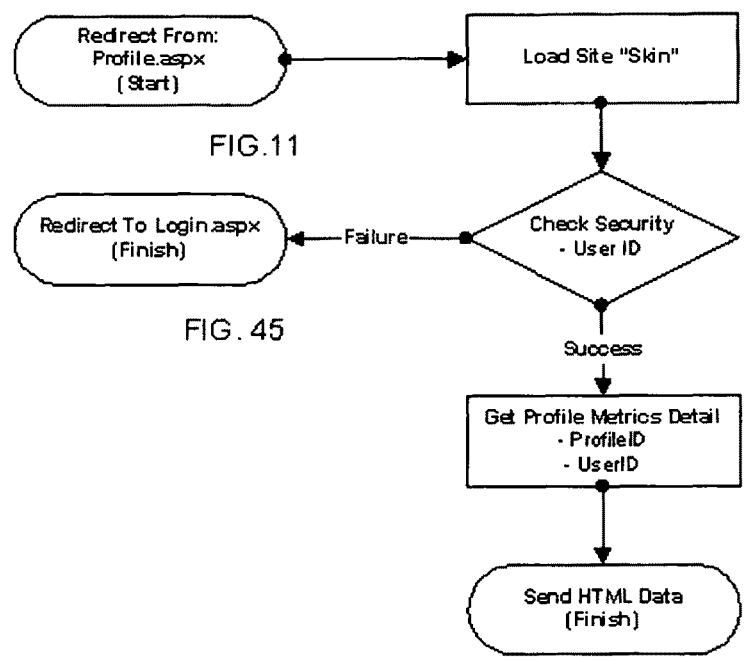

FIG. 39 – File Metrics Summary Flow Chart
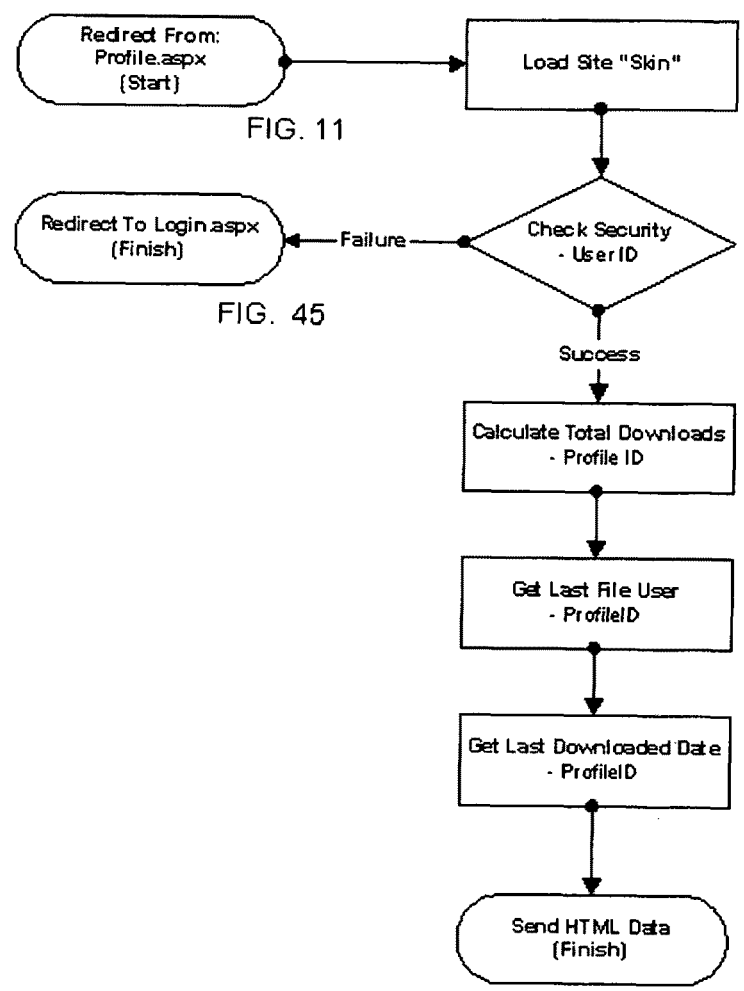

FIG. 40 – File Metrics Detail Flow Chart
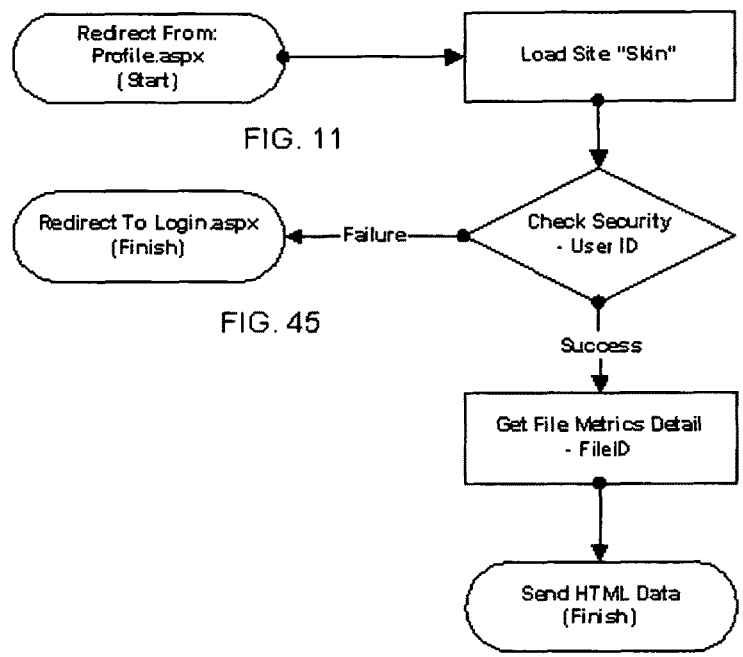

FIG. 41 - Profile Permitted Users Flow Chart
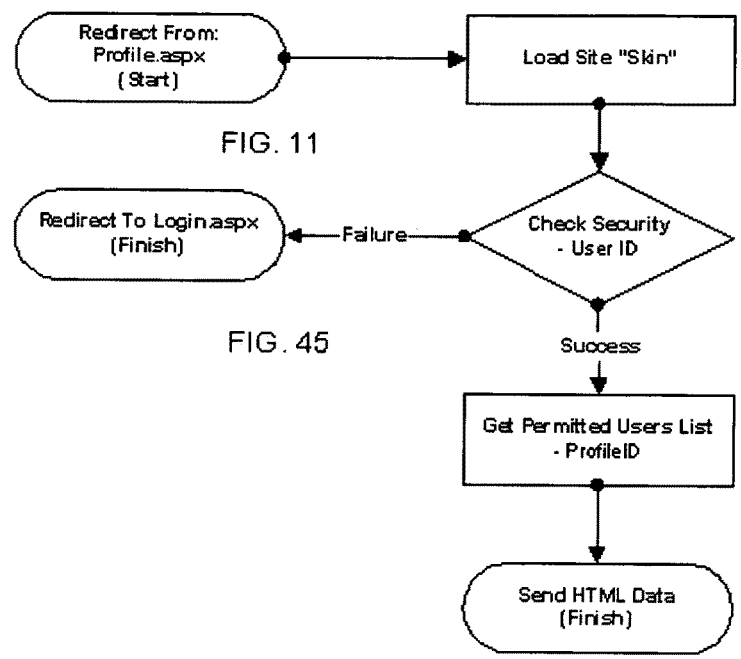

FIG. 42 Representative Permissions for a Single Username

Sample Username Permissions for john@doe.com at his site/enrolling location, i.e. login location

| Internal | Access Permissions | | | | | Activity Permissions | | |
|---|---|---|---|---|---|---|---|---|
| | Profile Access | View Access | Inclusion | Exclusion | Section Access | Data Field Access | Site and Username Activity Permissions | Profile and Username Activity Permissions |
| john@doe.com | All | Software Category Only | N/A | Company IPO | All | All | All | All |

Sample Access and Activity Permissions for john@doe.com for Partner #1 Shared Profiles and Views

| External | Access Permissions | | | | | Activity Permissions | | |
|---|---|---|---|---|---|---|---|---|
| | Profile Access | | Inclusion | Exclusion | Section Access | Data Field Access | Site and Username Activity Permissions | Profile and Username Activity Permissions |
| john@doe.com | Software Industry Only | None | Hardware ABC Company | XYZ Software Company | All | All, except Partner Comments | All except remove access to views | All except, remove global edit and access to change history |

Sample Access and Activity Permissions for john@doe.com for Partner #N Shared Profiles and Views

| External | Access Permissions | | | | | Activity Permissions | | |
|---|---|---|---|---|---|---|---|---|
| | Profile Access | | Inclusion | Exclusion | Section Access | Data Field Access | Site and Username Activity Permissions | Profile and Username Activity Permissions |
| john@doe.com | Acme Company Only | None | None | None | Base Template Sections Only | Remove Valuation from Funding Section | All except remove access to file tools | All except remove ability to change disclosure level |

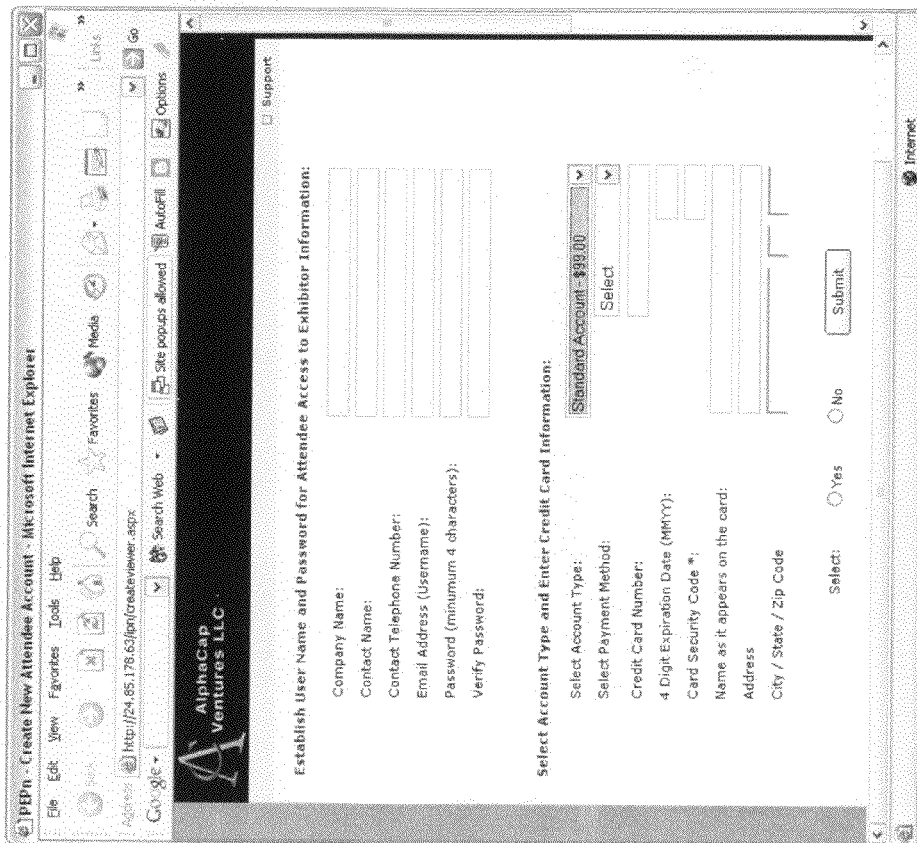
FIG. 43 Guest Username Registration Screen Shot

FIG. 44 - Guest Username Registration Flow Chart

FIG. 45 - Login Flow Chart
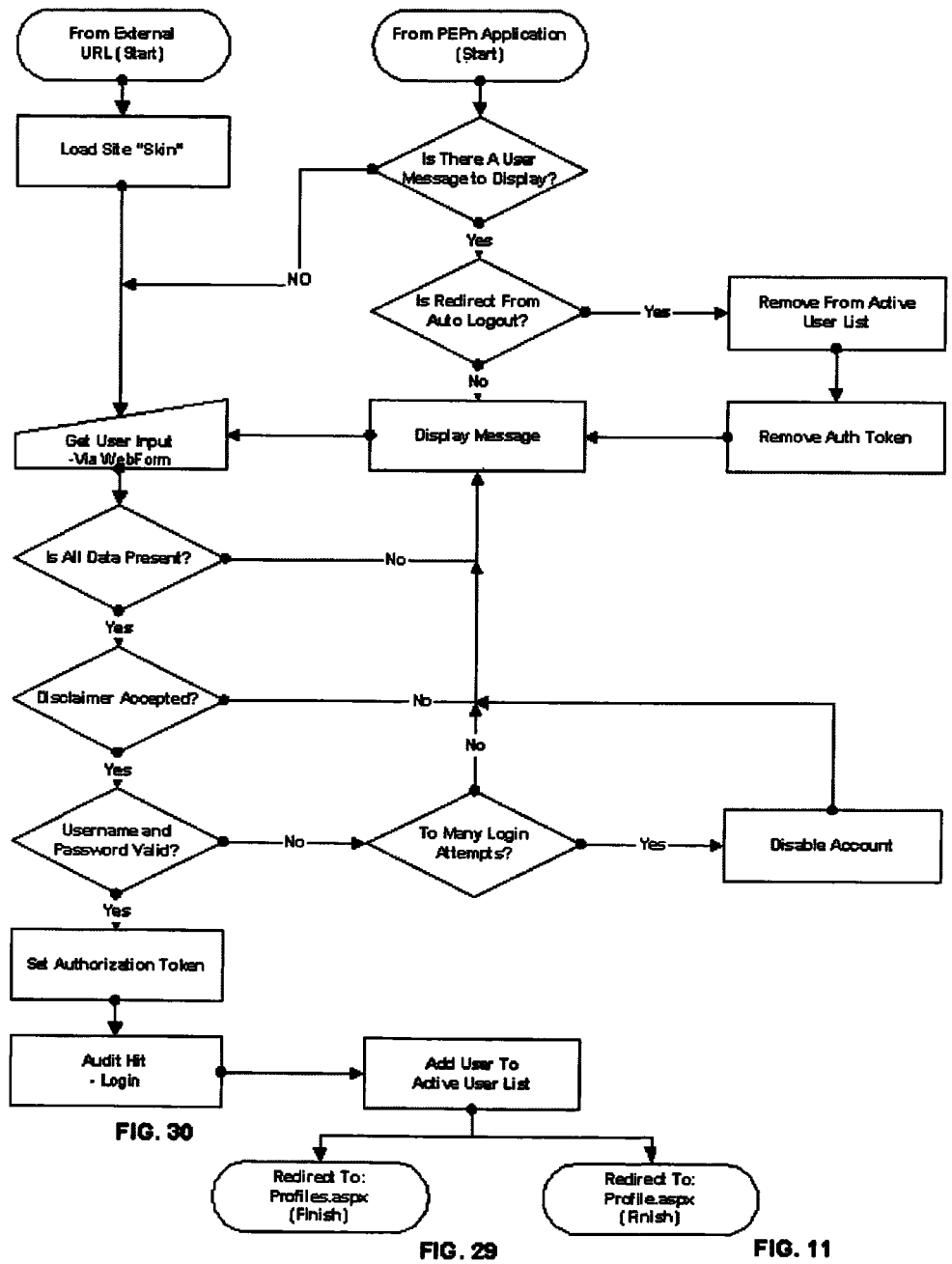

FIG. 46 Site Audit History Log Screen Shot
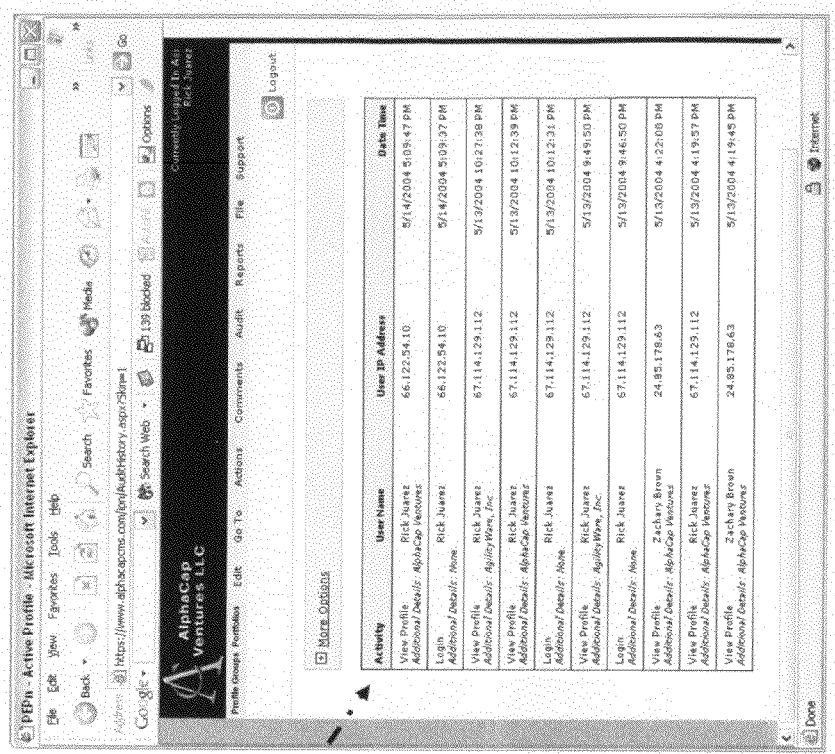
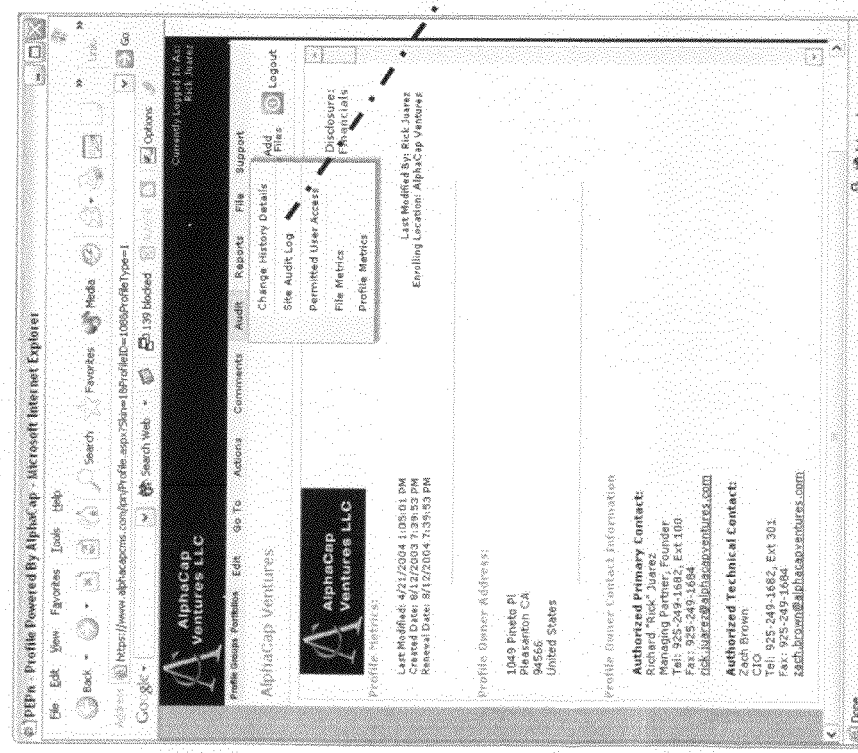

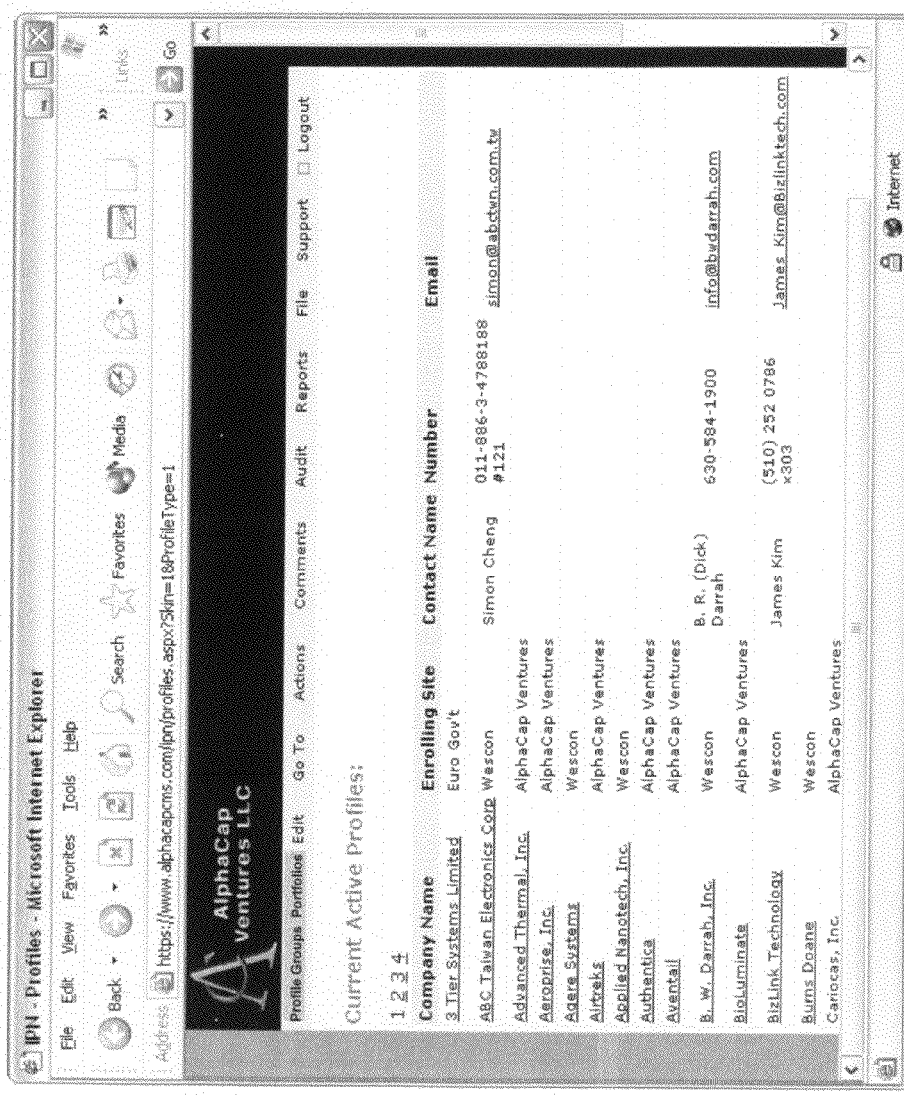
FIG. 47 Summary List of Profiles for a Provider Type Username Screen Shot

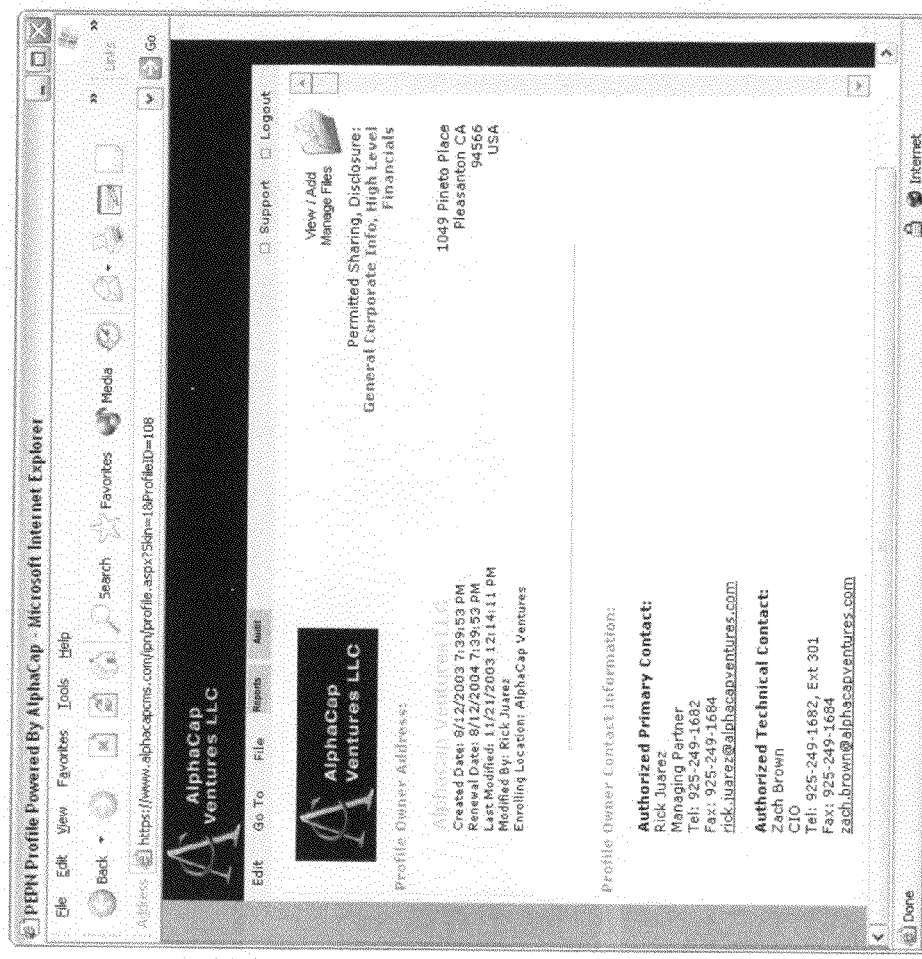
FIG. 48 - Sample Profile for a Consumer Type Username Screen Shot

FIG. 49 Edit Boxes Screen Shots
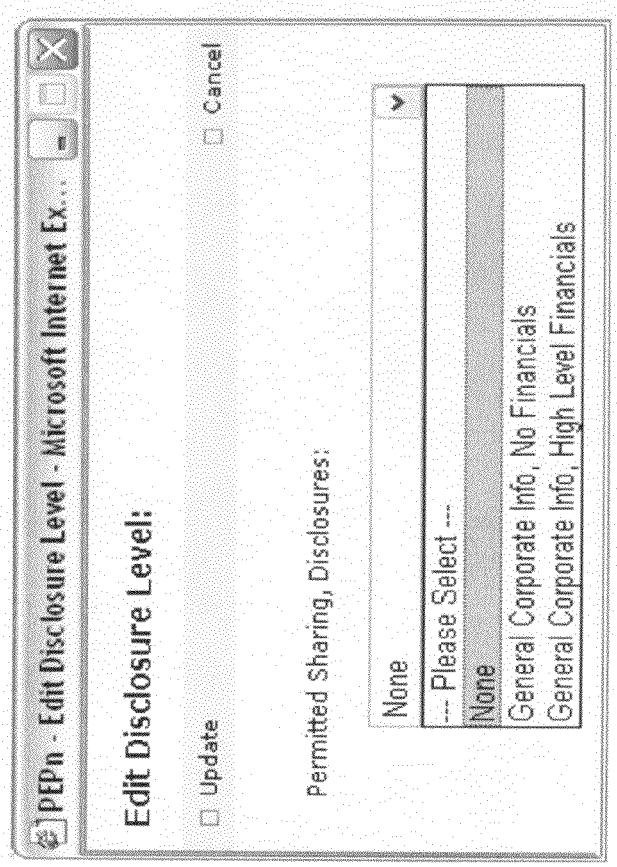
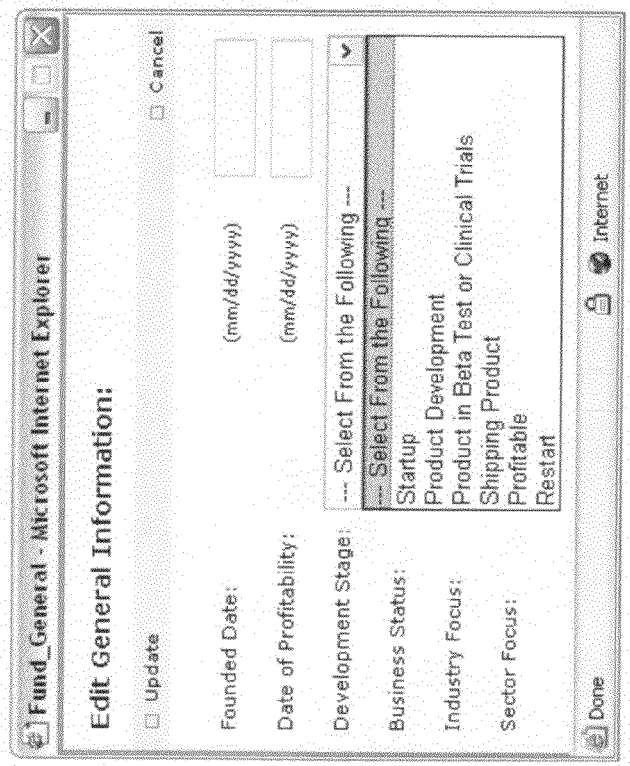

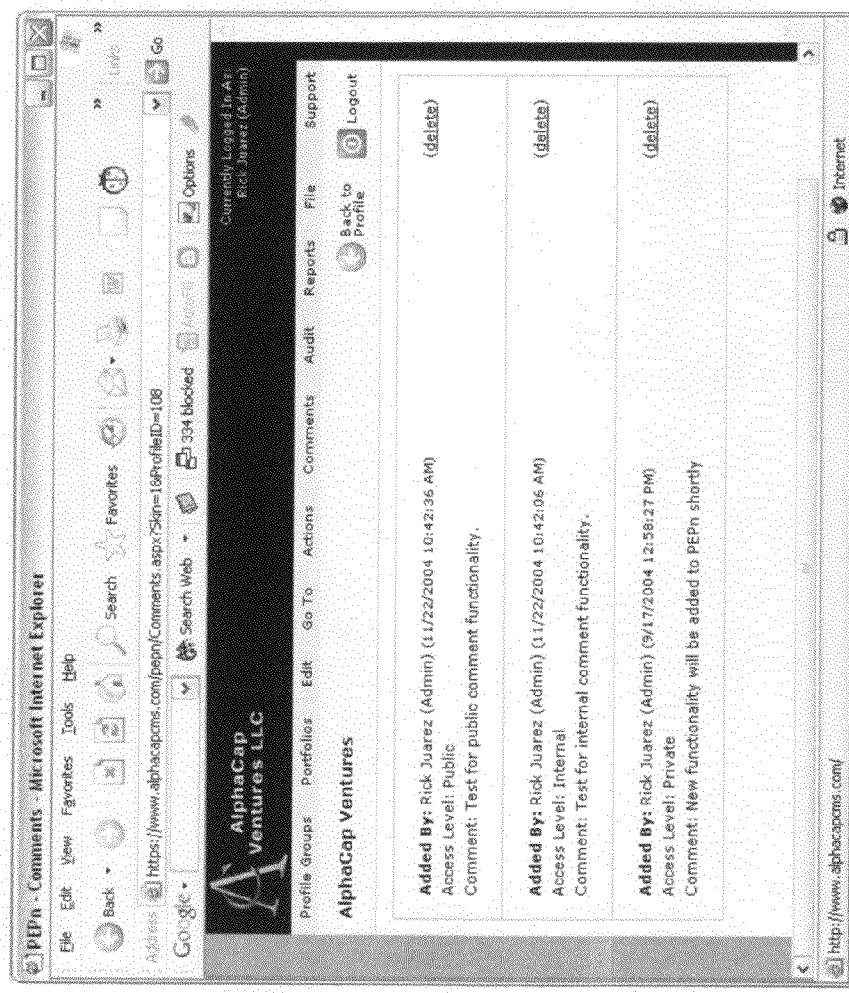
FIG. 50 View Comments Screen Shot

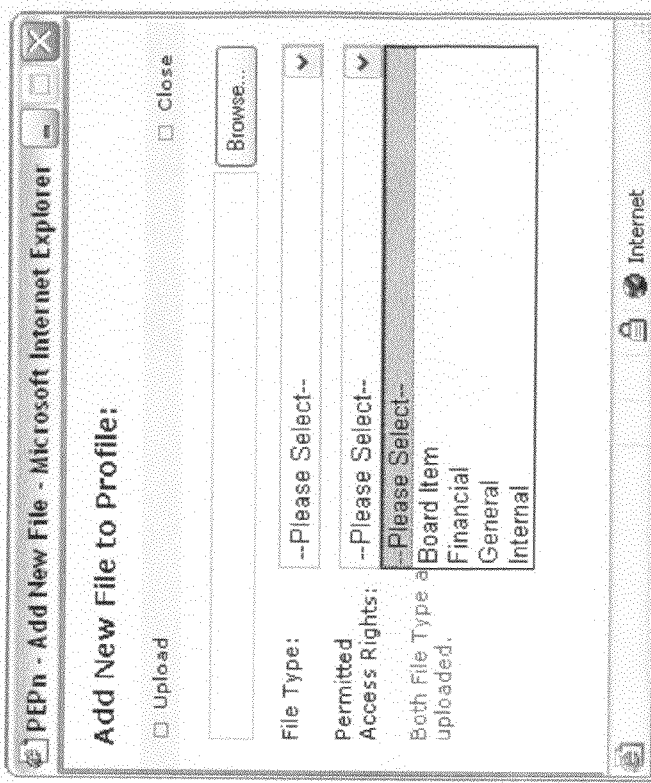
FIG. 51b Access Rights
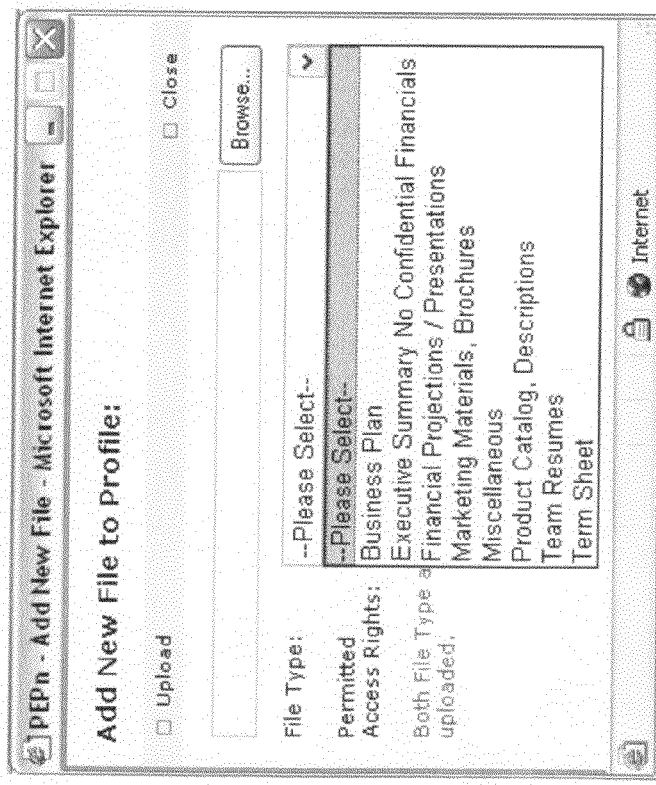
FIG. 51a File Type

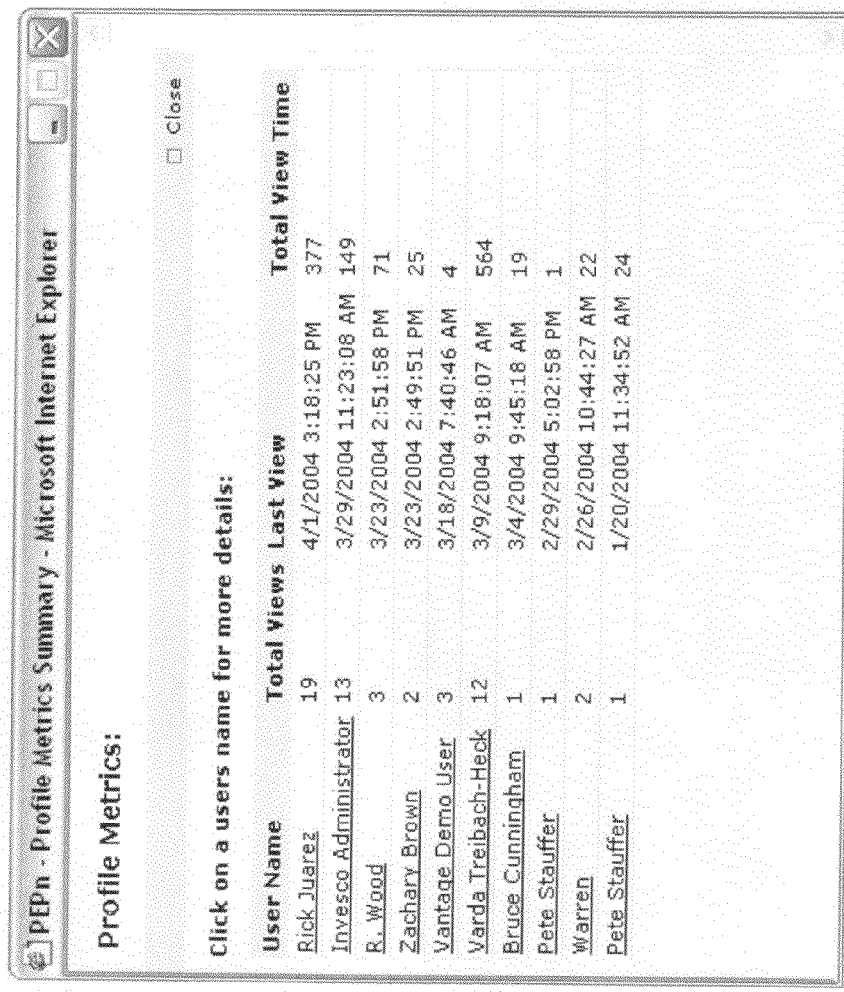
FIG. 52 Profile Metrics Summary Screen Shot

FIG. 53 Profile Metrics Detail Screen Shot

Profile Metrics Details:

☐ Back To Summary  ☐ Close

Usage Details For: Rick Juarez

| View Start | View End | Total Time |
|---|---|---|
| 4/25/2004 9:07:29 PM | 4/25/2004 9:07:29 PM | 0 |
| 4/25/2004 9:04:53 PM | 4/25/2004 9:27:00 PM | 23 |
| 4/22/2004 10:37:47 AM | 4/22/2004 11:37:00 AM | 60 |
| 4/19/2004 9:57:33 PM | 4/19/2004 10:03:36 PM | 6 |
| 4/14/2004 7:31:10 PM | 4/14/2004 8:12:01 PM | 41 |
| 4/11/2004 8:25:01 PM | 4/11/2004 8:51:00 PM | 26 |
| 4/7/2004 3:04:44 PM | 4/7/2004 3:46:01 PM | 42 |
| 4/7/2004 2:02:35 PM | 4/7/2004 2:03:05 PM | 1 |
| 4/7/2004 1:52:51 PM | 4/7/2004 1:53:41 PM | 1 |
| 4/4/2004 12:36:44 PM | 4/4/2004 3:31:00 PM | 175 |
| 4/2/2004 10:23:52 PM | 4/2/2004 10:45:01 PM | 22 |
| 4/2/2004 7:35:51 PM | 4/2/2004 8:18:00 PM | 43 |
| 4/2/2004 7:22:52 PM | 4/2/2004 7:59:00 PM | 37 |
| 4/1/2004 11:59:28 AM | 4/1/2004 12:21:00 PM | 22 |
| 4/1/2004 9:36:59 PM | 4/1/2004 10:01:00 PM | 25 |
| 4/1/2004 3:22:13 PM | 4/1/2004 4:22:57 PM | 60 |

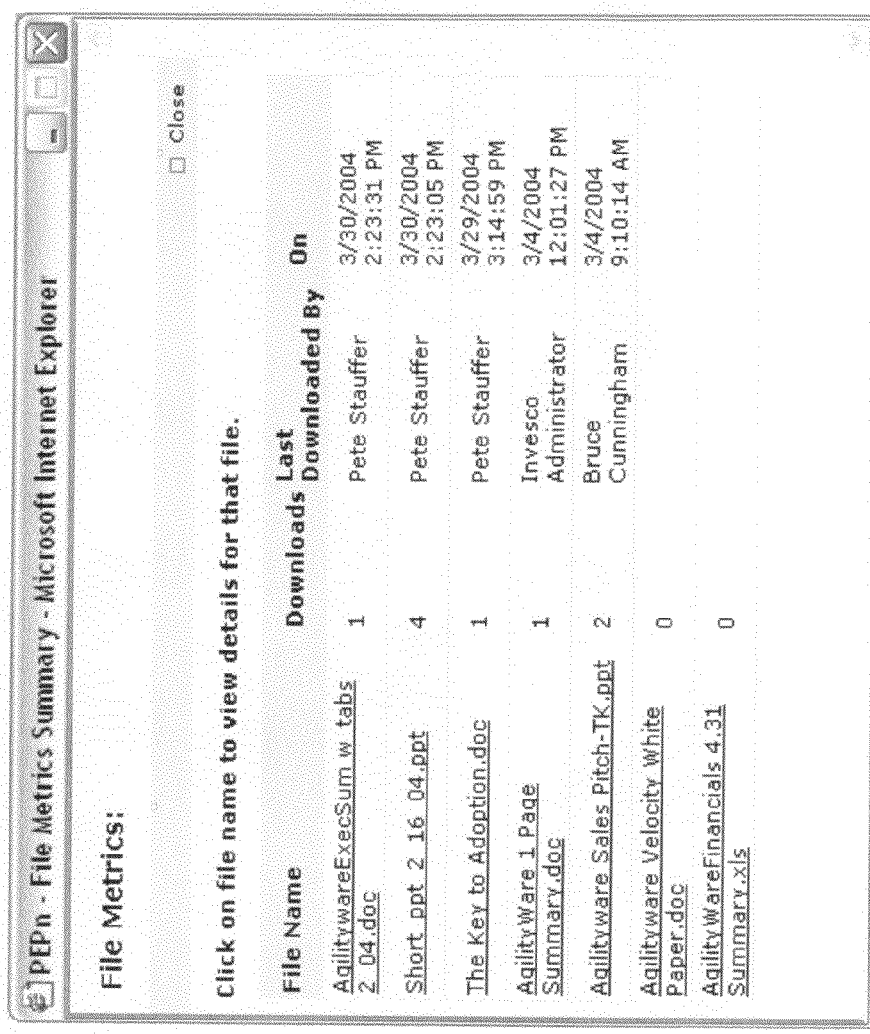
FIG. 54 File Metrics Summary Screen Shot

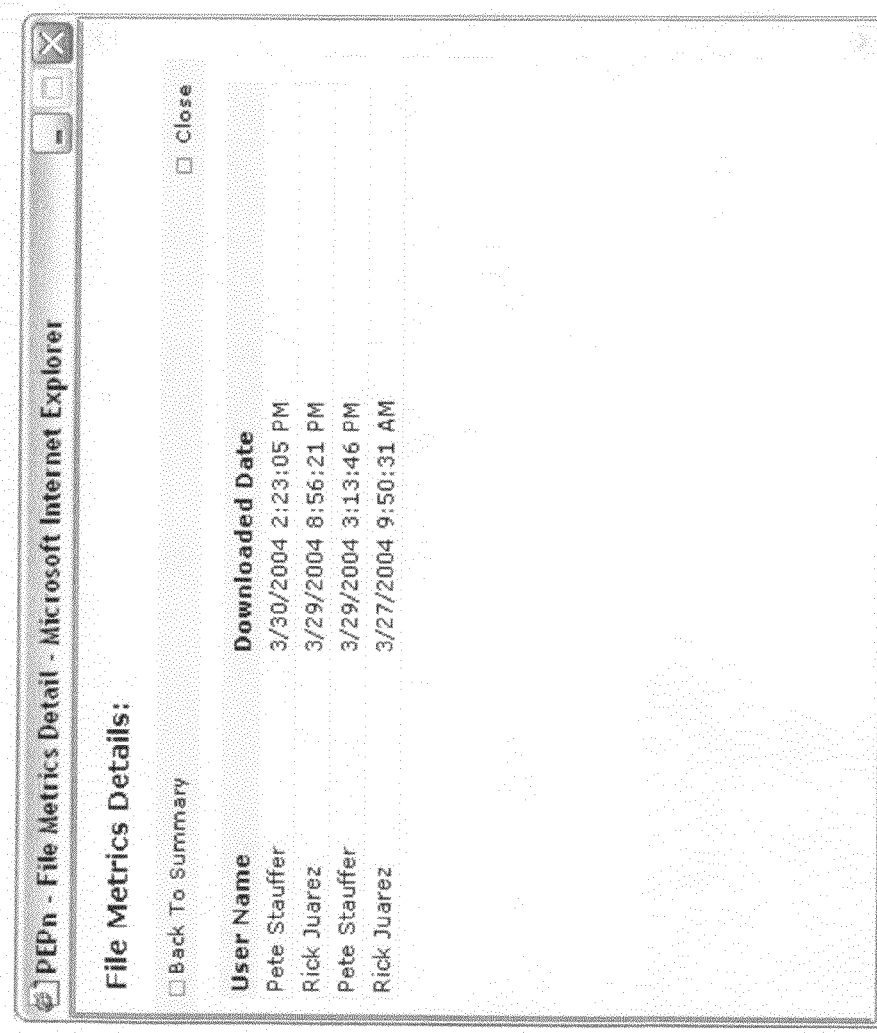
FIG. 55 File Metrics Detail Screen Shot

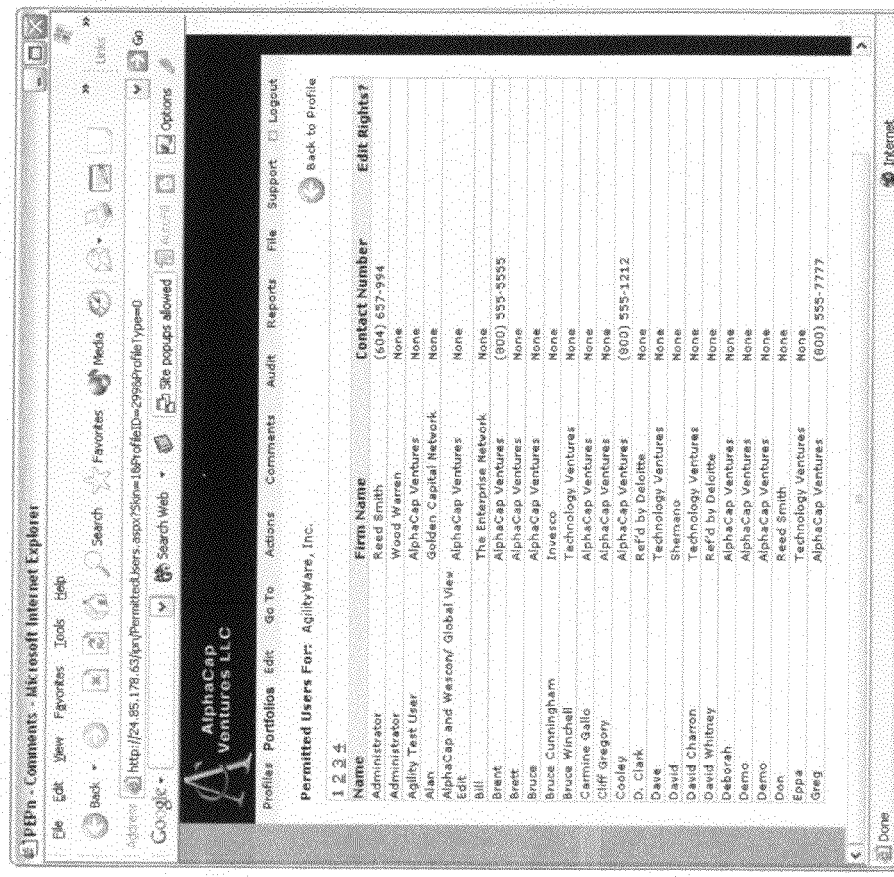
FIG. 56 Profile Permitted Users Screen Shot

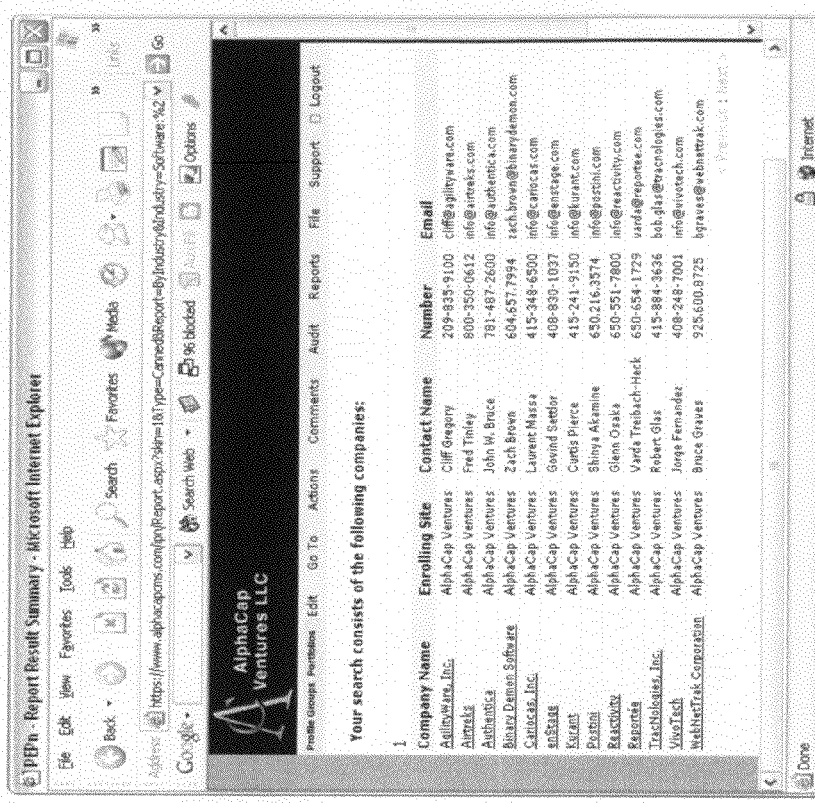
FIG 57b - Report, Search Results
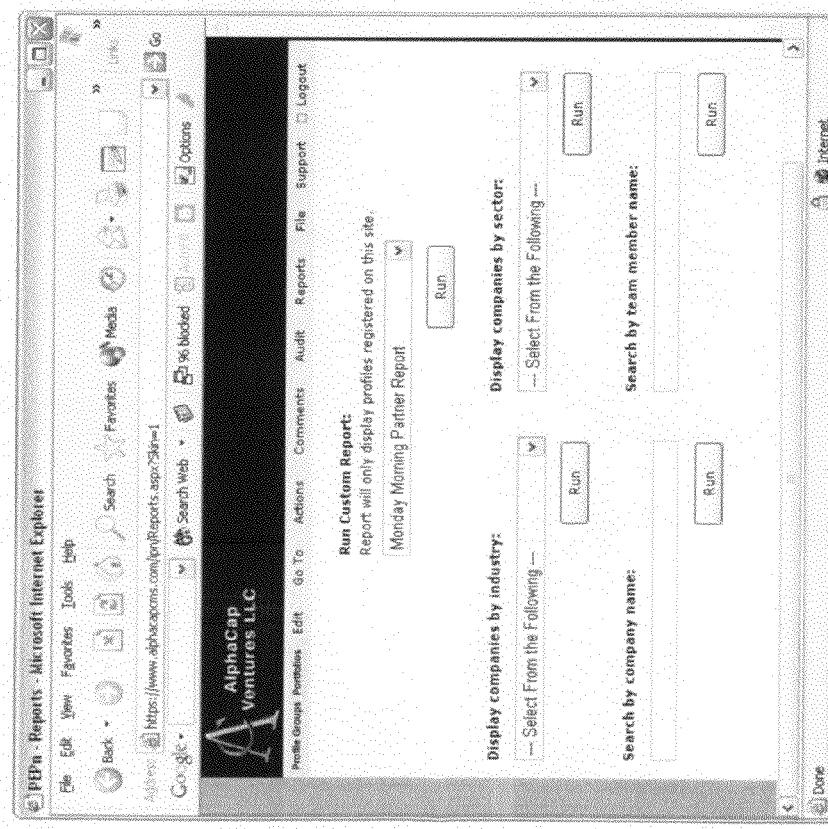
FIG. 57a - Report Creation, Search Tools

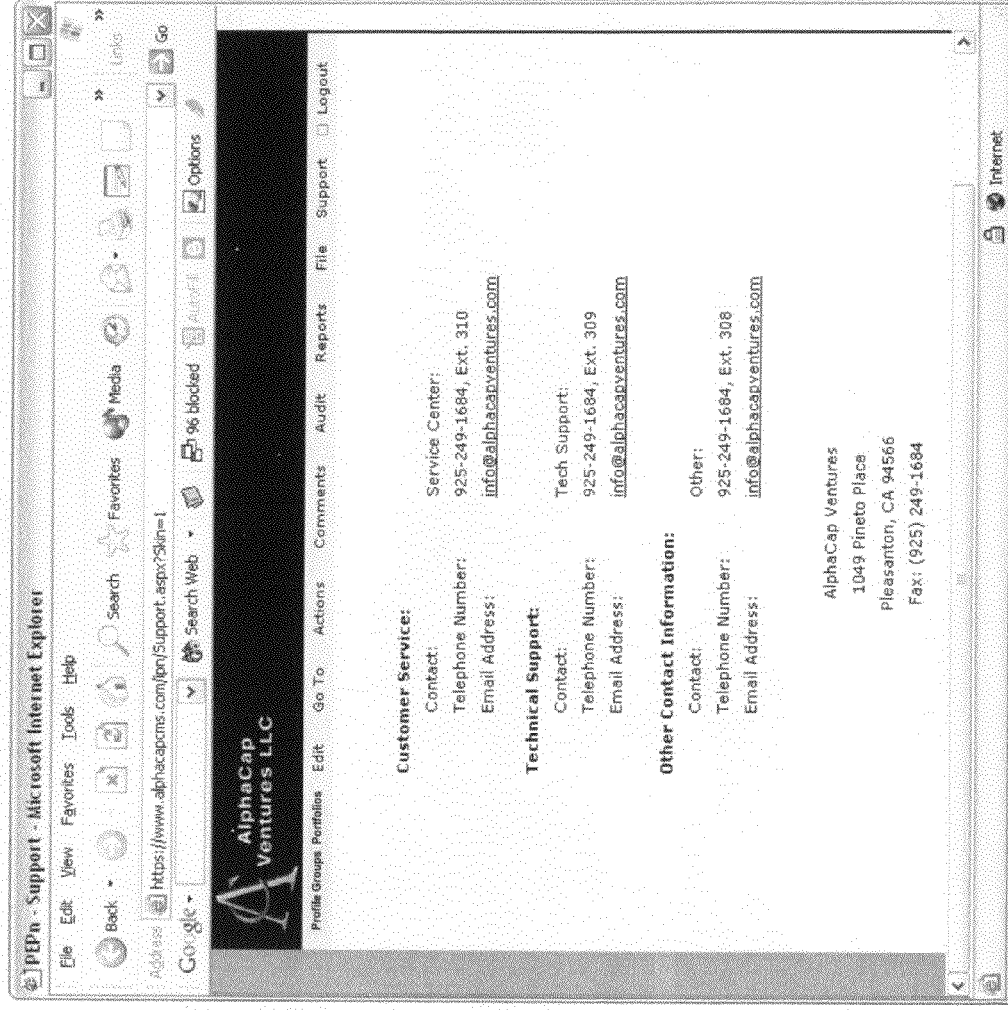
FIG. 58 Support Page Screen Shot

FIG. 59 Manage Profile Groups Screen Shots

FIG. 60 - Profile Groups Summary Flow Chart
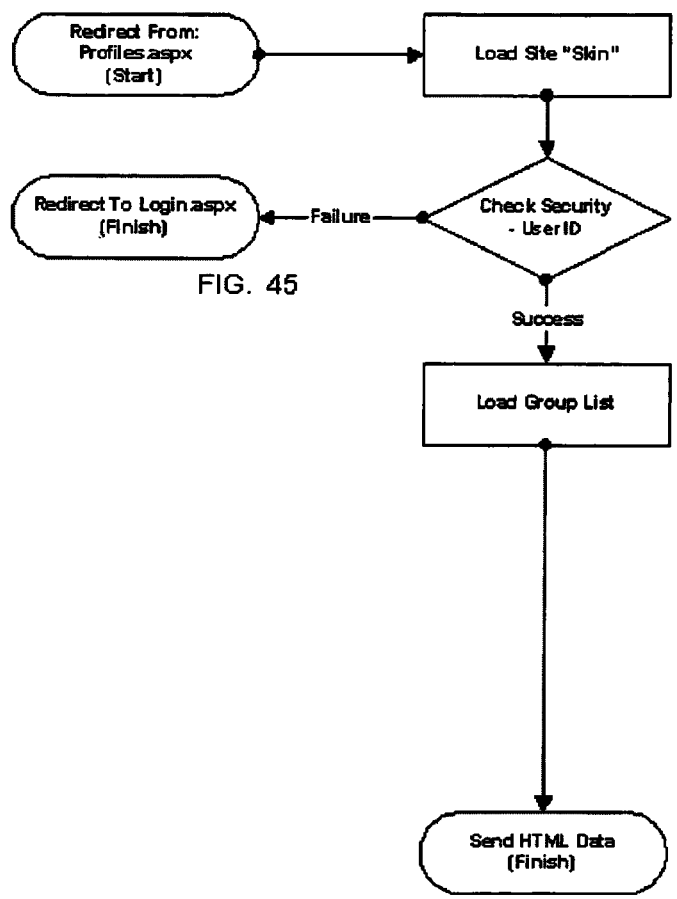

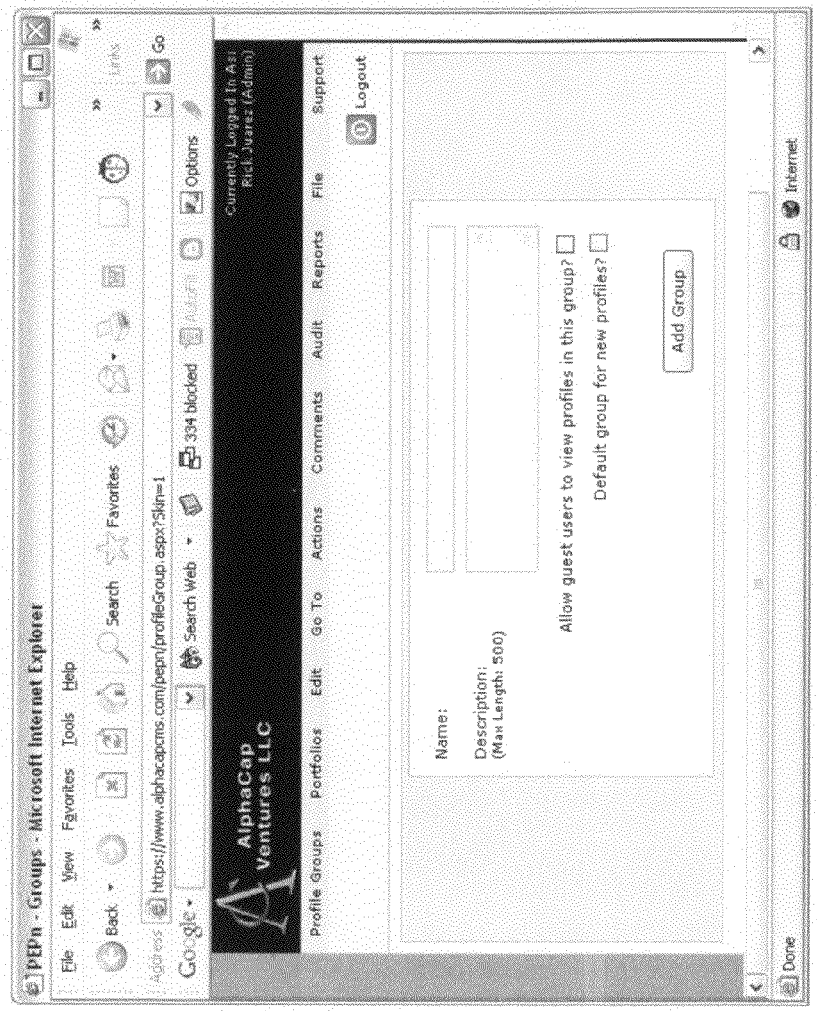
FIG. 61 Add, Edit Profile Group Manager Screen Shots

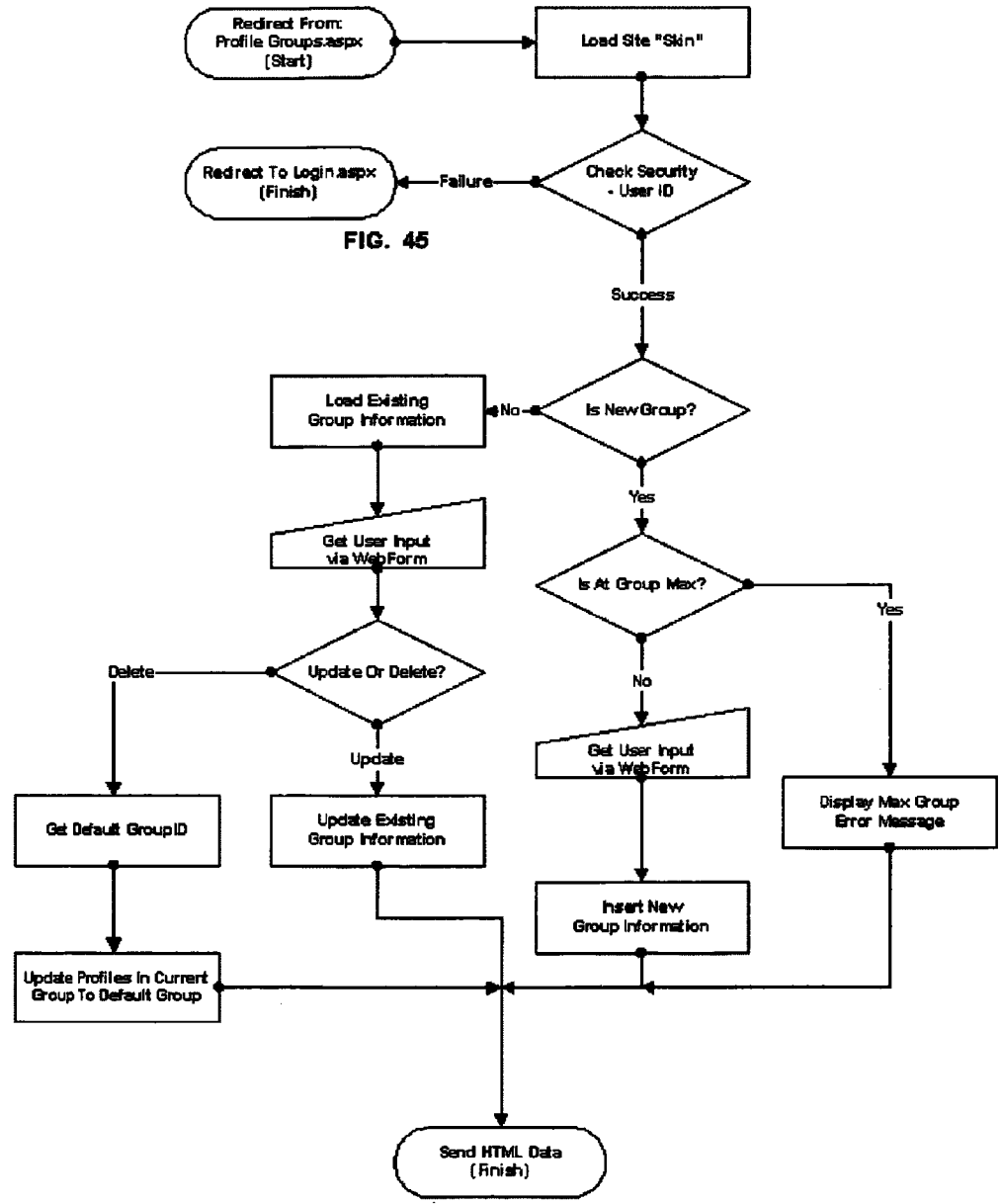
FIG. 62 – Add, Edit Profile Group Summary Flow Chart

FIG. 63 PEPn "SnapShot" Screen Shot

FIG. 64 - Take SnapShot Flow Chart
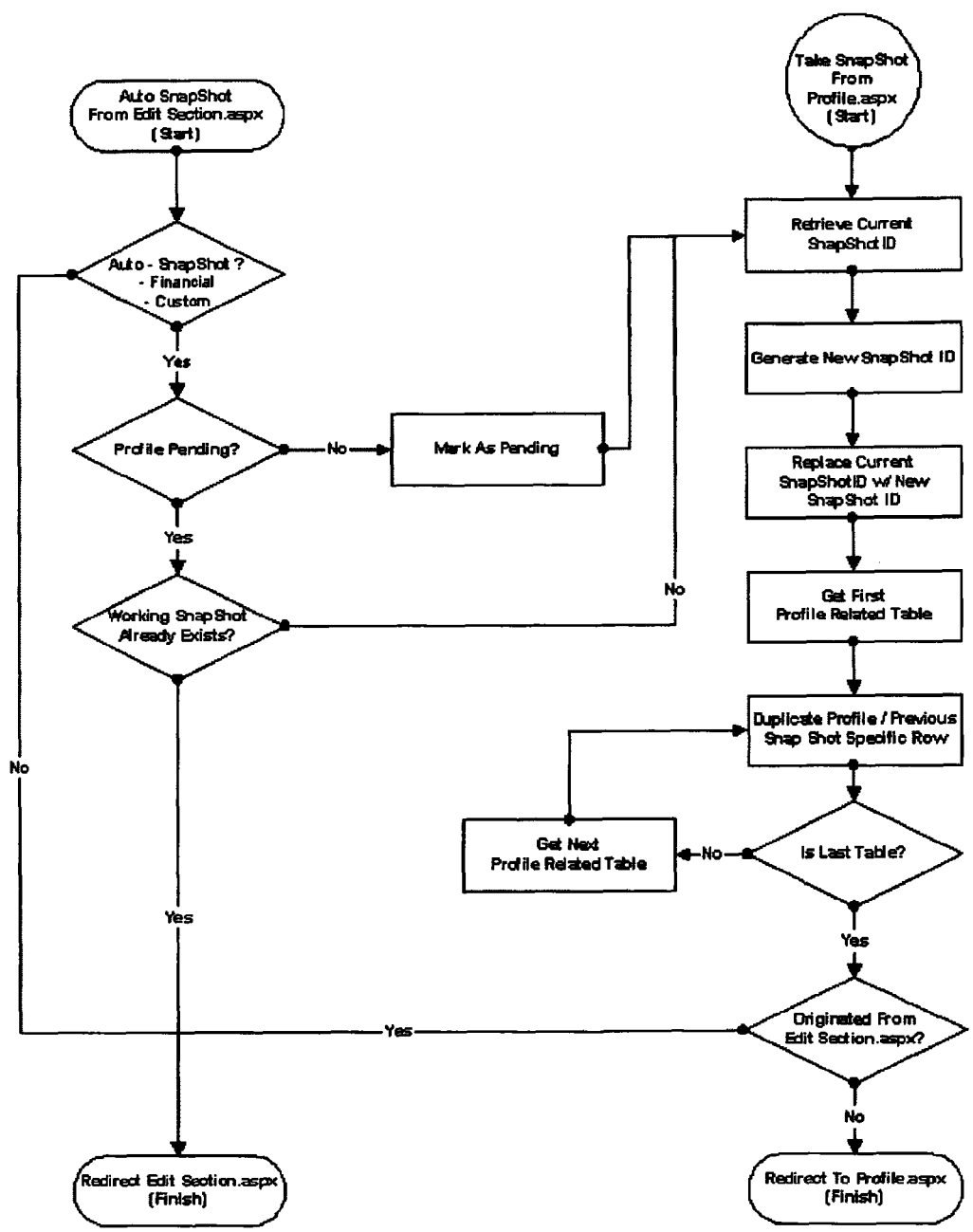

FIG. 65 - Portfolio Group Summary Flow Chart

FIG. 66 - Add, Edit Portfolio Group Flow Chart
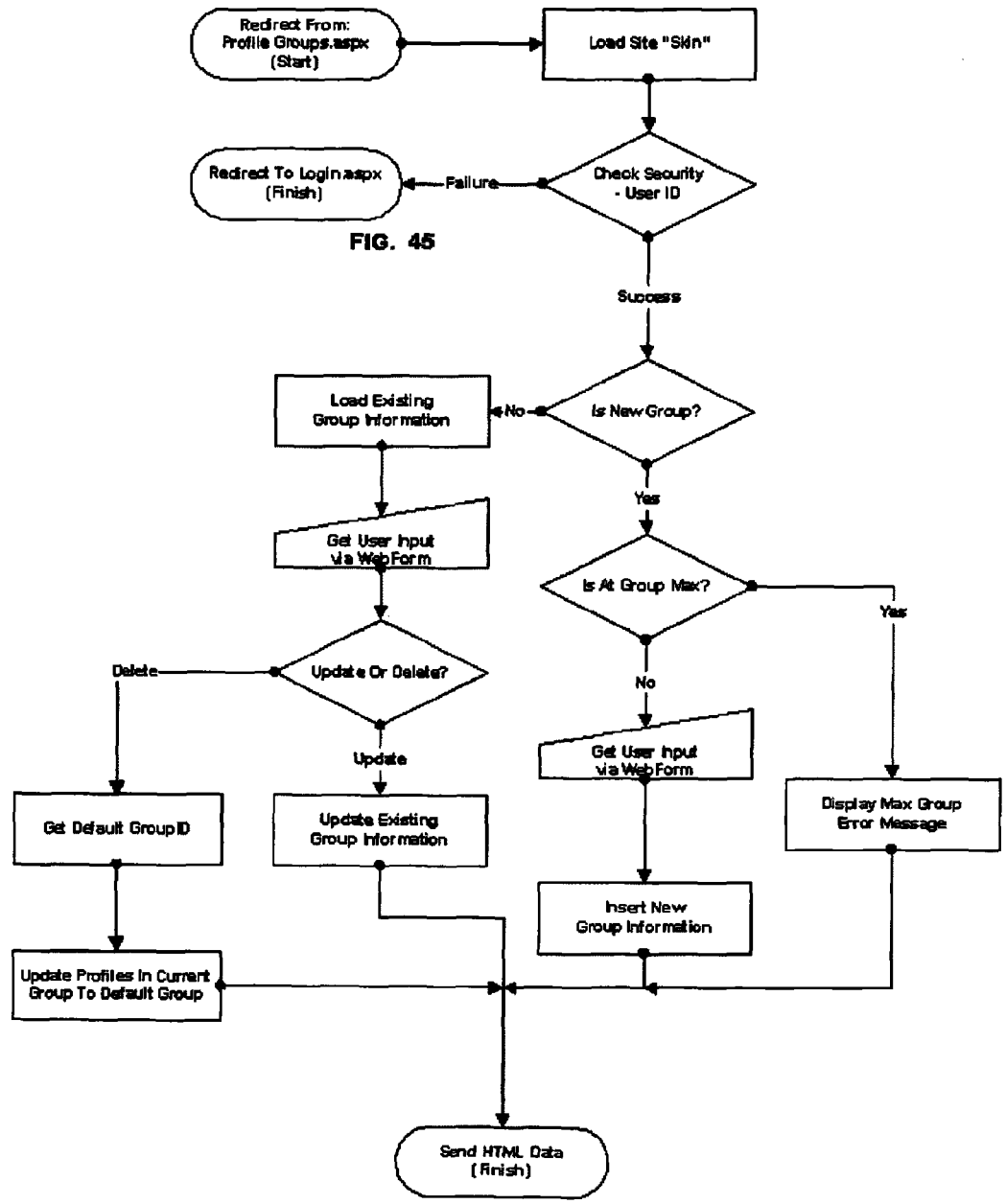

FIG. 67 - Create Portfolio Record Flow Chart
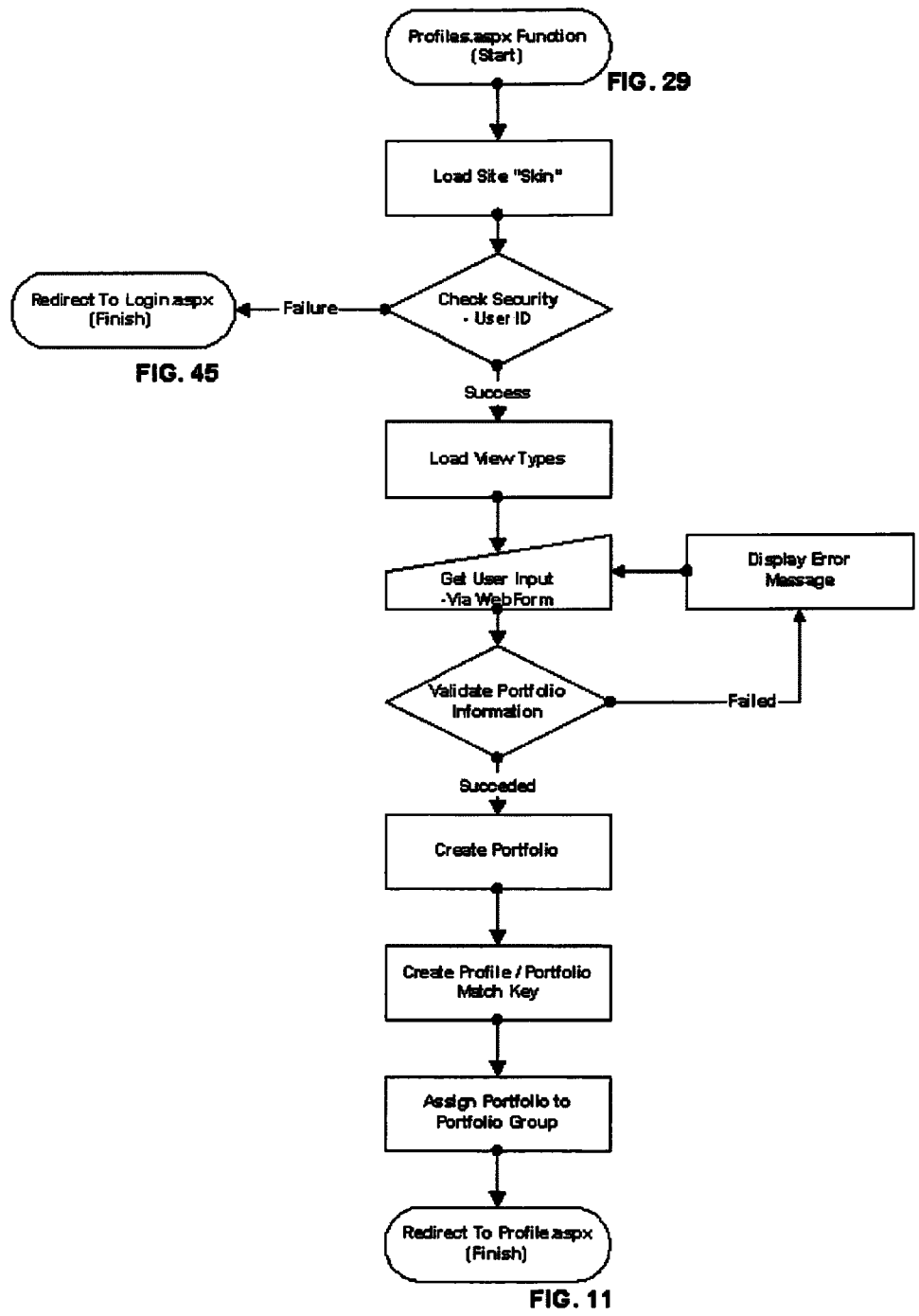

PRIVATE ENTITY PROFILE NETWORK

This application is a continuation of U.S. application Ser. No. 11/007,782,filed Dec. 8, 2004 now U.S. Pat. No. 7,848, 976 which is a continuation-in-part of U.S. application Ser. No. 10/870,732,filed Jun. 17, 2004 now U.S. Pat. No. 7,908, 208, which claims the benefit of U.S. Provisional Application No. 60/528,749, filed Dec. 10, 2003; this application is also a continuation-in-part of U.S. application Ser. No. 10/870,732, filed Jun. 17, 2004 now U.S. Pat. No. 7,908,208,which claims the benefit of U.S. Provisional Application No. 60/528,749, filed Dec. 10, 2003. All of the above applications are incorporated herein by references in their entirety.

BACKGROUND OF THE INVENTION

1. Technical Field

This invention relates generally to private equity and debt markets, and more particularly to managing, tracking, distributing and syndicating resource consumers' account, company, and relationship information in such markets.

2. Discussion of Prior Art

In the equity and debt funding business a "resource provider" (provider) is a party, who may be a venture capitalist, a bank, an accounting firm, advisor or Board member, a law firm or other business partner, that provides capital, assets or services. A "resource consumer" (consumer) is a party, typically an emerging growth company, that is seeking these resources. Resource providers and consumers agree what information the consumers are to deliver in exchange for being considered to receive resources from the providers. However, the formatting of information and the delivery mechanisms are not standardized. Currently, consumers may deliver information via ground mail, e-mail, online forms, FAX, teletext, etc. Current methods and processes typically require duplicative and costly data entry by both providers and consumers. To homogenize data, providers currently must collect, re-enter, and format data submitted by consumers. The problem is illustrated in FIG. 1. Consumers often receive resources from multiple providers. Consumers receiving duplicative information requests from different resource providers must duplicate their efforts of producing and delivering the same information to the different resource providers. Current methods do not allow an individual consumer to use a single platform and/or user interface to efficiently distribute and/or syndicate the same digital information and updates to multiple providers.

Despite growing demand for more digital information, attempts to automate the digital distribution and syndication of consumer information have fallen short. This is largely because individual software or system deployments by providers currently require consumers to re-enter and/or resubmit their same data into multiple stand-alone systems that do not share information. This means additional time-consuming and expensive work for consumers who do not have sufficient resources to enter and re-enter the same data multiple times in order to satisfy the providers. It is currently difficult to retrieve, share, distribute and/or syndicate current or previous versions of consumer information among providers because: 1) the desired data may not be available in digital format; 2) the data is not semi-homogeneous; 3) providers often have additional and special information requests; 4) no common platform is available upon which to submit, track, manage, and retrieve successive versions of submitted data; and 5) there exists no independent, neutral third party administrator to regulate and control interested parties' access to, and sharing of, data submitted by consumers. Because the submission of data on multiple systems is time and labor intensive, many consumers refuse to submit their data electronically using each provider's separate platform. Thus, there is a growing need to obtain more semi-homogeneous and digital data directly from consumers.

Conventional methods of obtaining and managing original and revised versions of consumer data include: paper files and binders; microfilm, external research; proprietary information databases or exchanges (e.g., M&A transactions, IPO data, deal listings, Lotus Notes, etc.); portals (e.g., MSN, Yahoo); collaboration tools (e.g., file sharing services, chat boards); secure file transfer and management services; virtual data rooms; work flow products; contact management platforms (e.g., Outlook, Onyx); customer and sales force relationship management tools; and large back-end systems (e.g., SAP, Peoplesoft). These methods do not provide sufficient functionality or controls to adequately and efficiently capture, track and manage the submissions of and changes to data made by providers and consumers. Conventional solutions have not allowed providers and other interested parties to efficiently organize and track specific groups of profiles in real-time. Resource providers need to be able to see and understand how an associated resource consumer's data has changed over time. Providers are often mobile and when they travel do not have access to previous paper versions of information submitted by their fiduciary relationships. Additionally, Providers often operate under tight time constraints requiring rapid decisions and as such do not have the time to compare one version of consumer data to another.

Public equity and debt market needs are addressed by services such as Edgar, Hoovers, Bloomberg, and Yahoo, whose on-line sites post information for retrieval, sometimes for a fee, through web browsers. However, these public market solutions do not address business processes by which private equity firms and debt providers manage and control consumer information on a relationship-by-relationship basis. For example, these solutions do not align data collection and management responsibilities in an efficient and auditable manner. In short, there is not a comparable "private" equity or debt marketplace solution to capture, collect, organize, maintain, monitor, and control access to information flowing into a provider organization.

Instead, previous solutions often contain secondary data resulting from efforts of individuals who research and collect information on a company (aka consumer), e.g., Venture Source. For providers, secondary data is not reliable for evaluating or managing the performance of prospect and/or portfolio of relationships.

There is also a growing demand for stricter controls over the tracking, monitoring and oversight of submitted data and changes made to data. Companies, investment mangers, plan sponsors, investors, board members, advisors, banks, venture capitalists, and fiduciaries of all types are under increasing pressure to demonstrate that they are actively tracking and monitoring their fiduciary relationships, at the risk of being liable to criminal and civil penalties. The Sarbanes-Oxley Act and other acts require greater levels of fiduciary oversight for alternative asset classes, e.g., venture capital, hedge funds, private equity, etc. ERISA standards require managers to demonstrate adequate fiduciary oversight of capital deployed in private equity investment vehicles. In addition, the SEC is evaluating new tracking and governance legislation for venture capital, private equity, and related firms. Proposed SEC rules intended to facilitate the institutionalization of the private equity and venture capital processes through record keeping and maintenance could create administrative challenges and increase costs.

Compounding these problems, providers must adequately oversee and track the progress of their fiduciary relationships with both reduced budgets and resources. The Private Equity Industry Guidelines Group (PEIGG) noted that general partner firms, i.e. providers, often have small investment management staffs available.

There is therefore a need for a more automated system which will help providers collect, input, manage, track and syndicate authorized consumer data, to exercise greater levels of due diligence on prospective and existing portfolio companies, and to do so with fewer management dollars.

SUMMARY

A method of using an electronic database system for collecting resource consumer information, organizing the information into standardized profiles and managing the profiles, to enable accessing the information as desired, comprises the steps of: defining a data collection template of fields for a standardized profile of resource consumer information desired by a resource provider; allowing at least one user to input information into the fields; storing the information as a profile in an electronic database system; and allowing at least one authorized party to access information stored in the system.

The method(s) reduce cost or enable real-time tracking and syndication of information preferably by: 1) aligning the responsibilities of consumers and providers; 2) enabling the semi-homogenous capture of information; 3) reducing the need for duplicative data entry; 4) streamlining data management, tracking, and syndication; and 5) utilizing a neutral third party platform administrator to oversee the business rules, intra- and inter-firm data sharing permissions, and compliance requirements.

In one approach aligning data entry and management duties, consumers accept lead responsibility for the entry and update of their digital "primary data" into semi-homogenous data collection templates specified by providers. This can reduce the need for duplicative data entry by recipients, i.e. providers and investors. It also may help providers to more rapidly compare consumer profiles within and among various industries or other groupings. Providers may use and/or edit the data submitted by consumers to conduct their analyses, track progress, and report results as appropriate. This allows providers to spend more of their time on tracking down new investment ideas, raising additional capital, and reporting out to investors. Finally, providers, investors, regulators, etc. can use the data that has been submitted to exercise fiduciary oversight and track and document the progress of portfolio companies. The platform can enable exchange of digital data with users or directly with other applications, via XML, SQL, etc. All changes are preferably reflected in real-time, which permits interested parties to instantly access updated and timely information, which enables more timely oversight of consumers.

Efficient management, tracking, distribution, and syndication of consumer information is facilitated by the use of semi-homogenous profiles. A profile is created for each consumer who enters their data on the platform. Profiles for each consumer relationship contain the semi-homogenous information along with optionally associated files (e.g., models, presentations), comments, and an auditable change history. Profiles consolidate the critically important information that providers need in order to exercise appropriate diligence, track investments, and demonstrate appropriate fiduciary oversight of investments. This aspect allows providers to expand their oversight capabilities while reducing the expense and time requirements of doing so.

The system's software allows consumers to attach multiple, customized provider information request sections to their semi-homogenous profile data. In one aspect a designated administrator can act as a neutral third party that manages the business rules and data sharing, distribution/syndication permissions among and between consumers and providers. Thus, consumers can submit their baseline and additional information requested by their providers on a single platform that intelligently parses and controls the distribution and syndication of their digital information in real-time. Access to their data and any other data on the platform is controlled at the individual UserName level. The system is flexible enough to allow a resource consumer, resource provider, or third party administrator to manage the access and activity rights for each discrete UserName. In one embodiment, only authorized UserNames are allowed to access specific pieces of data. In another embodiment, UserNames are controlled by the administrator for a managed service offering. Enterprise license deployments may require the licensee to coordinate with the third party administrator.

To enable the efficient tracking and management of related profiles and recording evidence of how providers have supervised groups of related profiles, one aspect of the method provides a capability called "portfolios," by enabling the definition and deployment of real-time, customizable, management audit, tracking and compliance portfolio data collection templates by the steps of: defining portfolio groups; enabling, for each defined portfolio group the creation of portfolio records; the association of profiles with portfolio records; defining, for each portfolio group, items that will be contained in a portfolio record; allowing a party to input information into the records, and storing the information in the electronic database system; associating and appending profiles with Pending Changes or Active profiles to appropriate portfolio records; and allowing the party to access, via the Internet, information stored in the system.

Portfolio groups can contain one or more populated "portfolio record" data templates. Detailed portfolio records contain preferably five key components, including: 1) a semi-homogenous group data collection and tracking template per unique, named portfolio group; 2) associated tracking and oversight file attachments; 3) comments log; 4) change history; and 5) the ability to associate specific consumer profiles with specific portfolio records within a given portfolio group. To begin with, the platform aids providers because the underlying profile information is being supplied, updated, and inputted directly by the consumers. As this "primary" information is reviewed by providers they can input information and comments on the portfolio record that documents their oversight of the collection of profiles.

Providers often need to use specific profile data templates for a given group of profiles, e.g., software industry profiles. Providers need to be able to design data collection profile templates based upon characteristics unique to a given profile group. A Provider may also wish to create profile groups that describe an overall affiliation, e.g. "active investments." For management purposes, Providers will likely need to be able to move individual profiles between groups, e.g. from the "new and high probability investment profiles" group to the "active list" group. A preferred embodiment can support multiple profile group designations.

A preferred embodiment enables providers to efficiently track prior versions or "snapshots" of submitted resource consumer data, so that they can compare current consumer data to previous versions.

One aspect of the method can reduce the time each party spends on data collection entry, re-entry, tracking and distribution and syndication of data, and deliver to consumers and providers a tangible return on investment (ROI). The ability to track submitted information via independently managed and auditable change history and site audit records provide a compliance control mechanism.

BRIEF DESCRIPTION OF THE DRAWINGS

FIG. 1 illustrates a labor intensive prior art process used by providers to create digitized and semi-homogenized consumer data;

FIG. 2 is a screenshot of a semi-homogenous profile or data template along with a list of representative sections as used in one embodiment of the invention;

FIG. 3 is a screenshot of a semi-homogenous profile that highlights the fields within a profile section;

FIG. 4 is a screenshot of a portfolio record data template including a list of sample and representative portfolio record sections produced by the procedure of FIG. 67;

FIG. 5 is a screenshot of preferred portfolio record fields within a portfolio record section;

FIG. 6a is a screenshot enabled by the site level activity entitlements showing a list of portfolio group names, and FIG. 6b is a screenshot produced by the procedure of FIG. 24 of a list of portfolio record names associated within a given portfolio group;

FIG. 7a is a screenshot produced by the procedure of FIG. 25 showing a portfolio record and FIG. 7b is a screenshot of a consumer profile, like FIG. 2, associated with a specific FIG. 7a portfolio record;

FIG. 8 is a block diagram of the logical architecture of the invention in one embodiment;

FIG. 9 is a block diagram of preferred physical architecture supporting the FIG. 8 logical architecture;

FIG. 10 is a management and administration tools site map;

FIG. 11 is a flowchart of a preferred detailed profile level access and activity entitlements/permissions identification procedure for a UserName;

FIG. 12 is a flowchart of a preferred procedure for loading accessible sections in FIG. 11;

FIG. 13 illustrates preferred major components of profile;

FIG. 14 is a flowchart of an investment information management process enabled by the invention in one embodiment;

FIG. 15 is a screenshot of a preferred login page;

FIG. 16 is a preferred consumer UserName and profile self-registration screen shot;

FIG. 17 is a flowchart of a preferred consumer UserName and profile self-creation, registration procedure;

FIG. 18 is a flowchart of a preferred profile creation procedure used by providers and other authorized UserNames;

FIG. 19 is a flowchart of a preferred edit procedure;

FIG. 20 is a flowchart of a preferred file manager procedure;

FIG. 21 is a flowchart of a preferred add file procedure;

FIG. 22 is a screenshot of a preferred file manager dialog box produced by the FIG. 20 procedure;

FIG. 23 illustrates how providers and consumers can self-regulate the level of profile information shared among authorized UserNames via the disclosure level setting;

FIG. 24 is a flowchart of preferred site level procedure for populating and displaying a FIG. 6b summary of portfolios;

FIG. 25 is a flowchart of preferred portfolio record level procedure for populating and displaying (FIG. 4, 5 or 7a) a single portfolio;

FIG. 26 contains screen shots of a preferred change history log display that is produced by the FIG. 36 procedure;

FIG. 27 is an illustration of a preferred cascading UserName permissions/entitlements structure in one embodiment;

FIG. 28 is a flowchart of an application site map;

FIG. 30 is a flowchart of a preferred site audit history log procedure;

FIG. 31 is a flowchart of a preferred reports procedure;

FIG. 32 is a flowchart of a preferred support procedure;

FIG. 33 is a flowchart of a preferred password reset procedure; and

FIG. 35 is a flowchart of a preferred add comments procedure;

FIG. 36 is a flowchart of a preferred change history log procedure;

FIG. 37 is a flowchart of a preferred profile metrics summary procedure;

FIG. 38 is a flowchart of a preferred profile metrics detail procedure;

FIG. 39 is a flowchart of a preferred file metrics summary procedure;

FIG. 40 is a flowchart of a preferred file metrics detail procedure;

FIG. 41 is a flowchart of a preferred profile permitted users procedure;

FIG. 42 is a table showing preferred flexible and granular access and activity permissions/entitlements for a single UserName;

FIG. 43 is a screenshot of a preferred guest UserName self-registration page;

FIG. 44 is a flowchart of a preferred guest UserName registration procedure;

FIG. 46 is a screenshot of a preferred site audit history log produced by the procedure of FIG. 30;

FIG. 47 is a preferred summary profile screen for a provider type UserName produced by the FIG. 29 procedure;

FIG. 48 is a screenshot of a preferred profile for a consumer type UserName produced by the FIG. 17 procedure;

FIG. 49 shows screenshots of two representative edit boxes produced by FIG. 19 procedure;

FIG. 50 is a screenshot of a preferred view comments display produced by the FIG. 34 procedure;

FIGS. 51a and 51b are screenshots of preferred add file dialog boxes produced by the FIG. 21 procedure;

FIG. 52 is a screenshot of a preferred profile metrics summary produced by the procedure of FIG. 37;

FIG. 53 is a screenshot of a preferred profile metrics detail produced by the procedure of FIG. 38;

FIG. 54 is a screenshot of a preferred file metrics summary produced by the procedure of FIG. 39;

FIG. 55 is a screenshot of a preferred file metrics detail produced by the procedure of FIG. 40;

FIG. 56 is a screenshot of a preferred profile permitted users produced by the procedure of FIG. 41;

FIG. 57 shows screenshots of preferred reports tools and representative output produced by the procedure of FIG. 31;

FIG. 58 is a screenshot of a preferred support page produced by the procedure of FIG. 32;

FIG. 59 is a screenshot of the Manage Profile Groups screen produced by the procedure of FIG. 60;

FIG. 60 is a flowchart of a preferred Profile Groups summary procedure;

FIG. 61 is a screenshot of the Add, Edit Profile Group Manager screen produced by the procedure of FIG. 62;

FIG. 63 is a screenshot showing the Icon users select to take a SnapShot of a Profile or Portfolio Record, along with the drop down list of previously taken SnapShots produced by the FIG. 64 procedure;

FIG. 65 is a flowchart of a preferred Portfolio Group Summary procedure;

FIG. 66 is a flowchart of a preferred Add, Edit Portfolio Group procedure; and FIG. 67 is a flowchart of a preferred Create Portfolio Record procedure.

DETAILED DESCRIPTION

Figure 34:
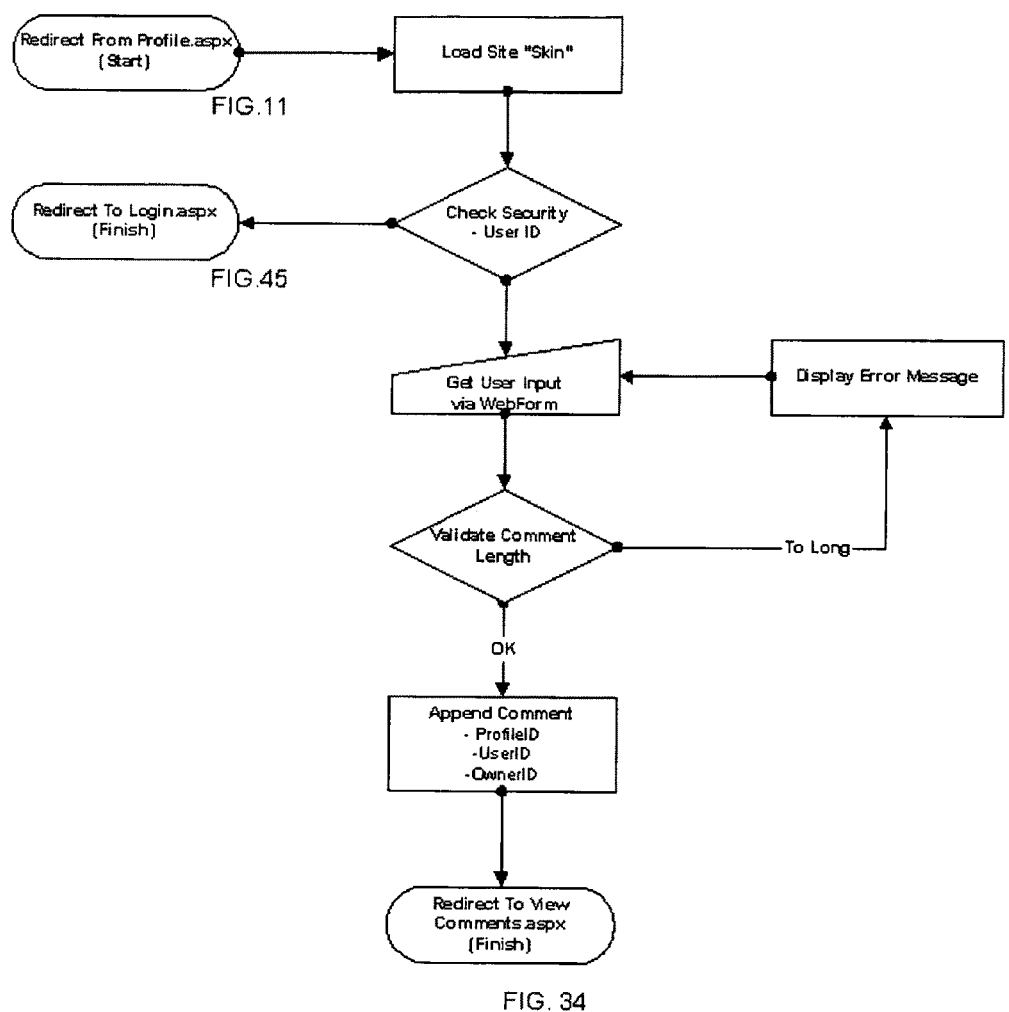
FIG. 34 is a flowchart of a preferred view comments procedure.

An embodiment of the invention uses customizable data collection templates on a scalable hardware and software platform to collect and manage resource consumer information and to build "semi-homogenous profiles" as illustrated in FIGS. 2, 3 and 7b, and "portfolio records" as illustrated in FIGS. 4-7a.

Phase I: Setting up the Platform

The system software (FIG. 8) and hardware (FIG. 9), as explained below, are set up preferably to meet specifications of the particular resource provider's deployment. Preferably, a neutral third party administrator, rather than the resource provider, has custody, and maintains security, of the platform, as explained further below. Management procedures and their associated user interface screens (FIG. 10 box 10a) are used in configuring the deployment.

Profile Templates

A blank default information collection template including compartmentalized sections (FIG. 2) and fields (FIG. 3), generated by the procedures of FIGS. 11 and 12, is adopted and typically modified by a deploying provider, to be filled in by a resource consumer to form a semi-homogenous profile. The default template sections include a company logo, a company name, address, company/consumer contact information, partner/provider contact information, general business descriptors, description of the company, description of their associated markets and products, current status, management team, advisory board and board composition, funding and capitalization table information, list of intellectual property, financial information, comments, lists of the names of vendors who are providing services to the firm, and specialized and/or confidential information sections which have restricted access.

A profile's composition can be tailored by an individual consumer or provider. Fields or entire sections may be added or removed. Preferably an embodiment can accommodate a practically unlimited number of profiles.

As illustrated in FIG. 13 and further explained below, a profile preferably consolidates into one auditable record 1) the semi-homogenous data template, 2) file attachments which can be added and viewed e.g. models, presentations, 3) the profile's change history, detailing any changes made to any sections and/or fields, and 4) profile-specific comments which may be added and viewed as needed. A consolidated profile gives providers information with which to exercise and demonstrate fiduciary oversight of their consumers, investments, etc.

Certain required information (e.g., business plans, valuation data) is confidential. Consumers and providers are very concerned about potential data loss or unauthorized access by others to their data. Consumers and providers often need to parse and send varying levels of detailed information to many different audiences or constituents. The release of such information should be strictly controlled and recorded.

UserNames

To protect the integrity of collected information, the invention preferably defines UserNames and associated access and activity entitlements (FIG. 10 box 10b). Each person who uses the system preferably is assigned a unique UserName entitling that person to specific access and activities. Preferably, varying levels of access and activity entitlements can be granted to each UserName. Three preferred types or groups of UserNames are: consumers, providers, and guests (e.g., third party partners, vendors, conference attendees, etc.). Preferably an embodiment can accommodate a practically unlimited number of UserName groups. Each group of UserNames is assigned default access and activity entitlements or permissions, further described below, typically modified by the provider. Group entitlements may be further modified for each UserName within the group. A deploying provider typically submits UserName setup instructions to a neutral third party administrator who implements the instructions.

Phase II: Establishing UserNames and Submitting Information

The embodiment preferably accommodates computer terminals where consumers, FIG. 14, can register their UserNames and submit their profile information. FIG. 15 is a screenshot of the sign-in page of an example provider's website. Consumers and guests typically self-register and establish their own UserName and password credentials. A new consumer clicks on "register new account" which brings up a registration page, as shown in FIG. 16, generated by the FIG. 17 "Consumer UserName and Profile Self-registration" procedure. The FIG. 16 registration page prompts the new consumer to provide a UserName and password, select disclosure levels for third party UserNames, and pay by credit card for submitting his company profile. At the bottom of the page, the consumer clicks "yes" to accept the terms and conditions for use of the service and then clicks "submit" to complete the UserName and payment portion of the registration process. The FIG. 16 form is checked by the FIG. 17 procedure. If the form was filled out correctly and the credit card payment processed properly, the procedure creates a new UserName. In some cases, a fee from a registering consumer may be waived.

Upon creation of a UserName, a blank template, as illustrated in FIG. 2 and FIG. 3, is opened and displayed for completion by the just-registered consumer. The newly created—but so far empty—profile is associated with the provider's deployment or site and the UserName is added to the list of valid active users for the provider site. The UserName is preferably assigned an authorization token which establishes that UserName as a valid user of the specific provider's embodiment. The FIG. 11 "profile detail" procedure applies the access and activity entitlements established for each UserName, identifying what sections and fields for a specific profile a UserName may access and the activities they may perform. The consumer inputs their information. Thus, profiles are populated with information primarily from the owners of data, e.g., resource consumers, and only afterwards secondarily from outside parties, e.g., resource providers. Data contributed directly by the originating source is known as "primary data" and is relied upon to attest to consumer performance. The ability to work with primary data is valuable to resource providers. "Ownership" of the newly submitted profile is initially conveyed to the provider and its internal users.

A provider or other authorized party that deploys an embodiment may wish to create profiles for consumers, possibly as an incentive to attract business. An authorized provider selecting the "actions" item on the menu bar highlighted in FIG. 2 and then selecting "create profile" invokes the FIG. 18 procedure. A provider may create UserName and password credentials for each profile they create, and distribute these credentials to a consumer for a particular profile so that the consumer can login and update the profile as appropriate later. A provider does not have to establish credentials for the consumer. Next, a blank profile is opened and added to that provider's list of available profiles. The FIG. 11 "profile detail" procedure enforces the access and activity rights that have been established for each UserName and UserName type (i.e. consumer, provider, and guest) for that particular profile. The provider then uses the FIG. 19 edit procedure to populate the form, and the FIG. 20 and FIG. 21 procedures to view and add files to the newly created profile.

Profile data collection templates are intended to collect summary information on consumers. As providers and consumers often need more detailed information, an embodiment can enable consumers to append file attachments to their profiles. To initiate the FIG. 20 file manager procedure, consumer or provider clicks on the view/add/manage icon/link on the profile. The FIG. 20 procedure opens the FIG. 22 file manager box and a user may add as many files as they wish. They may also specify individual file access rights right for various UserNames.

When the consumer completes the initial input of their data, their submitted profile is placed into the "pending" category on the provider's site.

To strengthen the security, accuracy, scalability and reliability of the entitlement system, the invention preferably assigns a unique numeric identification number (ID) to each: profile, portfolio record, section, field, deploying provider site (login site or web page), UserName (i.e., consumers, providers, third parties), and UserName group. One embodiment uses these ID numbers to associate trusted relationships between authorized UserNames, specific provider sites, consumer UserNames, provider UserNames, guest UserNames, profiles, portfolio records, file attachment types, file attachment access levels, sections, fields, etc. These ID identifiers enable an embodiment to deliver a granular UserName entitlement system.

Phase III: Platform Use, Features, & Functionality

Providers, guests, and authorized third party UserNames may login from their respective locations to access available profiles. Their access and activity entitlements are managed by the neutral third party administrator based initially on their UserName group entitlements. The business rules that define each UserName's entitlements are established by the resource consumer, resource provider, and/or a third party user. These entitlements may be negotiated independently or collaboratively. The neutral third party administrator will initially implement the entitlements as stipulated by the various parties. If requested, the third party administrator can enable a resource consumer and/or resource provider to self administer and manage any UserName that has access to profiles to which they have final and absolute duly authorized accountability, responsibility and control. Resource providers, guests, and partners can use an embodiment to track, monitor, and report the information provided by the consumers.

When a consumer uses the FIG. 16 registration page to register and submit his or her information to a provider's deployment, their profile is initially associated solely with that provider. The provider and its associated internal UserNames are granted ownership rights for that particular profile, and can directly control access to that and all other consumer profiles registered on their deployment. At a later time, the provider with current ownership rights and/or the consumer may grant ownership privileges to additional third party UserNames, e.g., other resource providers. Consumers and providers may negotiate control of the granting of sharing permissions. A preferred embodiment may allow either party the right to control this and other sensitive access and activity entitlements.

States

"State" categories are used to control access to profiles. A profile may at any given time be in one of two "states": "pending" or "active." The pending state is typically used for newly registered profiles or for profiles that have been modified by either the consumer or provider. Providers who have primary "ownership" rights for a given profile may acknowledge and accept profiles that are in the pending state. Only a provider UserName with the appropriate activity entitlement is allowed to accept a profile in the pending state. The provider's internal UserNames can see profiles that they own regardless of what state the profile may be in. Other UserNames, e.g. third party and/or guest UserNames, that have been granted access to a provider's profile(s) can only see profiles that have been accepted by owners and are in the active state. If necessary, exceptions can be granted. Consumers are not allowed to see, and are unaware of, the state of their particular profile. Providers value this feature because they want and need to screen and release profile data to the active state before any third parties or guests see the data.

Disclosure Levels

As depicted in FIG. 23, a consumer or provider granting an access entitlement to a third party UserName can independently and directly control the level of information that is shared with newly entitled third party UserName by selecting one of the following three disclosure levels associated with each profile: "general information and high level financials," "general information no financials," and "none." The disclosure setting is circled on the right side in FIG. 23. Each profile may have preferably only one of the three possible disclosure levels at any given time. A provider can designate a different sharing level for each of the profiles which it owns.

If the disclosure level for a profile is set at general information, high level financials, then all information on the profile and all file attachments can be accessed by any of the UserNames that have been granted access to it. If the disclosure level for a profile is set at general information no financials, all guest and third party UserNames with access to the profile will be precluded from accessing any financial information (income statement, balance sheet, cash flow statement, capitalization table) in the profile. They will also be unable to access any file attachment with a designated file access right of "financial." Additional sections and file types can be included in the "financial" exclusion list if desired by either the consumers or provider. If the disclosure level for a profile is none, then the consumer who registered the profile and the provider with ownership rights are the only UserNames who can see the profile. As a profile owner, the provider's internal UserNames can see all of the profile's data, e.g., financial information, regardless of the disclosure level set for that profile. Other UserNames granted access to a provider's profile(s) can only see the level of information allowed, if any, stipulated by the disclosure level on a profile. Embodiments can grant exceptions to these rules. The disclosure level of profiles preferably can be changed at any time and the new disclosure settings reflected in real time. The ability to individually adjust disclosure levels is an important profile level activity entitlement.

Portfolios

Having defined, semi-homogenous data templates facilitates comparing profiles. Comparing similar opportunities against a standard can help resource providers make consistent decisions. As noted in FIG. 10 box 10*a*, one embodiment builds on FIG. 7*b* consumer profiles by associating a profile to a specific portfolio record (FIG. 7*a*).

Resource providers can develop and deploy customizable portfolio records (management data templates) to facilitate tracking and oversight of specific portfolios of profiles. To create a portfolio record, a provider would choose the "create portfolio record" option under the action button on the menu bar illustrated in FIG. 2, which initiates the FIG. 67 procedure that enables creating a new portfolio record. FIGS. 4 and 5 show a partially blank example of a semi-homogenous portfolio record template with which providers can begin. The portfolio record template includes compartmentalized sections. As shown in FIG. 4 default sections include: profile owner contact information, general information, description, provider investment monitoring activities, management teams, and links to the profiles which have been associated with the portfolio. As shown in FIG. 5, portfolio record sections can contain one or more fields. A provider can tailor portfolio records to his requirements by adding or removing entire portfolio record sections and/or removing fields within portfolio record sections.

Having created a portfolio record the provider can associate profiles with it as shown in FIG. 7*a*. The FIG. 25 procedure generates the FIGS. 4, 5 and 7*a* screenshots of a portfolio record.

During the portfolio record creation process, the provider is prompted to specify a group (names in the circle on FIG. 6*a*) into which to place the newly created portfolio record.

If a suitable group does not already exist, then to create a portfolio group, a provider would click on the "create portfolio group" option under the action button on the menu bar illustrated in FIG. 2, which initiates the FIG. 66 procedure that enables creating a new portfolio group. A portfolio group may contain one or more portfolio records, as indicated by the portfolio record names in the FIG. 6*b* screenshot, which is generated by the procedure of FIG. 24. The portfolio group (FIG. 6*b*) and portfolio record (FIG. 7*a*) functionality are helpful for compliance, control, and auditing.

FIG. 6*a* shows representative portfolio group names which providers could create to track and monitor specific collections of profiles. To edit a portfolio group a user selects the "view portfolio group" option under the action button on the menu bar, which initiates the FIG. 65 procedure that returns the names of the available portfolio groups as shown in FIG. 6*a*. A user clicking on one of the FIG. 6*a* available portfolio group names initiates the FIG. 66 procedure which allows the user to make the requested changes to specific portfolio groups.

A provider can drill down from a FIG. 6*a* generic group name (e.g., Investment Banks) to a FIG. 7*a* specific portfolio record in that group (e.g., Acme Investment Banking) and then ultimately to a FIG. 7*b* profile directly associated with Acme (e.g., ABC Taiwan Electronics Corp.). The underlying FIG. 7*b* profile in the FIG. 7*a* portfolio record (in this case ABC Taiwan) preferably automatically reflect any updates made by authorized users (e.g., Acme or ABC Taiwan or other authorized UserNames) in real time. This functionality enables a provider to document and track via an auditable record his oversight of his various consumer relationships.

A neutral third party administrator preferably will take the specifications (group names, portfolio record group templates, association of consumer profiles to portfolio records) and implement them. Each portfolio record also preferably includes a file folder which can be used to hold related oversight and monitoring files for identified collections of profiles, e.g., term sheets, performance reviews, monitoring records, etc. One embodiment also allows providers to attach and associate comments directly to portfolio records. One embodiment further allows providers to track in a change history log (FIG. 26) all the changes made to a portfolio record.

As illustrated in FIG. 13, a portfolio record, like a profile, preferably consolidates into a auditable record 1) the semi-homogenous data template, 2) file attachments which can be added and viewed e.g. performance results, 3) a portfolio record's specific and individual change history detailing any changes made to any section and/or fields, and 4) portfolio record-specific comments which may be added and viewed as needed. The consolidated elements of a portfolio record give providers the information they need in order to further exercise and demonstrate fiduciary oversight of their consumers, investments, etc.

UserName Access and Activity Entitlements

Providers deploying an embodiment will typically define UserName entitlements for their internal users, consumers receiving resources from them, guests, and potentially third party partners. Providers usually grant varying permission entitlements to various UserNames. Consumers may request sole responsibility over a particular entitlement, e.g., the ability to change the disclosure level on their profile. The preferred neutral third party administrator will implement only entitlements that have been properly approved and validated by all affected parties.

As illustrated in FIG. 27, one embodiment uses cascading access and activity entitlements to permit differentiated, broad or narrow, tunable entitlements to individual UserNames. A specific group of UserNames or an individual UserName's aggregation of entitlements can include any combination of the access and activity permissions outlined in FIG. 27.

Access Entitlements

Access entitlements allow a given UserName to gain entry to a specific provider's site or deployment. For control and security purposes, each UserName preferably may only log in at a single provider deployment location. As indicated in the FIG. 28 Application Site Map box 27*a*, the "access" entitlements also allow an authorized UserName to gain entry to specific access related pages, e.g., profiles summary (FIG. 29), portfolios summary (FIG. 24), portfolio detail (FIG. 25), and profile detail (FIG. 11). From these pages, an authorized UserName can see the names of profiles and portfolio records. Users can be granted access to one or all of these pages. One embodiment also preferably utilizes a system of "access" inclusion or exclusion entitlements to ensure that UserName access can be tuned to the finest level of granularity. The inclusions and exclusions apply to individual profiles, portfolio records, sections, and fields within sections. For example, a UserName may be granted access to all enterprise software profiles but be explicitly excluded from seeing a specific enterprise software profile, e.g., Oracle, because of a conflict of interest. Conversely, another UserName may be generally excluded from all enterprise software profiles but be included to see a single software profile, e.g., Microsoft.

Site Level Activity Entitlements

As further illustrated in FIG. 27, there are preferably two levels or cascades of "activity" entitlements. Activity entitlements allow users to manipulate and interact with the data to which they have been granted access.

Figure 62:
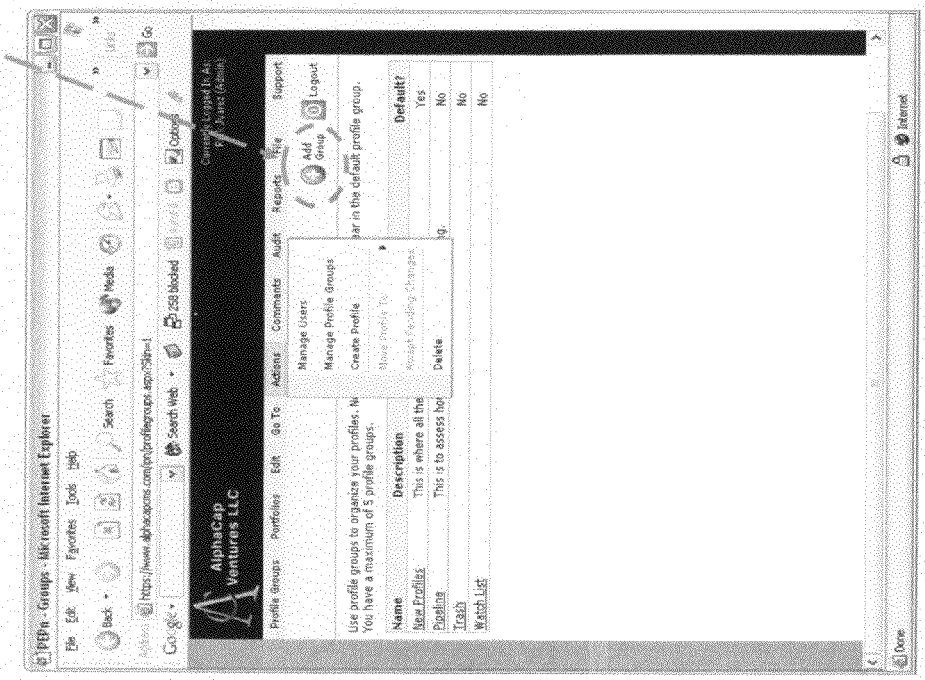
FIG. 62 is a flowchart of a preferred Add, Edit Profile Group procedure.

The first level entitlements or permissions are "site" level activities that control a UserName's ability to get to specific pages of the database and to perform specific activities. Permissions can be adjusted by UserName on a profile-by-profile basis. As indicated in the FIG. 28 Application Site Map box 27b, site level activity entitlements control a UserName's ability to navigate to preferably the following pages: create profile/portfolio records (FIG. 18), site audit history (FIG. 30), reports (FIG. 31), support (FIG. 32), password reset (FIG. 33), profile groups summary (FIG. 60), add, edit profile group (FIG. 62), portfolio group summary (FIG. 65), add, edit portfolio groups (FIG. 66), and create portfolio record (FIG. 67).

As indicated in FIG. 28 box 27c, site level activity entitlements give the UserName the ability, if authorized, to: access lists of portfolio and profile groups, access lists of profiles and portfolio records, access detailed profiles, access portfolio groups, access portfolio records, access profile groups, add/delete profiles, add/delete portfolio records, add/edit profile groups, add/edit portfolio groups, create profile groups, create portfolio groups, create a profile, create a portfolio record, view site audit history, view and run reports, conduct searches, access file tools (e.g., export profiles via XML, send profiles via e-mail, and convert profiles to Word®, Excel®, or PDF formats), manage UserNames, add a UserName, edit UserNames, and assign and/or move a profile to a specific profile group. An embodiment can accommodate an unlimited number of additional "site" level activity entitlements. If desired, specific site level activity entitlements can be converted into profile level activity entitlements.

Profile and Portfolio Level Activity Entitlements

Referring again to FIG. 27, the second level of activity entitlements are "profile" level activities that control a UserName's ability to navigate to preferably the following pages indicated in FIG. 28 box 27d: edit sections (FIG. 19), file manager (FIG. 20), add file (FIG. 21), view comments (FIG. 34), add comments (FIG. 35), change history (FIG. 36), profile metrics (FIG. 37), profile metrics detail (FIG. 38), file metrics (FIG. 39), file metrics detail (FIG. 40), and permitted profile users (FIG. 41). These pages and functionality are used to control the activities that authorized UserNames may perform on data to which they have been granted access. Permissions can be adjusted by UserName on a profile-by-profile basis.

As indicated in FIG. 28 box 27e, access to the profile related activity pages enables a given UserName the ability to access various profile level activity functions and entitlements which give the UserName the ability, if authorized, to: see a list of names of authorized profiles and portfolio records, edit profiles, edit portfolio records, change a profile's disclosure level, change a profile's state, delete a profile, delete a portfolio record, access change history, view comments, add comments, edit comments, delete comments, view authorized file attachment by file access type and permitted access right, add files, delete files, view file metrics summary, view file metrics detail, view profile metrics summary, view profile metrics detail, view the permitted UserNames for a profile, take a snapshot of the profile for compliance and tacking purposes, view historical images of previous snapshots, delete snapshots, and restore previous versions of snapshots to the active state.

FIG. 42 illustrates a single, representative UserName's access and activity entitlements that have been "tuned" to enable differentiated access and activity entitlements for three different sets of profiles located on three different deployments by three different providers. The specific deployments include: a deployment at his site/enrolling location, a deployment by Partner #1, and a deployment by Partner #N. It is assumed that Partner #1 and Partner #N have elected to share profiles with john@doe.com subject to the restrictions outlined in FIG. 42. This capability is important because it allows a single UserName to have differentiated edit rights for consumer profiles which have been entered via the UserName's deployment site while precluding that same UserName from editing consumer profiles which a business partner may have allowed them to access and view.

Default UserName Groups and Related Entitlements

A preferred embodiment uses several default UserName groups including: consumers, providers, guests, third parties. This preferred embodiment utilizes these UserName groups to assign initial default access and activity entitlements. The default entitlements can be modified by consumers and/or providers as required. Individual UserName adjustments may also be made to specific UserNames within the default UserName groups by consumers and/or providers. The adjustments may be implemented by the third party administrator and/or directly by the consumers and providers themselves.

Consumer UserName Group

The default access entitlements for a "consumer" group UserName only allow it to access the profile that corresponds directly to the UserName's company's submitted profile. Consumers may be allowed to see confidential sections from any provider that is requesting specific information from them. The provider preferably must instruct the neutral third party administrator as to what confidential sections they would like a consumer to have access to view and/or edit. The administrator will implement the entitlements which will allow consumers to see the selected and confidential provider sections.

The default consumer group UserName "site level activity" entitlements include: access to the goto navigation tools and file tools (e.g., export profiles via XML, send profiles via e-mail, and convert profiles to Word, Excel, or PDF formats). The "profile level activity" entitlements for a consumer UserName include: the ability to change their profile's disclosure level, edit their profile, view their file attachments, add a file attachment, delete a file attachment, access change history, and access permitted users. The consumer can only edit the contents of their profile and add, remove, or delete files associated with their profiles.

To meet some providers' requirements, some consumers may also be granted the right to manage all editing of, and UserName entitlements to, their respective profiles, be granted access to reports, and be given the ability to access all related audit capabilities, e.g. change history, permitted UserName list, etc. Providers may make this accommodation because they do not want to be responsible for any changes or accesses to the profile by any UserNames outside of their immediate organization. The provider deploying the invention in one embodiment has the right to modify the default entitlements for consumers who will be registering on their deployment.

Provider UserName Group

The default entitlements for a "provider" group UserName are typically more robust and include more site and profile activity entitlements than a consumer group UserName. The default access entitlements for a provider UserName give it the capability to see any consumer profiles which have been registered on that provider's site. They may also see any portfolio group names and their associated portfolio records. A provider is only entitled to access their confidential sections on profiles to which they have access. No provider may see the confidential sections of another provider that may be contained on profiles to which the provider has access. A default provider UserName may not see any profiles from any other provider unless they have been granted explicit and documented access authorization. Access to other provider's profiles is an entitlement that is preferably implemented by the neutral third party administrator for the invention in one embodiment. In some instances, the resource consumer may be given the authority to grant others access to their specific profile. The invention in one embodiment currently prohibits the sharing of portfolio groups and records between firms.

The default provider group UserName "site level activity" entitlements include: access to profile names, access to portfolio record names, access to portfolio group names, create a profile, create a portfolio record, view site audit history, view and run reports, conduct searches, file tools (e.g., export profiles via XML, send profiles via e-mail, and convert profiles to Word, Excel, or PDF formats), access profile groups, create profile groups, assign profile to a profile group, add UserName, and manage and edit UserName entitlements.

The default provider group UserName "profile level activity" entitlements include: access detailed profiles, access portfolio records, edit profiles, edit portfolio records, change a profile's disclosure level, change a profile's state, delete a profile, delete a portfolio record, view the profile's associated change history detail, view change history information for portfolio records, view authorized file attachment by file access type and permitted access right, add a file attachment, delete a file attachment, view file metrics, view file metrics detail, view profile metrics, view profile metrics detail, view comments, add a comment, view the permitted UserNames for a profile, take a snapshot, view a snapshot, delete a snapshot, and restore a snapshot. The provider deploying the invention in one embodiment has the right to modify the default entitlements for each of their internal users who will be using the invention.

Guest UserName Group

The default access entitlements for a "guest" group UserName only allow it to access the specific profiles, sections, fields, file attachments etc. that a provider has allowed it to access. A guest UserName is specific to a given provider's login site. A guest UserName can only access profiles specifically authorized and designated by providers. They cannot see or access any confidential sections which have been appended to various profiles by either consumers or providers. The default site level activity entitlements include access to the goto navigation tools, file tools (e.g., export profiles via XML, send profiles via e-mail, and convert profiles to Word, Excel, or PDF formats) and view and run reports. The profile level activity entitlements for a guest UserName include only access to view authorized file attachments by file access type and permitted access right. The guest UserName group does not have any edit or destructive rights, e.g., delete file capabilities. The provider deploying the invention in one embodiment has the right to modify the default entitlements for guest group UserNames.

Providers may also designate the specific activity entitlements that the guest UserName type may have. Guest UserName types typically will have "view" only rights for selected profiles and associated file attachments. The neutral third party administrator will set up the access and activity entitlements for guest UserName types on the invention in one embodiment. The administrator can allow each resource consumer to control and/or override access to their profile by guests who have been granted by resource providers, et al. If requested and negotiated, the administrator can implement such instructions. The administrator will preferably also provide a special link to enable the self-registration of guests on the platform. A guest who wishes to access a set of designated profiles on a specific provider's deployment of the invention in one embodiment clicks on "guest registration" in FIG. 15 which brings up a guest registration page, as shown in the FIG. 43 screenshot, that is generated by the FIG. 44 "guest UserName registration" procedure. The FIG. 43 registration page prompts the guest to provide a UserName and password and pay by credit card for accessing the profiles authorized and designated by the provider. The provider may or may not require a fee from the guest. At the bottom of that page, the guest clicks "yes" to accept the terms and conditions and then clicks "submit" to complete the UserName and payment portion of the registration process. The procedure outlined in FIG. 29, which is enabled by the access entitlements, identifies the profile or profile group which the UserName may access.

Third Party UserName Group

Consumers and providers often need to share their information with multiple providers that have granted, or are considering granting, resources to them, so one embodiment allows consumers and providers to share profiles with third party UserNames, e.g., other providers, business partners, vendors, banks, accounting firms, law firms, etc. Providers may grant sharing or access entitlement to other third party UserNames for profiles that have registered on their deployment. It is anticipated that consumers and providers will negotiate control of the sharing entitlements. In some situations, resource consumers may negotiate full control over the access and activities rights for their profile submissions. The third party administrator can accommodate and implement any and all negotiated rules. Preferably only profiles may be shared. Because portfolio records contain sensitive internal information, the ability to share portfolio records among and between different UserNames is preferably disabled. The neutral third party administrator will only implement sharing entitlements that have been properly authorized and requested by the respective parties.

In general, to share a profile, a consumer or provider who has ownership rights to a profile preferably must first advise the neutral third party administrator that they wish to share the profile with a third party UserName. The profile owner preferably must specify what access and activities entitlements they wish to grant to each UserName with which they wish to share. For example, Provider X who has ownership rights for Profile Z may wish to share it with UserName Y (from Provider Y). Provider X advises the third party administrator that UserName Y should not have access to any confidential section appended by Provider X on Profile Z. Provider X further stipulates that UserName Y should only have the site level activity entitlement to the goto navigation. Finally Provider X advises that UserName Y should only have the profile activity of view authorized file attachment by file access type and permitted access right and no destructive capabilities, e.g., delete a file, profile, etc. The administrator then implements the UserName Y entitlements stipulated by Provider X for profile Z. Sharing requests preferably must be made in writing by individuals authorized by their respective organizations.

Profile Groups (FIGS. 60 and 69)

Providers occasionally need to share their information and profiles with selected individuals, conference attendees, etc. The invention in one embodiment allows providers to create specific "profile groups" to which they may then grant access to by any internal or external usernames and/or default UserName group.

One embodiment of the invention allows the grouping of profiles in default or user-defined profile groups. The invention preferably has several default profile groups including: new profiles, trash, and pipeline. New and additional profile groups can be created by duly entitled UserNames. The newly created profile groups are specific to each provider's deployment. The profile groups are anticipated to be used by deploying providers to better organize and track various classes of profiles, e.g. newly registered profiles, software profiles, hardware profiles, life sciences profiles, etc. In contrast to Portfolio groups and records, which are anticipated to typically be kept internal to a provider (not syndicated), profile groups and related profiles can be useful for managing and controlling the external distribution of profile data.

Preferably, the embodiment enables the use of customized data templates for each unique profile group. For example, the data collection template for a software profile in the software profile group may include software specific data items, e.g. software license sales. The hardware data template may be completely different than the software template. The use of profile group specific data collection templates allows users to better accommodate each group's unique data collection requirements.

A given profile may be moved from one profile group to another. To move a given profile, a duly authorized UserName clicks on the "move profile to" item under the actions menu bar of FIG. 59. The user is then prompted to select a new profile group for the profile. After the selection is made the profile is then moved to the new group.

An authorized provider UserName can manage the profile groups by selecting the "manage profile groups" which is listed under the "actions" item on the menu bar of FIG. 59. An authorized UserName clicking on the "manage profile groups" option under the "Action" item initiates the FIG. 60 procedure which produces FIG. 59 screenshot that lists the profile groups associated with that provider's deployment. An authorized provider selecting the add group icon or clicking on an existing profile group to edit that profile group initiates the FIG. 62 procedure which produces the FIG. 61 screenshot. Upon editing the data for the new or existing group, the authorized UserName would select either update or add group and the changes would preferably be reflected in real-time.

Preferably, the embodiment's use of profile groups allows authorized providers to specify which sets of profiles may be accessed by "guest" UserNames. When a profile group is established, a provider has the option of allowing guest access to specific groups of profiles. A provider can remove this access entitlement by using the manage profile groups option under actions on the menu bar.

UserName Groups Login, Entitlements, and Use

Authorized UserNames (e.g., consumer, provider, and guest) may access one embodiment using the provider's login page as depicted in FIG. 15, which prompts the individual to enter their UserName and password. Three failed attempts to login will cause the system to disable the UserName. The UserName will then need to be reset by the neutral third party administrator.

Figure 45:
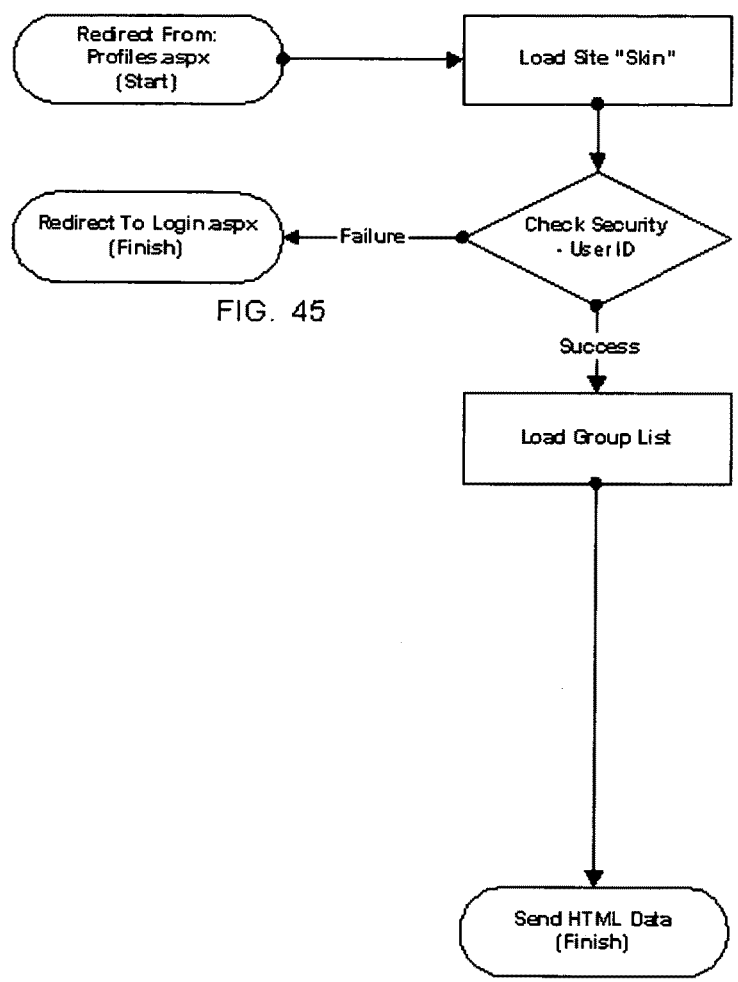
FIG. 45 is a flowchart of a preferred login procedure.

Assuming the user has a valid and authorized UserName and password, the logging-in user preferably must accept any and all disclaimers by checking "yes" and then clicking the login button in FIG. 15, which initiates the FIG. 45 login procedure. This procedure validates that the UserName is authorized for that provider's site and that any required disclaimers have been accepted. It also displays any warning or alert messages. Only valid UserNames that have accepted any and all disclaimers will be granted an authorization token, without which a UserName will not be admitted onto the provider's deployment. Upon successful completion of the FIG. 45 login procedure an entry is made in the site's audit history recording the UserName and date and time of login. Additional information is also collected and tracked, e.g., which profiles a UserName accesses. The audit history log also records the acceptance of any and all disclaimers. FIG. 46 is a screenshot of some of the site audit history entries generated during the FIG. 45 login procedure.

Preferably, system alerts and other parameter driven UserName alerts can be set up. The system alerts can also be used for compliance tracking purposes, e.g., to track the acceptance of disclaimers, etc. Preferably, an unlimited number of system alerts can be accommodated. The number of alerts can be tailored to meet the specific requirements of each deploying provider. An embodiment can be configured to deliver notifications to specific UserNames based upon pre-determined parameters. To utilize these capabilities, a provider should deliver to the neutral third party administrator a list specifying which UserNames should be notified along with their e-mail address and the parameter that should be used to trigger an alert message, e.g., a change to a profile.

Providers have a strong desire and need to control which profiles and related information may be accessed and what activities are performed on that accessed data. Confidentiality agreements, regulatory requirements, and other compliance mandates require providers to exercise tight controls over their data. To accommodate these requirements, the invention in one embodiment tests each UserName's entitlements to determine: 1) what profiles may be accessed (FIG. 29); 2) what portfolio records may be accessed (FIG. 24); 3) what site-level activity pages may be accessed that enable the user to perform various site-level activities (FIG. 28 boxes 27*b* and 27*c*); and 4) what profile-level activity pages may be accessed that enable the user to perform various profile-level activities (FIG. 28 boxes 27*d* and 27*e*).

Once a user has successfully logged onto the platform using the FIG. 15 login page and received its authorization token, then if the UserName is either a "provider" or "guest" type, they will be directed to the summary list of "active" profiles page as depicted in FIG. 47 (a provider type screen shot) or, if the UserName is a "consumer" type, they will be directed to their specific profile as depicted in FIG. 48. Both the consumer and guest UserName classifications types are set when they self register their UserNames on the platform. When the provider UserNames and any authorized partners are established on the platform by the neutral third party administrator, they are initially designated as provider type UserNames.

Typically providers and guests will choose one of the available profiles from the summary "active" profile page and thereby move from the "active" summary list to the detail associated with a given consumer profile. When a provider or guest clicks on the name of a profile displayed on the summary, the entire profile is loaded and displayed on their screen. The FIG. 29 and FIG. 11 processes validate a UserName's access and activity entitlements. Provider UserNames that have been properly validated may access the list of profiles in either the pending or active state for which they are an owner by clicking on the "profile groups" menu item on the bar depicted in FIG. 47. Selecting a profile with pending changes or an active profile with no pending changes from the default or any other profile group will initiate the FIG. 29 procedure which will display authorized profiles. These procedures are described in greater detail below.

Figure 29:
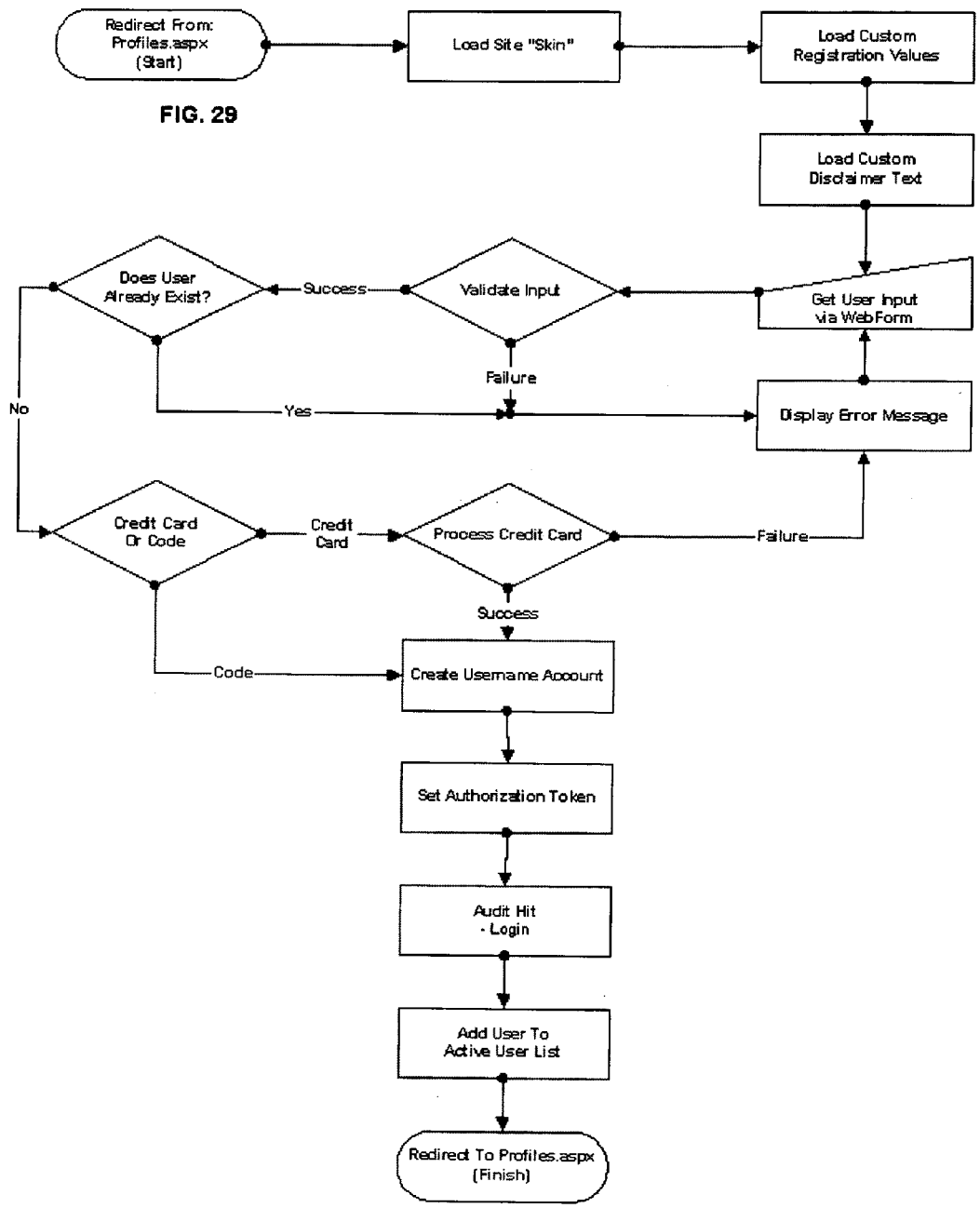
FIG. 29 is a flowchart of a preferred site level summary profile access and activity entitlements/permissions procedure.

A guest or provider UserName type that successfully logs into the system and is issued an authorization token is directed to the FIG. 29 profiles summary procedure. The first step in the multi-step procedure ensures that the UserName is properly authorized. The access entitlements provide the profile and portfolio access rights for each authorized UserName. The next step is to establish and enable the set of site level activity entitlements and related pages that a UserName may access. The neutral third party administrator implements the initial UserName entitlements and exclusions/inclusions established by providers and/or resource consumers that the procedures in FIG. 29 and FIG. 11 execute to deliver the appropriate output or HTML. To test a UserName's site-level activity entitlements (detailed in FIG. 28 boxes 27b and 27c), it proceeds from UserName specific activity entitlements, to UserName type entitlements, and then to site default entitlements. Each level of entitlements is defined by providers and/or resource consumers and initially implemented by the neutral third party administrator. This allows the deploying organization and/or consumer to establish flexible and granular entitlements based upon the needs of their diverse users. Once the site-level activity entitlements have been established, the invention in one embodiment determines and loads the set of profile names for both the provider's deployment and any authorized partner profiles for each UserName.

Finally, the system in one embodiment tests whether the UserName is authorized to access any portfolio records and if so loads the appropriate portfolio group names as well as the names of the portfolio records for each group. The use of the various access entitlements, site-level activity entitlements, and the exclusion/inclusions enables providers to offer highly differentiated and granular UserName entitlements. For a representative UserName the FIG. 29 procedure produces a FIG. 47 screen shot listing profile groups and profiles that the UserName may access and, across the menu bar, the site-level activity functionality to which the UserName has been granted access.

A consumer UserName type will be directed by the FIG. 29 procedure to their profile. The consumer's UserName is logged as audit entry in the site audit history and the profile is temporarily "locked" which prevents it from being edited by another UserName which may also have access to it. In addition, a clock is started which records the period of time that the profile is being updated and/or observed by the consumer's UserName. FIG. 48 shows a screenshot of a detailed profile which is accessed by a consumer type UserName. They may not access any other profiles or portfolio records, etc. As illustrated in FIG. 48, the site-level activity entitlements are preferably limited to access to the goto navigation, reports, and file tools functionality (e.g., save their profile as an MS Word file). The profile-level activity entitlements for a consumer type UserName are preferably limited to editing their own profile and using the file attachment manager (e.g., to attach a copy of their detailed financial model, etc.). Consumers may negotiate the right to take snapshots, access historical snapshots, delete snapshots, and access the change history logs for their given profile. The neutral third party administrator can enable these entitlements for consumer UserNames. In addition, the administrator has the ability to remove these activities and any other entitlements from any and all other UserNames who have access to a given consumer's profiles.

A guest or provider UserName clicking on a name of a profile listed on their profile summary list initiates the FIG. 11 procedure, which first validates that the UserName is entitled to access the detailed profile. If so, an audit entry is made in the site audit history and the profile is temporarily "locked" which prevents it from being edited by another UserName. A clock is started which records the period of time that the profile is observed by the UserName. The procedure then tests the activity entitlements defined by either or both the provider and consumer. To test a UserName's profile-level activity entitlements (detailed in FIG. 28 boxes 27d and 27e), it proceeds from UserName specific activity entitlements, to UserName type entitlements, and then to site default entitlements. The site level activities (FIG. 28, box 27c) are then revalidated. The activities are then loaded. The next step determines which sections of a specific profile a UserName may see. The initial section access rights are defined by UserName type. Exceptions are then used to exclude sections on a UserName basis. For example, a provider UserName may be allowed to access all sections on all profiles for a provider's deployment. However, for a single profile, a given UserName may be excluded from accessing the "confidential items" section. The FIG. 11 procedure then invokes the FIG. 12 procedure to determine which sections to load as well as whether specific fields within the various sections should be loaded. A test then determines, based upon the disclosure level for a profile, whether a UserName may access various sections. The authorized sections are then loaded. As a final test, the procedure checks to see if the UserName is entitled to see "board member" section(s). If the UserName is authorized, the board member section(s) are loaded.

Only UserNames from a particular provider's deployment may access portfolio groups and portfolio records. Guests and consumers are preferably prohibited from accessing the portfolio records. To access the list of portfolio group names and portfolio records names within each group, an authorized UserName clicks on "portfolios" in the menu bar in FIG. 47, which initiates the FIG. 24 procedure. Once again, the system conducts a series of tests using the defined entitlements, etc. To test a UserName's profile-level page and activity entitlements (detailed in FIG. 28 boxes 27d and 27e), it proceeds from UserName specific portfolio record activity entitlements, to UserName type entitlements, and then to site default entitlements. The site level activities (FIG. 28, box 27c) are then revalidated. The activities are then loaded. Then the procedure determines which portfolio group names and associated names of portfolio records, if any, the UserName is entitled to access. The appropriate portfolio group names as well as the names of the portfolio records for each group are then loaded.

A provider UserName clicking on a name of a portfolio record within a portfolio group initiates the FIG. 25 procedure, which first validates that the UserName is entitled to access the portfolio record. If the UserName is authorized to see the portfolio record, an audit entry is made in the site audit history and the portfolio record is "locked." A clock is started which records the period of time that the portfolio record is observed by the UserName. The procedure then uses a series of profile-level activity tests using the entitlements defined by the provider. To test a UserName's portfolio-level activity entitlements (detailed in box 27e in FIG. 28), it proceeds from UserName specific activity entitlements, to UserName type entitlements, and then to site default entitlements. The site level activities (FIG. 28, box 27c) are then revalidated. The activities are then loaded.

The next step determines which sections of a portfolio record a UserName may see. Exceptions are then used to exclude various sections. The FIG. 25 procedure then uses the FIG. 12 procedure to determine which sections and fields to load. The sections for the portfolio record are then loaded and displayed.

The entitlement algorithm is used by various procedures to establish the specific access and activity entitlements for each and every UserName. As outlined above, the entitlement algorithm determines which profiles and/or portfolio records a specific UserName may access. The entitlement algorithm also establishes the profile-level and site-level activity entitlements for each UserName.

Profile Level Activity "Pages"—Detailed Discussion

There are preferably eleven profile-level activity related pages (see FIG. 28 box 27d) which entitle an authorized user to perform the various profile-level activities outlined in FIG. 28 box 27e. These activities may be performed on profiles or portfolio records to which a given UserName has been granted access. Each UserName may be granted access to all or any combination of profile and portfolio level activity pages listed in FIG. 28, box 27d: edit section (FIG. 19), view comments (FIG. 34), add comment (FIG. 35), file manager (FIG. 20), add file (FIG. 21), profile metrics (FIG. 37), profile metrics detail (FIG. 38), file metrics (FIG. 39), file metrics detail (FIG. 40), permitted users (FIG. 41), and change history (FIG. 36). An authorized UserName may access these profile-level activities by selecting an item listed on the menu bar circled in FIG. 2 located at the top of each open profile. The significance and functionality of each profile-level activity page is outlined below.

Edit (FIG. 19)

Access to the edit page allows a UserName to input data and update data on profiles and/or portfolio records. A single UserName may be entitled to access the edit page for a single profile, multiple profiles, a single portfolio record, multiple portfolio records, or both profiles and portfolio records. The user interface for the edit page allows for compartmentalized data entry and edits for various sections via individually organized edit boxes. To submit data, the consumer clicks on the "edit" button on the menu bar located at the top of their profile. Before displaying any edit dialog box, the FIG. 19 edit procedure validates what sections and fields a particular UserName is allowed to edit. A list of available sections is then displayed. The consumer may then select which section he wishes to edit. When a user clicks on the name of a section the FIG. 19 edit procedure displays an edit dialog box for that section. The user then enters data and clicks the update button to submit the data. The server processes received data as shown by the FIG. 19 flowchart of the edit procedure. Changes are then updated on the profile preferably in real-time. The UserName may enter data or update additional sections if desired.

FIG. 49 contains screenshots of two representative edit boxes that may be used by the consumer to initially fill out a profile and/or to update their profile. Providers and other authorized UserNames may also use these boxes and others to update information on behalf of their respective consumers. FIG. 49 shows representative edit dialog boxes for two different profile sections, namely the general business descriptor section and the disclosure level setting. The edit boxes can be configured to provide explicit answers among which a person must choose for a particular item, e.g., development stage in FIG. 49. The use of the compartmentalized edit boxes saves time, cost (e.g., bandwidth), and overhead by reducing the amount of information which must be sent back to the server. In addition, application response times are improved because the amount of data which must be processed by the browser is reduced. Furthermore, the amount of data which can be lost due to power interruptions or PC and/or application problems is reduced.

The edit procedures outlined in FIG. 19 allow for both section-by-section and field-by-field edit rights for each profile and portfolio record on the platform. This allows a deploying provider to establish which UserNames may change highly sensitive items, e.g., a profile's disclosure level, confidential sections, and/or board member sections. The section-by-section and/or field-by-field edit rights enable flexibility and control for profiles that are shared between providers, consumers, and guests. For example, it may be the case that Provider A shares Profile C with Provider B but does not allow Provider B to edit Profile C's sections. However, Provider B may wish to append his own confidential section to Profile C. The invention's ability in one embodiment to offer section by section edit entitlements on a profile-by-profile basis precludes Provider B from editing any section on Profile C except for his own appended sections.

The FIG. 19 edit procedure can initiate the sending of change notifications via e-mail to specified recipients. Preferably, the third party administrator sets up and manages the UserName based notifications. The parameters are established by the provider and/or consumer. When a particular parameter is met, e.g., change to a specific section on a profile, a numeric value reaches a threshold (e.g., cash balance), the registration of a new profile, etc., a notification is sent via e-mail to the designated recipient's UserName/e-mail address.

Comments (FIGS. 34 and 35)

Providers and consumers also need to occasionally append comments or reminders to their profiles. These comments could include reminders to follow-up based upon key consumer milestones, e.g., customer wins, or the hiring of key staff. The ability to append comments directly to each consumer profile is valuable to both providers and consumers because it enables comments to be tracked and recorded. Access to comments can be granted to providers, consumers, or both, on a UserName basis. To view comments for a profile, a UserName clicks on the comments menu item on the bar and selects "view comments," which initiates the FIG. 34 procedure to display a FIG. 50 comment screen that enables the authorized UserName to view comments appended to the profile. The ability to add a comment is also controlled at the UserName level. A UserName may have the ability to view comments but not add a comment. To add a comment, an authorized UserName clicks on the comment menu item and selects add comment. A UserName clicking on "add comment" invokes the FIG. 35 procedure which brings up a dialog box that enables the UserName to add a comment. The UserName would click the add comment to post the comment to the profile. The comment will be reflected preferably in real-time.

Any UserName appending a comment must specify the level of access for each comment that they append to any profiles. Preferably, a UserName may choose one of three comment designations: private, internal, or public. If necessary, additional designations (e.g. Board) may be added as requested. A comment designated as private may only be viewed by the submitting UserName. No other UserName who may access the profile can access comments labeled as private. A comment designated as internal may only be viewed by the submitting UserName and any UserName directly affiliated with the submitting UserName's specific firm, e.g. a colleague from that UserName's firm. A comment designated as public may be viewed by any UserName who has been granted access to the profile to which the public comment has been appended.

File Management (FIGS. 20 and 21)

Providers and consumers preferably can append file attachments to specific profiles. Providers can also attach files to portfolio records. This facilitates both providers and consumers supplying one another with greater levels of detailed information than they wish to post on the semi-homogenous profile template. Each profile includes a secure file folder which can be used to hold related file attachments, e.g., business plans, customer contracts, executive summaries, investor presentations, term sheets, sales pipeline reports, deal related documents, compliance documents, financials, capitalization tables, etc. FIG. 20 shows the procedure used to manage files for profile or portfolio records. FIG. 21 shows the procedure used to add a file to the file folder for a profile or portfolio record. Authorized UserNames may view, add, or delete files by utilizing the file manager functionality. Authorized users will see the view/add/manage file icon on the profile illustrated in the upper right hand corner of FIG. 2. A user clicking on the view/add/manage file icon invokes the FIG. 20 file manager procedure which produces the FIG. 22 file manager dialog box. The FIG. 20 procedure checks to see what file attachments a particular UserName may access. Access to file attachments can be restricted based upon the file type (business plan, financial projections, resumes, term sheet, etc.) and/or permitted access rights (board item, financial, general, internal, etc.). If the access settings for a file are changed, the access rights for that file will preferably be reflected in real time. A user may select and open a file attachment they have been authorized to view. The file access authorization can be stipulated by either or both consumers and providers. The neutral third party administrator implements the UserName file entitlements for the various profiles. Permissions can vary from profile to profile for each and every UserName.

Providers and consumers may also control which UserNames may add and delete file attachments. UserNames may be granted the right to add files but not delete and vice versa. The third party administrator implements the instructions of the providers and consumers.

An authorized UserName may delete a file by clicking on the delete link located to the right of the file name which is listed on the file manager box depicted in FIG. 22. To add a file, an authorized UserName would click on the add file link on the file manager box located in the upper lefthand corner in FIG. 22. When a UserName clicks on the add file link, the add file procedure in FIG. 21 is initiated and a file add box like one of the boxes in FIG. 51 is displayed. The UserName may add a file by specifying its location or using the browse button to locate and select a desired file attachment. The UserName wishing to add a file preferably must specify both the file's type as depicted in FIG. 51*a* and a permitted access right as depicted in FIG. 51*b*. A file may not be uploaded unless both items have been specified for each and every file. For each specific profile, UserNames may be excluded from seeing specific file types, e.g., term sheets. Only the UserName that has appended a given file to a specific profile may change that file's type and access rights. The permitted access rights for file attachments are tied to both specific UserNames and various profile settings. For example, if a UserName is a non-owner of a profile then that UserName may see file attachments that have a "financial" permitted access right designation if and only if the profile's disclosure level is designated as "general information and financial." Any file attachment with a permitted access right of financial will be removed and added back based upon the setting of the disclosure level for a given profile. Similarly, any file which carries a "board item" permitted access right can only be seen by UserNames with a board member designation Profile Metrics (FIGS. 37 and 38)

Providers and/or consumers often need to monitor which UserNames are accessing various profiles and their associated file attachments. One embodiment can allow providers to see exactly which UserNames have accessed specific profiles. To access the record of which UserNames have accessed a particular profile, the UserName would first open the desired profile. The authorized UserName would then click on the audit menu item on the profile and then click on profile metrics. A user clicking on the profile metrics link invokes the FIG. 37 procedure which brings up the profile metrics summary depicted in FIG. 52. This displays the UserNames who have accessed the profile, the date and time of their last view of the profile, and the total time they spent on that particularly profile. To obtain more detail, the UserName could then click on one of the UserNames depicted in the FIG. 52 profile metrics summary. By doing so, the FIG. 38 profile metrics detail procedure is initiated which brings up the profile metrics detail page depicted in FIG. 53 showing the exact number as well as the dates and times that a UserName has accessed a particular profile. It also shows the elapsed time that a UserName spent observing a profile on each occasion. This capability enables a provider to better track which UserNames have accessed their respective profiles. Access to the profile metric summary and profile metric detail can be granted on a UserName basis. Providers and/or consumers will likely restrict the use of this functionality to internal and selected UserNames.

Preferably provider UserNames will be restricted to seeing the metrics for their internal users and guests. Preferably, consumers will be allowed to see metrics for any UserName which has been granted access to their profile.

File Metrics (FIGS. 39 and 40)

The invention in one embodiment can also allow providers and/or consumers to see exactly which UserNames have accessed specific file attachments for each and every profile. To access a record of which UserNames have accessed various file attachments for a given profile, an authorized UserName first opens the desired profile. The UserName then clicks on the audit menu item on the profile and then clicks on file metrics. A user clicking on the file metrics link invokes the FIG. 39 procedure which brings up the file metrics summary depicted in FIG. 54. This displays the names of all the file attachments for a given profile, the number of times each attachment has been accessed, the name of the person who last accessed the file attachment, and the date and time that the file was last accessed. To obtain more detail, an authorized UserName could then click on one of the names of the file attachments depicted in FIG. 54 which invokes the FIG. 40 procedure which brings up the file metrics detail page depicted in FIG. 55 showing the names of each person who has accessed that particular file attachment along with the date and time that they accessed the file attachment. Access to the file metrics summary and file metrics detail can be granted on a UserName basis. Providers and/or consumers will likely restrict the use of this functionality to internal and selected users.

Preferably provider UserNames will be restricted to seeing the metrics for their internal users and guests. Preferably, consumers will be allowed to see metrics for any UserName which has been granted access to their profile.

Permitted Users (FIG. 41)

The permitted users page is a profile-level activity page that enables an authorized UserName to see what firms and associated UserNames have access to a given profile. Providers and/or consumers wish to strictly control which internal and external UserNames have access to a given profile. It is often difficult for a provider to know exactly who may have access to a given profile which they own or are responsible for. To address this requirement, one embodiment can display the UserNames and the names of the respective firms along with a contact number for each UserName which has been granted access to a given profile, and indicates whether a particular UserName that has access to a given profile is allowed to "edit" that profile. The platform can display additional information if desired. To access the permitted users log for a given profile, an authorized UserName first opens the desired profile. The UserName then clicks on the audit menu item on the profile and then clicks on the permitted users option, invoking the FIG. 41 procedure which brings up the permitted users summary depicted in FIG. 56.

This enables a provider and/or consumer to better track which UserNames have accessed a particular profile at any given time. Access to the permitted users functionality can be granted on a UserName basis. Providers and/or consumers will likely restrict the use of this functionality to internal and selected users. Preferably, consumers will be allowed to see the names of all providers, guests, etc. who may have been granted access to their profiles. Preferably, each provider will only be allowed to see the UserNames from their organization that have been granted access to a given profile. Preferably, guests and others will not be allowed to see any of the permitted users for a given profile.

Change History (FIG. 36)

The FIG. 36 procedure tracks, in a separate and discrete change history log as shown in FIG. 26, the changes made to a specific profile. Entries are made in the change history log whenever a change is made, e.g., any field is changed within a section on a profile or portfolio record, a file is added to a profile or portfolio record, a profile is e-mailed to someone, etc. When any field for a profile section is edited or changed using the FIG. 19 procedure, an entry is made in the change history log as shown in FIG. 26 for a representative profile. The entry in the change history log details: the UserName making a change, the field or item that was changed, the value before the change was made, the value after the change was made, and the date and time the change was made. When the UserName has completed entering or updating data for the various sections on their profile, they may then click the logout button on the profile to exit the system and end their session. Preferably, consumers will be allowed to see only the change history for their specific profiles. Preferably, each provider will be allowed to see the change history for all profiles for which they are a designated owner. Preferably, a provider will not be allowed to see the changes made by another provider on a mutually shared profile. Preferably, guests and others will not be to see the change history for any profile. Preferably, consumers can see any change made by any UserName that has access to their profile.

Monitoring and compliance tracking are increasingly important. Consumers and providers must increasingly demonstrate that they have exercised appropriate fiduciary oversight of data which they submit, update, manage, and control. Consumers and providers should discretely track each individual UserName's access to data along with the activities they perform on the data which they have accessed. The UserName entitlement system enables consumers and providers to track individual UserName accesses and activities. Every piece of information that is accessed by each UserName along with any activities performed are preferably recorded in the change history and site audit (described below) logs for each provider's deployment. The value of the change history log is enhanced because it is administered by the neutral third party and the entries cannot be altered in any way by any UserName. As such, a change made by any UserName cannot be repudiated. External auditors can validate when and how often particular profiles have been updated, by whom, and when. This log of information can also provide independent validation as to how well the activities and progress of a consumer have been monitored by various providers. The ability to demonstrate and offer an independent and non-repudiatable record that can attest to appropriate fiduciary oversight is valuable to providers. The change history record also enables providers to observe and monitor the activities of internal users, partners, and consumers to evaluate their performances.

Providers and/or consumers may select which UserNames may have access to the change history log. Authorized UserNames can access the change history by selecting the audit menu item on the menu bar and then selecting the change history item. Clicking on "change history" in the menu bar initiates the FIG. 36 procedure which validates that the UserName is authorized to see the change history and display the change history items for a particular profile.

The change history algorithm used by the FIG. 36 procedure assures that only UserNames that are authorized to see selected and/or restricted sections (e.g., mutual consumer and provider confidential sections, board items sections, provider specific confidential sections, etc.) may also see the change history entries for those fields. This assures the ability to accurately track changes associated with specific profiles and portfolio records without the need to sacrifice or jeopardize the security and confidentiality of sensitive data. A given provider cannot see any change history items for confidential sections owned by other providers.

Site-Level Activity "Pages"—Detailed Discussion

There are preferably ten site-level activity pages (see FIG. 28, box 27*b*) which enable an authorized UserName to perform various site-level activities as outlined in FIG. 28 box 27*c*. These activities may be performed on profiles or portfolio records to which a given UserName has been granted access. Each UserName may be granted access to all or any combination of ten site-level activity pages in FIG. 28, Box 27*c* including: create profile (FIG. 18), site audit history (FIG. 30), reports (FIG. 31), support (FIG. 32), password reset (FIG. 33), profile groups (FIG. 60), add, edit profile group (FIG. 62), portfolio group summary (FIG. 65), add edit portfolio groups (FIG. 66), and create portfolio record (FIG. 67). An authorized UserName may access these site-level activities by selecting an item listed on the menu bar circled in FIG. 2 or on the related sub-menus located at the top of each open profile.

Site Audit History (FIG. 30)

For control and audit purposes, providers should be able to attest as to exactly who has accessed their information and the date and time. As is the case with the change history associated with profiles, site monitoring and tracking are emerging as important compliance items. The value of the site audit log is enhanced because it is also administered by the neutral third party and the entries made in the log cannot be altered in any way by any UserName. As such, the site audit entries made by any UserName that accesses a provider's application or site cannot be repudiated. External auditors can validate when and how often particular UserNames have accessed a provider's deployment. The ability to demonstrate and offer an independent and non-repudiatable site audit log that can attest to appropriate fiduciary oversight is valuable to providers. The site audit record enables providers to observe and monitor the activities of internal users, partners, and of course consumers, to evaluate their performances.

Providers may select which UserNames may have access to the site audit log. Authorized UserNames can access the site audit log by selecting the audit menu item from the menu bar and then selecting the site audit log item. Clicking on the site audit history log item initiates the FIG. 30 procedure which validates that the UserName is authorized to see the site audit history and display the site audit history log for that provider's site. A UserName cannot see any entries for any other site. UserNames accessing the site audit log are limited strictly to the entries that pertain to the location from which they logged into the platform. The FIG. 30 procedure produces the audit log displayed in FIG. 46. Each entry in the site audit log includes the activity performed (login, view profile, create profile, delete profile), the UserName performing the activity, the IP address of the UserName, and the data and time that the entry was made. Preferably, each provider will only be allowed to see their specific site audit log for their given deployment of the PEPn platform.

The combination of the change history log and the site audit log provides each resource provider with a comprehensive view of what changes have been made and by who for the profiles and portfolio records for which they have a fiduciary responsibility. The resource provider can better assess which profiles are being most actively and accurately maintained. In addition, the resource providers are in a better position to track how the specific individuals responsible for various profiles are managing their oversight and compliance monitoring capabilities. As such, resource providers deploying the invention in one embodiment can better demonstrate that they are exercising adequate oversight which can be attested to by an independent third party administrator.

Report, Search (FIG. 31)

Resource providers need to run reports for various purposes, e.g., weekly meetings, monthly meetings, annual meetings. They also need to search for information that has been submitted by various consumers. The ability to retrieve real time reports that reflect information that contains information that is directly updated by consumers is highly valuable to providers. Providers often have tight turn around times for reporting back to their internal and external partners, investor, regulators, etc. Providers and their authorized UserNames can use reporting tools to run reports and conduct searches for profiles and/or portfolios by name, geography, industry, sector, profitability, etc. To access the report functionality an authorized UserName would select reports from the menu bar. Clicking on the reports item on the menu bar invokes the FIG. 31 procedure which displays the FIG. 57a report creation and search tools screen. An authorized UserName can then select and run a report from the list of available reports or they may run a search. FIG. 57b shows the output of a representative search. The neutral third party administrator can create custom reports on behalf of the provider. The administrator can also deliver the raw consumer data to providers so that they can generate reports using standard packages, e.g., Crystal Reports. Additional reports can be created if necessary. If needed, the invention in one embodiment can also be configured to produce system performance and utilization reports as outlined in FIG. 10 box 10c.

Support (FIG. 32)

Providers typically expect and need access to support from the third party administrator. To access the support page an authorized UserName would select support from the menu bar. Clicking on the support menu item initiates the FIG. 32 procedure which in turn displays the FIG. 58 support page. The support page includes the contact information for designated support staff.

Password Reset (FIG. 33)

If a user forgets his password he can request an automatic reset and delivery of a new password to the e-mail address associated with his UserName. To do so, the user clicks the "lost password" link on the screen shot in FIG. 15 which invokes the FIG. 33 procedure to bring up a password reset screen. The user is prompted to supply the e-mail address or UserName they use to log into the system. The user then clicks on the "reset password" button and their new password will be encrypted and sent via e-mail to them.

SnapShots: Compliance, Change Control, and Audit Tracking

Consumers and providers need to track changes made to profiles and/or portfolio records over time. Increasing compliance and audit tracking requirements have been imposed by new and proposed regulations, e.g. the Sarbanes-Oxley Act, PEIGG requirements, etc. Currently, the process of tracking changes is labor intensive and is often done manually. One embodiment of the invention allows consumers and/or providers to take non-editable snapshot images of profiles and/or portfolio records at discrete times. The consumer and provider(s) for a given profile both may be entitled to take snapshots as needed. Snapshots can be taken manually or automatically at user defined and scheduled intervals. One or both parties may also be excluded from taking snapshots of a mutually shared profile. Authorized UserNames may be allowed to delete various snapshots associated with a profile. The abilities to take, view, and delete snapshots are profile/portfolio level activity entitlements. These entitlements can be assigned by profile and UserName.

Figure 64:
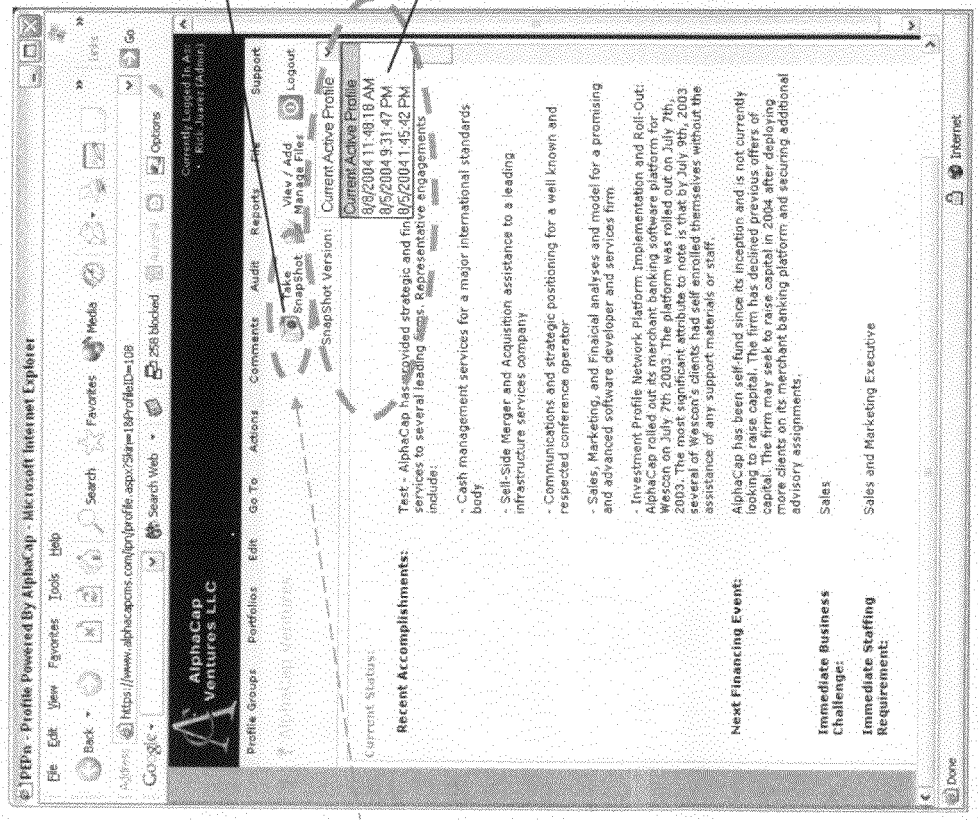
FIG. 64 is a flowchart of a preferred Take SnapShot procedure that makes a historical copy of a profile or portfolio record.

When a profile and/or portfolio record is opened an authorized UserName may take an archive image or "snapshot" of that profile and/or portfolio record. Preferably the snapshot contains the contents of the underlying data collection template along with copies of all file attachments and associated comments at that specific time. To take a snapshot of a profile or portfolio record, a user can click on the camera icon illustrated in FIG. 63, which initiates the FIG. 64 procedure/function that captures a historical archive image or snapshot.

To access a historical image of a profile or portfolio record, a user selects the specific date of the snapshot they desire from the dropdown menu listed on each profile or portfolio record. A user selecting a date for a snapshot from the dropdown list depicted on FIG. 63 initiates the FIG. 11 procedure which starts the view profile function and produces the desired snapshot and its associated file attachments and comments.

If necessary, one embodiment allows for the restoration of a snaphot. The FIG. 11 procedure contains the restore profile and portfolio functions that allow a UserName to replace the current and most recent version of a given profile and/or portfolio record with the selected and dated historical snapshot.

The snapshot functionality is useful because it helps Consumers and providers to more efficiently track reported results and accomplishments over time. Snapshots enable consumers and providers to efficiently assemble reports that compare current results and projections to historically reported and projected results, preferably in real time. Snapshots provide an independent and non-repudiatable record that consumers and providers can use to demonstrate their fiduciary oversight and tracking.

Architecture

FIG. 8 is a high level architectural block diagram of the logic of an embodiment of the method, which includes three layers or tiers: a presentation tier, a business tier, and a data tier. The presentation tier provides the graphical user interface that displays templates that either request the user to provide data or displays information that has been requested. The presentation layer could reside on a PC, cell phone, pager, telephone, etc. The business tier contains the business rules of the embodiment and provides the entry point for all presentation tier requests, and preferably utilizes Microsoft's Internet Information Server (IIS) to handle incoming client requests and to host the ASP.Net controls. The business tier logic is written preferably in C#.Net and interoperates with IIS to manage and coordinate the execution of the business rules of the invention. Communication between the presentation tier and the business tier is accomplished preferably over a secure 128-bit SSL connection. The SSL certificate state of authority is preferably provided by Verisign (www.verisign.com). The data tier contains the information that has been supplied by providers, consumers, guests, partners, etc. The database is created and managed preferably using Microsoft's SQL Server 2000. The embodiment can accommodate other databases as well, e.g. Oracle. Communication between the business tier and the data tier is handled preferably by Microsoft's ADO.Net data access objects. Data exchanged throughout each of the logical tiers is formatted preferably using industry standardized XML. Providers will appreciate one embodiment's use preferably of open standards and proven infrastructure elements, e.g., Microsoft 2000, Verisign encryption, etc.

The three logical tiers map or correspond directly to the three similarly named tiers in the physical architecture as shown in the block diagram of FIG. 9. The logical and physical tiers are separated to ensure the scalability and performance of the invention in one embodiment. Scalability is achieved because the underlying logical layer does not need to be adjusted in response to increases in the number of users, system loads, or utilization levels. The physical layer can accommodate load changes because each physical tier may contain any number of computers, servers, load balancers, or other devices needed. The physical tiers provide the computing and control resources which the logical layers use.

Software Deployment Options

An embodiment is preferably customized to meet the often unique requirements of each provider that elects to deploy the invention. The provider preferably has the option of deploying the invention as either an enterprise software license or on an Application Service Provider (ASP) basis. If a provider elects to deploy the invention on an enterprise license basis, the provider assumes responsibility for the management and administration of the physical infrastructure or tiers, the logical tiers, operating system, UserNames, system administration, security, report creation and management, setup and integration, and management of the underlying database of data collected by the invention. Providers who deploy the invention on an enterprise licenses basis preferably must coordinate directly with the neutral third party administrator if they wish to share information via the invention outside of their organization.

Most providers are anticipated to choose to deploy the invention in an embodiment on an ASP basis. An ASP deployment may require a neutral third party administrator and enforcement authority for the platform. The third party will assume the responsibility for the management and maintenance of the physical tiers, the logical tiers, operating system, security, system administration, setup and integration of the platform, the administration of the UserNames, setup and administration of profile and portfolio record templates, association of profiles to portfolio records, management of the UserName and system alerts, report configuration and administration, and management of the underlying database of information collected by the invention. If desired, providers can be supplied with the system tools needed to allow them to self-administer some portions of the invention in one embodiment. However, the neutral third party administrator will always administer the sharing permissions entitlements among and between UserNames. Providers are likely to choose the ASP model because it can be implemented much more rapidly and without the need for them to buy equipment, software, and hire additional technical resources to mange the deployment. In addition, providers have expressed a desire to jointly deploy an ASP version of the invention with other industry providers and/or partners.

While the present invention is described in terms of a preferred embodiment, it will be appreciated by those skilled in the art that this embodiment may be modified without departing from the essence of the invention. It is therefore intended that the following claims be interpreted as covering any modifications falling within the true spirit and scope of the invention.

We claim:

1. A method of managing resource consumer information, comprising the steps of:
   performing, by a system of one or more machines, the step of defining a data collection template for collecting information about a company desired by a resource provider for investing in the company, the system having multiple investors as members and the system having multiple companies as members;
   presenting, by the system, to a user an interface having one or more fields for inputting information into the template;
   receiving, by the system, the information in the one or more fields of the interface;
   storing, by the system, the information that was input into the template as a profile in an electronic database system;
   assigning, by the system, UserNames to users;
   establishing, the system, access permissions that determine which profiles a specific UserName is permitted to access; and
   establishing, by the system, activity permissions which determine what a specific UserName is permitted to do with an accessed profile.

2. A method of working with portfolios, comprising the steps of:
   receiving at a system, having one or more machines, from a machine of a company, information about the company, the system having multiple investors as members and having multiple companies as members;
   organizing, by the system, information useful to an investor for providing fiduciary oversight and related information into a portfolio record, storing the portfolio records into an electronic database system, the information useful to an investor for providing fiduciary oversight and related information being based on the information from the machine of the company;
   defining, by the system, portfolio categories;
   defining, by the system, for each portfolio category, a template of items of information that will be contained in a portfolio record;
   presenting, by the system, to a user an interface having one or more fields for a party to input information into the portfolio templates to form portfolio records, and
   storing, by the system, the records in the electronic database system;
   associating, by the system, profiles to appropriate portfolio records; and
   presenting, by the system, to a user an interface having one or more fields for accessing portfolio records stored in the system.

3. A method of managing resource consumer information, comprising the steps of:
   defining, by a system, having one or more machines, a data collection template of fields for a semi-homogenous profile of resource consumer information desired by a resource provider, data collection templates of fields of different semi- homogeneous profiles need not be uniform for all semi-homogeneous profiles;

assigning, the system, UserNames to users;

presenting, by the system, to a user an interface having one or more fields for at least one UserName to input information into the fields;

storing, by the system, the information as a profile in an electronic database system;

presenting, by the system, to a user an interface having one or more fields for at least one UserName to access and perform certain activities, including appending files of any type and comments, on profiles stored in the system;

recording, by the system, a Change History log that indicates all accesses, activities and changes and the date and time that they are made, and what UserName made them, to a particular profile; and recording, by the system, a Site Audit log that indicates which UserName has accessed a profile, the network address of the site from which the UserName accessed the profile, the date and time, and what major activities the UserName performed on the profile.

4. A method of managing resource consumer information, comprising the steps of:

defining, by a system, having one or more machines, a data collection template of fields for a semi-homogenous profile of resource consumer information desired by a resource provider, data collection templates of fields of different semi- homogeneous profiles need not be uniform for all semi-homogeneous profiles;

presenting, by the system, to a user an interface having one or more fields for allowing at least one user to input information into the fields;

storing, by the system, the input information as a profile in an electronic database system;

assigning, by the system, UserNames to users;

establishing, by the system, access permissions that determine which profiles a specific UserName is permitted to access;

establishing, by the system, activity permissions which determine what a specific UserName is permitted to do with an accessed profile; and presenting, by the system, to a user an interface having one or more fields for allowing at least one authorized party to access information stored in the system;

wherein the electronic database system is administered by a trusted third party, who is neutral to resource providers and to resource consumers, who implements desired semi-homogenous profile data collection templates and independently manages UserName access and activity permissions specified by a resource provider or a resource consumer, data collection templates of fields of different semi- homogeneous profiles need not be uniform for all semi-homogeneous profiles.

5. A method of managing resource consumer information, comprising the steps of:

storing, by a system, having one or more machines, the information as one or more profiles in an electronic database system the one or more profiles being of companies, information about the company, the system having multiple investors as members and having multiple companies as members;

assigning, by the system, UserNames to users;

presenting, by the system, to a user an interface having one or more fields for allowing at least one UserName to access and perform certain activities on profiles stored in the system;

recording, by the system, a Change History log that indicates all accesses, activities and changes and the date and time that they are made, and what UserName made them, to a particular profile; and recording, by the system, a Site Audit log that indicates which UserName has accessed a profile, the network address of the site from which the UserName accessed the profile, the date and time, and what major activities the UserName has performed on the profile.

* * * * *